United States Patent
Vasilovich et al.

(10) Patent No.: US 7,504,737 B2
(45) Date of Patent: Mar. 17, 2009

(54) METHOD AND APPARATUS FOR CONVERTING HUMAN POWER TO ELECTRICAL POWER

(75) Inventors: Linda A. Vasilovich, 641 N. Lima St., Burbank, CA (US) 91505; Richard K. Hilgner, Burbank, CA (US)

(73) Assignee: Linda A. Vasilovich, Burbank, CA (US)

( * ) Notice: Subject to any disclaimer, the term of this patent is extended or adjusted under 35 U.S.C. 154(b) by 0 days.

(21) Appl. No.: 11/824,868

(22) Filed: Jul. 3, 2007

(65) Prior Publication Data

US 2007/0252453 A1 Nov. 1, 2007

Related U.S. Application Data

(63) Continuation-in-part of application No. 11/060,992, filed on Feb. 18, 2005, now Pat. No. 7,253,534.

(60) Provisional application No. 60/545,383, filed on Feb. 18, 2004.

(51) Int. Cl.
*F02B 63/04* (2006.01)
*F03G 7/08* (2006.01)
*H02K 7/10* (2006.01)
*H02K 7/18* (2006.01)

(52) U.S. Cl. ............ 290/1 R; 290/1 C; 310/67 A; 310/75 B; 482/2

(58) Field of Classification Search .......... 290/1 R, 290/1 C, 1 A; 322/4; 310/68 D, 68 A, 75 B, 310/112, 114, 179; 482/2, 57, 79
See application file for complete search history.

(56) References Cited

U.S. PATENT DOCUMENTS 3,240,947 A 3/1966 Mas (Continued)

OTHER PUBLICATIONS

United States Patent Office; Notice of Allowance dated Mar. 29, 2007 for Vasilovich, et al.; Method and Apparatus for Converting Human Power to Electrical Power; U.S. Appl. No. 11/060,992, filed Feb. 18, 2005.

(Continued)

*Primary Examiner*—Julio C. Gonzalez
(74) *Attorney, Agent, or Firm*—Khorsandi Patent Law Group, A Law Corporation; Marilyn R. Khorsandi

(57) ABSTRACT

In an exemplary briefcase embodiment as depicted in FIG. 48, exemplary batteries (525) and (526) would be contained in very close proximity to an exemplary twelve-coil PMG assembly (300'). The exemplary twelve-coil PMG assembly (300') would comprise a twelve-coil stator (not visible) in between two rotors (e.g., 217b). In an exemplary briefcase embodiment, exemplary batteries (525) and (526) would be separated from the exemplary twelve-coil PMG assembly (300') by magnetic shielding, including internal side magnetic shielding (510); exemplary batteries (525) and (526) would be further shielded from the magnetic flux of the exemplary twelve-coil PMG assembly (300') by, for example, open-face magnetic shielding panel (511), magnetic shielding internally encased in the sides and bottom of main base casing (507), and by magnetically shielded conduit (not shown). In the exemplary briefcase embodiment, exemplary batteries (525) and (526) would abut, that is, would be adjacent, or closely adjacent, to one face of internal side magnetic shielding (510); portions of the exemplary twelve-coil PMG assembly (300') would abut, that is, would be adjacent, or closely adjacent, to the opposite face of internal side magnetic shielding (510). A single large pulley wheel (534) would be mounted on a drive shaft (503) that would be connected to a manually operated crank (not visible) to turn a small pulley wheel (531) with a single pulley V-belt (532). Rotation of the small pulley wheel (531) would in turn rotate the generator shaft (521) to turn the rotors (217b and 217a (not visible)) to generate power to be stored in exemplary batteries (525 and 526).

11 Claims, 40 Drawing Sheets

U.S. PATENT DOCUMENTS

| | | | |
|---|---|---|---|
| 3,296,451 | A | 1/1967 | Van Ausdal |
| 3,705,721 | A | 12/1972 | Lulay et al. |
| 3,765,245 | A | 10/1973 | Hampl |
| 3,831,942 | A | 8/1974 | Del Mar |
| 3,884,317 | A | 5/1975 | Kinzel |
| 4,084,810 | A | 4/1978 | Forsman |
| 4,187,441 | A * | 2/1980 | Oney .......................... 310/112 |
| 4,298,893 | A | 11/1981 | Holmes |
| 4,612,447 | A | 9/1986 | Rowe |
| 4,612,494 | A | 9/1986 | Kawamura |
| 4,613,129 | A | 9/1986 | Schroeder et al. |
| 4,709,917 | A | 12/1987 | Yang |
| 4,768,777 | A * | 9/1988 | Yang ............................ 482/57 |
| 4,866,321 | A * | 9/1989 | Blanchard et al. ........... 310/112 |
| 5,114,391 | A | 5/1992 | Pitzen et al. |
| 5,184,040 | A * | 2/1993 | Lim ............................ 310/114 |
| 5,252,859 | A | 10/1993 | Tagney, Jr. |
| 5,256,115 | A | 10/1993 | Scholder et al. |
| 5,334,899 | A * | 8/1994 | Skybyk ....................... 310/268 |
| 5,440,185 | A * | 8/1995 | Allwine, Jr. ............. 310/156.37 |
| 5,616,104 | A | 4/1997 | Mulenburg et al. |
| 5,723,928 | A | 3/1998 | Imai et al. |
| 5,789,837 | A * | 8/1998 | Shin et al. .................. 310/90.5 |
| 6,177,778 | B1 * | 1/2001 | Miller et al. ................ 320/112 |
| 6,229,224 | B1 | 5/2001 | Gagne |
| 6,259,233 | B1 * | 7/2001 | Caamano ..................... 322/89 |
| 6,433,450 | B1 | 8/2002 | Chao |
| 6,507,128 | B2 | 1/2003 | King et al. |
| 6,731,017 | B2 | 5/2004 | Mikhall et al. |
| 6,930,403 | B2 | 8/2005 | Hartman et al. |
| 6,946,748 | B2 | 9/2005 | Love |
| 6,965,183 | B2 * | 11/2005 | Dooley ....................... 310/201 |
| 6,987,327 | B1 | 1/2006 | Lucatero |
| 7,009,350 | B1 | 3/2006 | Gold |
| 7,049,708 | B2 | 5/2006 | Hartman et al. |
| 7,081,696 | B2 * | 7/2006 | Ritchey ...................... 310/114 |
| 7,253,534 | B2 | 8/2007 | Vasilovich et al. |
| 2004/0026925 | A1 | 2/2004 | Tung |
| 2004/0027024 | A1 * | 2/2004 | Kato et al. .................. 310/179 |
| 2005/0200221 | A1 | 9/2005 | Vasilovich et al. |
| 2006/0038456 | A1 * | 2/2006 | Bojiuc ................... 310/156.32 |

OTHER PUBLICATIONS

United States Patent Office; Office Action dated Oct. 17, 2007 for Vasilovich, et al.; Method and Apparatus for Converting Human Power to Electrical Power; U.S. Appl. No. 11/823,085, filed Jun. 26, 2007.

United States Patent Office; Office Action dated Feb. 28, 2008 for Vasilovich, et al.; Method and Apparatus for Converting Human Power to Electrical Power; U.S. Appl. No. 11/823,085, filed Jun. 26, 2007.

U.S. Appl. No. 11/823,085, filed Nov. 26, 2007, Vasilovich.

Pedal Power, "Pedal Works", article is undated—printed on Jan. 26, 2004, references the year 2002, 2 pages, www.pedalpower.org/works.html, Vancouver, B.C.

"Pedal Power", article is undated—printed on Jan. 26, 2004, references the year 2000, 2 pages, www.humboldt.edu/~ccat/at/pedalpower/home.html.

Erickson, Ben, "The Human Energy Converter (HEC) at CCAT—project by Bart Orlando and HSU Students", article is undated—printed on Jan. 26, 2004, 2 pages, www.humboldt.edu/~ccat/at/pedalpower/HEC.html.

Garcia, Yvette, with technical advise from Bart Orlando, "Powering a Lap Top Computer at CCAT", article is undated—printed on Jan. 26, 2004, pp. 1-7, www.humboldt.edu/~ccat/at/pedalpower/Laptop.html.

Erickson, Ben, "Human Powered Energy Generator (HPEG)", article is undated—printed on Jan. 26, 2004, 3 pages, www.humboldt.edu/~ccat/at/pedalpower/hgen.html.

Erickson, Ben, "The Human Energy Converter (HEC) at CCAT—project by Bart Orlando and HSU Students", article is undated—printed on Jan. 26, 2004, 2 pages, www.humboldt.edu/~ccat/at/pedalpower/HEC.html.

Erickson, Ben, CCAT's Pedal Power Blender—Project by Bart Orlando and HSU Students, article is undated—printed on Jan. 26, 2004, 2 pages, www.humboldt.edu/~ccat/at/pedalpower/blend.html.

Erickson, Ben, CCAT's Pedal Power Television/VCR—Project by Bart Orlando and HSU Students, article is undated—printed on Jan. 26, 2004, 1 page, www.humboldt.edu/~ccat/at/pedalpower/Television.html.

Preuit, Amy, "Setting Up a Pedal Powered Washing Machine", article is undated—printed Jan. 26, 2004, 2 pages, www.humboldt.edu/~ccat/at/pedalpower/WashingMachine.html.

Erickson, Ben, Pedal Power Washing Machine—Project by Bart Orlando and HSU Students, article is undated—printed on Jan. 26, 2004, 1 page, www.humboldt.edu/~ccat/at/pedalpower/washme.html.

Orlando, Bart, "CCAT's Pedal Powered Saws—Project by Bart Orlando, and HSU Students", (photographs) article is undated—printed on Jan. 26, 2004, 1 page, www.humboldt.edu/~ccat/at/pedalpower/TableSaw.html.

Erickson, Ben, "CCAT's Pedal Drill Press—Project by Bart Orlando, and HSU Students", (with photographs) article is undated—printed on Jan. 26, 2004, 2 pages, www.humboldt.edu/~ccat/at/pedalpower/Drill.html.

Erickson, Ben, "CCAT's Pedal Power Grinder—Project by Bart Orlando, and HSU Students", article is undated—printed on Jan. 26, 2004, www.humboldt.edu/~ccat/at/pedalpower/grind.html.

Svehla, Jeremy, with technical advise by Bart Orlando, "How to Build Human Powered Belt Sander", article is undated—printed on Jan. 26, 2004, 5 pages, www.humboldt.edu/~ccat/at/pedalpower/sandme.html.

Svehla, Jeremy, "How to Build Human Powered Belt Sander", article is undated, 5 pages.

Association for India's Development, "Decentralized Electricity", article is undated—printed on Jan. 26, 2004, Mentions years 2000 to 2003, © 2000, 2 pages, College Park, MD, www.aidindia.org/hq/projects/illus/pedal.htm.

Association for India's Development, "Pedal Power Generator", article is undated—printed on Jan. 26, 2004, referencing the years 2000-2002, © 2000, 3 pages, College Park, MD. www.aidindia.org/hq/projects/illus/pedal2.htm.

Butcher, David "Pedal Powered Generator", article is undated—printed Jan. 26, 2004, 5 pages, www.los-gatos.ca.us/davidbu/pedgen.html.

Wi-Fi Planet, "Pedal Power: Look Ma No Wires", Aug. 30, 2002, 3 pages, http://integral.typepad.com/everydayguru/2003/12/pedal_power_loo.html and www.wi-fiplanet.com/columns/prints.php/1454991.

Mion, Ian. "S4-15 Pedal Power", EcoVersity—Sustainable Living/Land-based Learning, undated 2004 course description, www.ecoversity.org/CurrentWebpages/2004SpringCECourses/S4-15PedalPower.htm.

"Pedal Power Pack and Rural Energy Security", Center for Renewable Energy, article is undated—Mentions conversion rate for US$ on Aug. 17, 2002, printed on Jan. 26, 2004, www.namstct.org/pppre.htm.

McCullagh, James C., "Pedal Power—In Work, Leisure, and Transportaton", Table of Contents, Rodale Press, © 1977, http://ww2.green-trust.org:8383/2000/pedalpower/default.htm.

Erickson, Ben "Pedal Power: Spinning for the Future at CCAT", printed on Jan. 26, 2004, http://ww2.green-trust.org:8383/2000/humanpower.htm McCullagh, James C., "Pedal Power", Acknowledgments, printed on Jan. 26, 2004, 1 page, http://ww2.green-trust.org:8383/2000/pedalpower/ppack.htm "Pedal Power", Introduction, 3 pages, printed on Jan. 26, 2004, http://ww2.green-trust.org:8383/2000/pedalpower/ppintro.htm.

Wilson, David Gordon, "Pedal Power", Chapter 1 (Human Muscle Power in History), 7 pages, printed on Jan. 26, 2004, http://ww2.green-trust.org:8383/2000/pedalpower/ppch1.htm.

Le Bon, Bill "Pedal Power Produce Update", Culture Change/Sustainable Energy Institute, 3 pages, undated, Arcata, CA., www.culturechange.org/issue14/pedalpowerupdate.html no date provided.

Piggott, Hugh, PMG Construction Manual, Feb. 2001, The Schumacher Centre for Technology and Development, Warwickshire, England. 49 pages.

Coleman® Sentinel Flashlight™, "Instruction Manual", The Coleman Company, Inc., © 2001, Wichita, KS. 2 pages.

United States Patent Office; Office Action, a Notice of Allowance, dated Jul. 29, 2008 for Vasilovich, et al.; Method and Apparatus for Converting Human Power to Electrical Power; U.S. Appl. No. 11/823,085, filed Jun. 26, 2007.

* cited by examiner

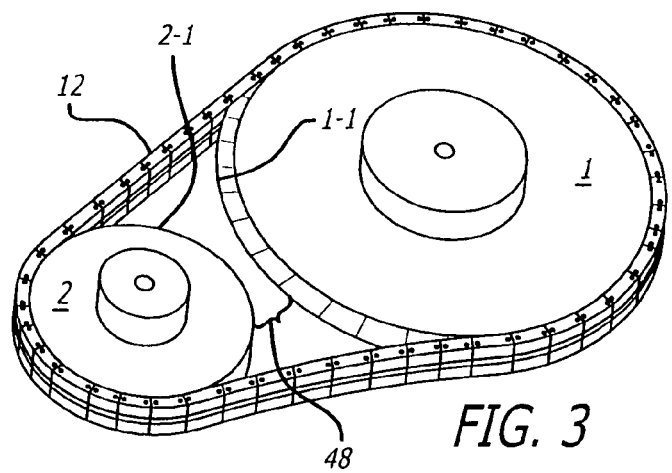
FIG. 3
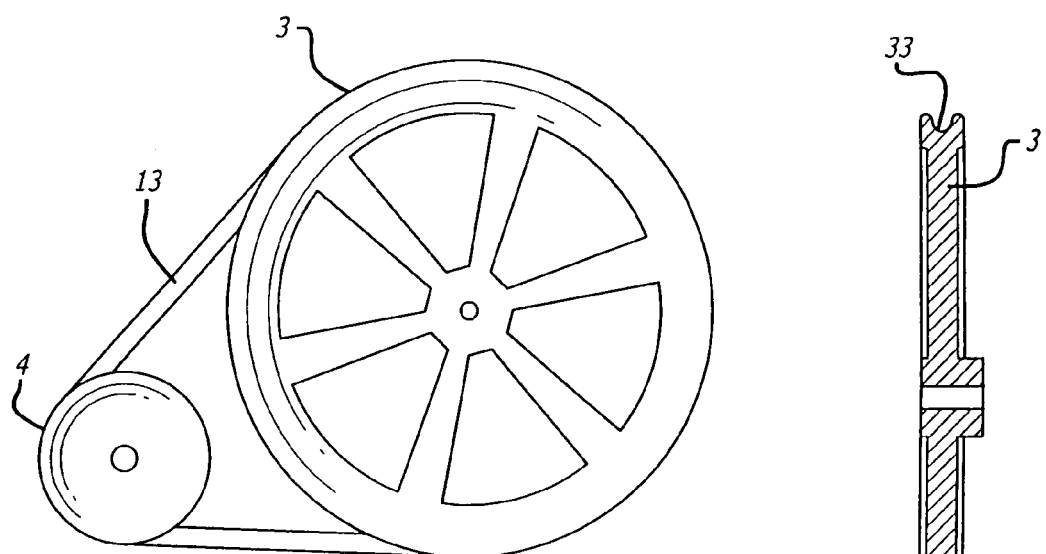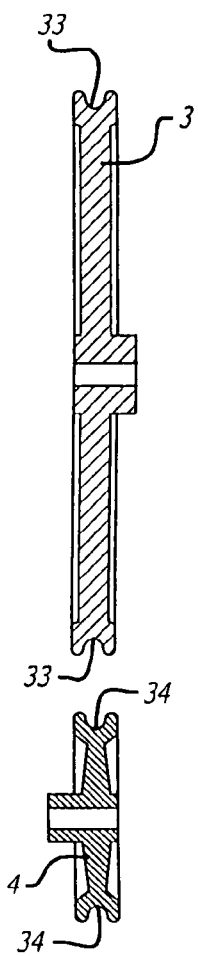
FIG. 4
FIG. 5

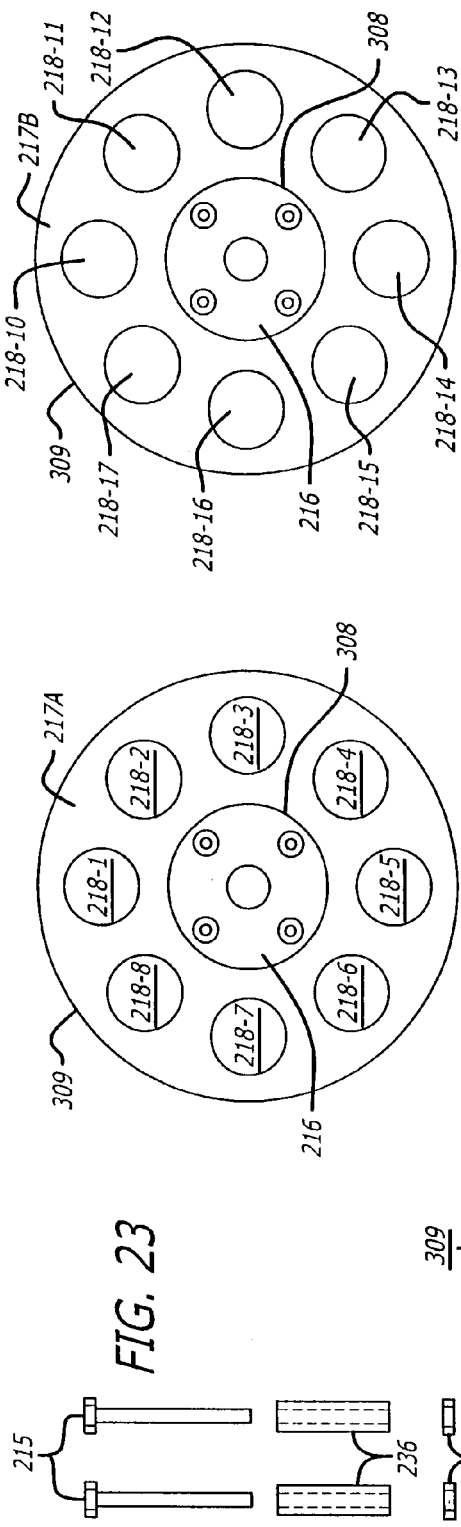

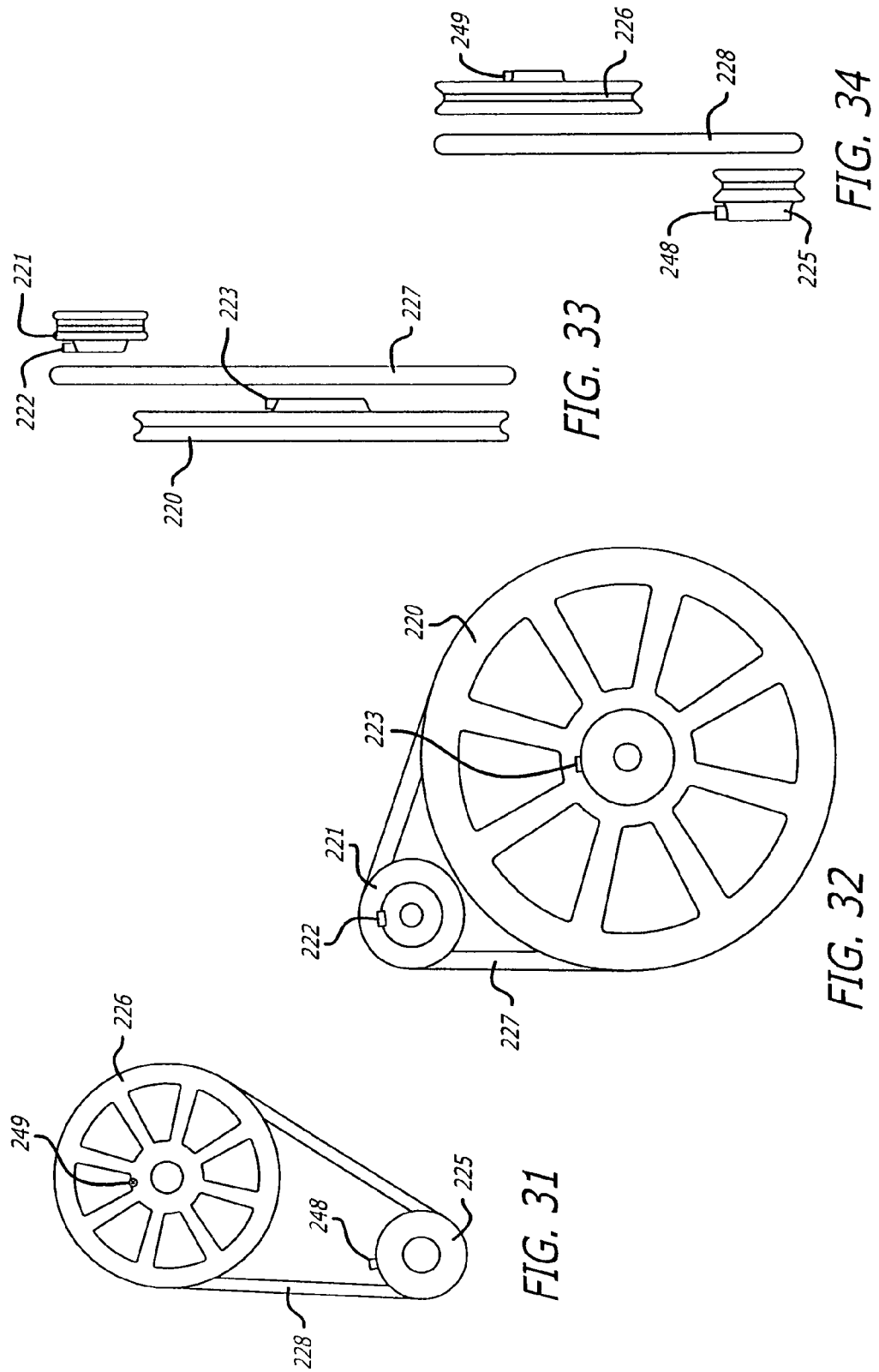

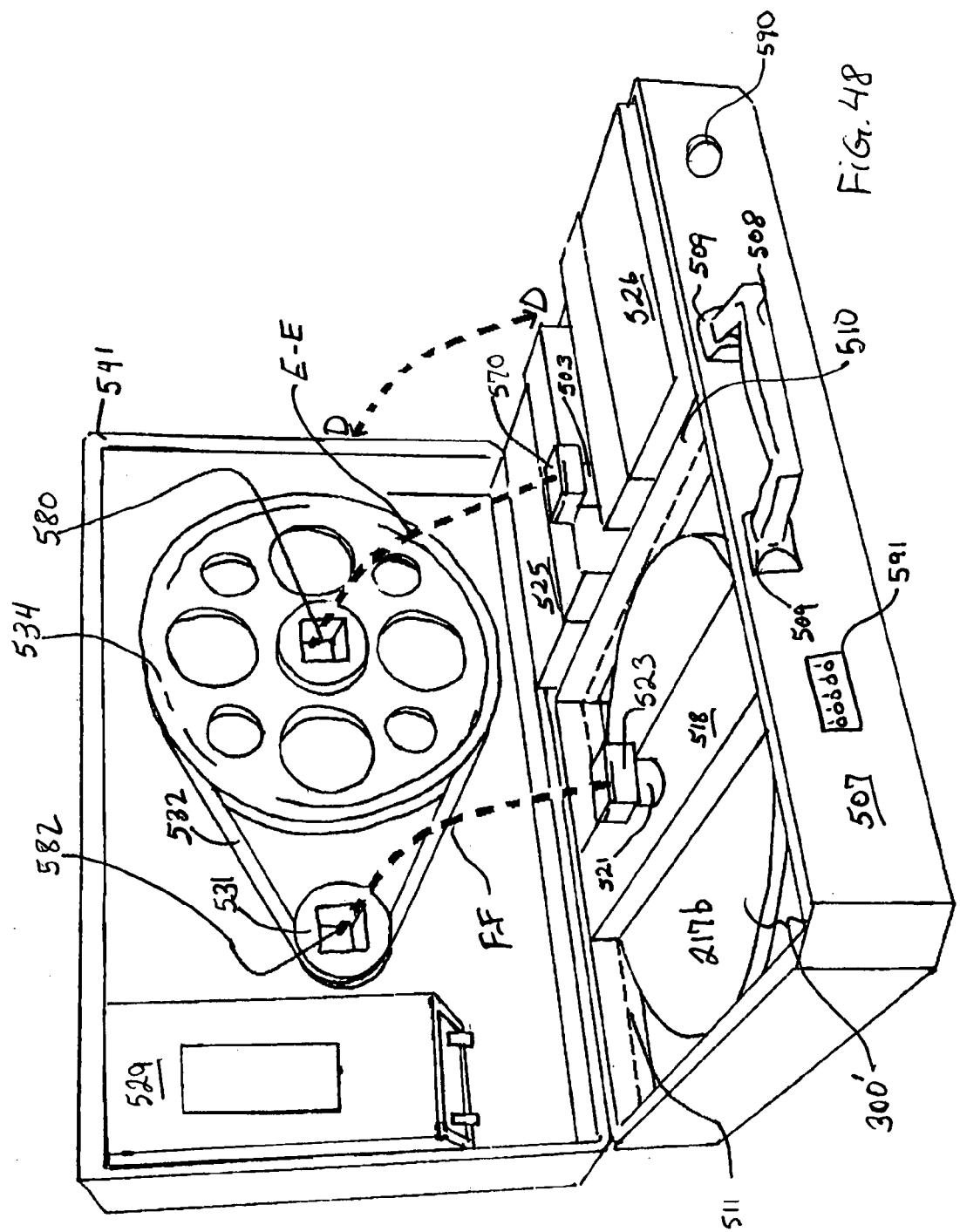

US 7,504,737 B2

METHOD AND APPARATUS FOR CONVERTING HUMAN POWER TO ELECTRICAL POWER

CROSS REFERENCE TO RELATED APPLICATIONS

This application is a continuation-in-part of U.S. patent application Ser. No. 11/060,992, attorney docket number PVAS0002US/MRK, entitled "METHOD AND APPARATUS FOR CONVERTING HUMAN POWER TO ELECTRICAL POWER," filed Feb. 18, 2005, now U.S. Pat. No. 7,253,534 the entire content and disclosure of which is incorporated herein in full by reference as if stated in full herein, which claimed priority to U.S. Provisional Patent Application Ser. No. 60/545,383, attorney docket number PVAS0001/MRK, entitled "METHOD AND APPARATUS FOR CONVERTING HUMAN POWER TO ELECTRICAL POWER", filed Feb. 18, 2004, the entire disclosure of which is incorporated herein in full by reference as if stated in full herein.

FIELD OF THE INVENTION

The field of the present invention is mechanical power converters, and more particularly, machines for converting human-source mechanical power to electrical power.

SUMMARY OF THE INVENTION

The exemplary embodiment of the present invention resembles a stationary bicycle (see, e.g., FIGS. 2C and 2D) without a seat. The exemplary embodiment can be placed in front of a chair in which a person is sitting; the person can place their feet on the exemplary pedals of the exemplary embodiment, and pedal. The exemplary pedals are mounted on respective exemplary pedal arms, which are in turn mounted on opposing ends of a first axle.

The first axle of the exemplary embodiment extends through a center hole in a first geared sprocket wheel. The first geared sprocket wheel has a twelve-inch diameter. One complete revolution of the pedals translates into one complete revolution of the first geared sprocket wheel. In the exemplary embodiment, the pedals and pedal arms are mounted in such a way, and the pedal arms are of such a length, to provide ease of use and lower the torque needed to revolve the first geared sprocket wheel.

When the person pedals, the mechanical motion of the person's pedaling is exerted on the first axle that extends through the first geared sprocket wheel. A sprocket chain connects the first geared sprocket wheel to a second geared sprocket wheel. The second geared sprocket wheel has a diameter that is smaller than the diameter of the first geared sprocket wheel. In the case of the exemplary embodiment, the second geared sprocket wheel has a diameter of seven inches. Because the second geared sprocket wheel's diameter is smaller than the first geared sprocket wheel's diameter, for every revolution of the first geared sprocket wheel, the second geared sprocket wheel makes more than one revolution. In the case of the exemplary embodiment, for every revolution of the first geared sprocket wheel, the second geared sprocket wheel revolves 1.71 times.

The second geared sprocket wheel is mounted on a second axle. The second axle extends through a third gear wheel. The third gear wheel has a diameter of 11.5 inches. The third gear wheel is adapted to receive a first v-belt. The first v-belt connects the third gear wheel to a fourth gear wheel. The fourth gear wheel has a diameter of five inches and is adapted to receive a v-belt such as the first v-belt. The fourth gear wheel is mounted on a third axle. The third axle extends through a fifth wheel, which in the exemplary embodiment is a flywheel, with a diameter of 15.5 inches, and through a sixth gear wheel. The sixth gear wheel has a diameter of 11.5 inches and is adapted to receive a v-belt such as a second v-belt.

In the exemplary embodiment, an alternator is provided on which is mounted an alternator pulley wheel. In order to generate electricity, the alternator pulley wheel must rotate about 1100 times per minute (1100 revolutions per minute—1100 RPMs). The exemplary embodiment multiplies each revolution of the pedals and the first gear wheel according to the diameter ratios of the various gear wheels and the alternator pulley wheel. As described in further detail below, the exemplary embodiment multiplies each revolution of the pedals and the first gear wheel by 12.91 times at the alternator pulley wheel. Thus, when a person rotates the pedals at approximately 86 revolutions per minute, the alternator pulley wheel revolves approximately 1100 times per minute. The exemplary embodiment produces electrical energy through the alternator, stores the energy in a battery, and provides electrical energy for use by a 110/120 AC current appliance through an inverter.

In alternative embodiments, it would be possible to eliminate the exemplary flywheel; only five gear wheels plus the alternator pulley wheel could be provided. It would also be possible to further reduce the number of gear wheels. However, in order to produce 1100 RPMs, an embodiment with less than five or six gear wheels would feature larger gear wheels and/or would require more power to overcome higher torque.

The exemplary embodiment of the present invention provides a device for converting human power to electrical power. With reference to FIG. 17, the exemplary device comprises: a plurality of gear wheels (e.g., 1, 2, 3, 4, 5 and 6) interconnected with a plurality of interconnection means (e.g., 12, 13, and 14); a first axle (9), said first axle (9) disposed through an opening in a center of a first gear wheel (1) of the plurality of gear wheels; a first pedal (18) mounted on a first pedal arm (17) and a second pedal (18) mounted on a second pedal arm (17), each pedal arm (17) mounted on opposing ends of the first axle (9); a second gear wheel (2) of the plurality of gear wheels interconnected to the first gear wheel (1) with a first interconnection means (12) of the plurality of interconnection means; an alternator (8) interconnected to one of the gear wheels (e.g., 6) of the plurality of gear wheels; a battery (22); and an inverter (27).

In the exemplary embodiment, the alternator is interconnected to one of the gear wheels of the plurality of gear wheels with one of the plurality of interconnection means. However, in a yet further alternative exemplary embodiment (sometimes referred to herein as the "PMG embodiment" or as the "exemplary PMG embodiment"), the alternator is integral to one of the gear wheels of the plurality of gear wheels. In the PMG embodiment, the gear wheel to which the alternator is integral comprises a permanent magnet generator assembly.

The exemplary embodiment of the present invention further provides a device for converting human power to electrical power that comprises: an alternator; an alternator pulley wheel mounted on the alternator; a battery for storing direct current electrical energy; an inverter for converting direct current electrical energy into alternating current electrical energy; a manually-operated first gear wheel comprising a center opening; a second gear wheel, a third gear wheel, a fourth gear wheel, a fifth gear wheel, and a sixth gear wheel; a first axle disposed through the manually-operated first gear wheel center opening; a second axle disposed through a center opening in the second gear wheel and through a center opening in the third gear wheel such that the second gear wheel and the third gear wheel are mounted on the second axle; third axle disposed through a center opening in the fourth gear wheel, and through a center opening in the fifth gear wheel, and through a center opening in the sixth gear wheel such that the fifth gear wheel is mounted on the third axle between the sixth gear wheel and the fourth gear wheel; a first manual-operation means mounted to a first end of the first axle and a second manual-operation means mounted to a second end of the first axle; a first interconnecting means interconnectably mounted to the manually-operated first gear wheel, said first interconnecting means interconnecting the manually-operated first gear wheel to the second gear wheel; a second interconnecting means interconnectably mounted to the third gear wheel, said second interconnecting means interconnecting the third gear wheel to the fourth gear wheel; and a third interconnecting means interconnectably mounted to the sixth gear wheel, interconnecting the sixth gear wheel to the alternator pulley wheel.

The exemplary embodiment further provides an adapter for connecting rotary-motion exercise equipment to mechanically operate a device for converting mechanical power to electrical power, said adapter comprising: a shaft; a shaft sleeve wherein said shaft sleeve is adapted for connection to an axle for mechanically operating the mechanical conversion device; and an adjustable chuck adapted for fastening on to a rotary axle of a rotary-motion exercise device.

The exemplary embodiment further provides a method for converting mechanical power to electrical power, said method comprising: mounting a flywheel with a centrifugally-weighted outer rim to an alternator; mounting an alternator pulley wheel to the alternator; and connecting one of a plurality of interconnected gear wheels to the alternator pulley wheel.

The exemplary embodiment further provides a pedal for operating a rotary motion device, said pedal comprising: an oblong rim adapted for receiving a sole of a human foot or shoe, said oblong rim having a perimeter, a front end, a back end, a first side and a second side; and a centered cross-piece that extends from a center point on the first side of the oblong rim to a center point on the second side of the oblong rim, said cross-piece forming a first space between the cross-piece and the front end adapted for receiving four fingers of a human hand, said cross-piece forming a second space between the cross-piece and the back end adapted for receiving a thumb of a human hand.

As will be explained further below, in a first exemplary PMG embodiment variation of the present invention (sometimes referred to herein as the exemplary twelve-coil PMG embodiment), an alternative exemplary PMG device comprises an alternative exemplary PMG assembly that comprises an alternative exemplary stator that comprises twelve alternative exemplary coils of wire arranged in a substantially circular pattern around a center hole relative to the wire coils. In further alternative PMG embodiments, the stator would comprise a number of wire coils (or other electrical-conducting structure) that would be divisible by the number three (3) and by the number two (2). Rotors would comprise an even number of permanent magnets. Such embodiments would be adapted for generating three-phase alternating current.

As will be explained further below, in some PMG embodiments, magnetic shielding is used to shield the battery being charged from the magnetic fields of the PMG assembly. Magnetic shielding may be used to encase, for example, the PMG assembly, wires from the PMG assembly, and/or the battery.

As will be explained further below, in some PMG embodiments, a docking station is provided to allow a secondary battery to be connected to the PMG device for charging, and then removed and towed to another location to run a third device, such as, for example, a large appliance.

As will be explained further below, in some PMG embodiments, such as a twelve-coil embodiment, a star wiring configuration is used to facilitate charging of a battery.

As will be explained further below, in some PMG embodiments, "kill" switches, also sometimes referred to as "cutoff" switches, are provided between an exemplary PMG assembly and a battery being charged.

As will be explained further below, in some PMG embodiments, such as, for example, a twelve-coil PMG embodiment, a manual crank and only two pulley wheels and a single pulley V-belt are used to drive the PMG rotors to generate electricity.

As will be explained further below, an exemplary briefcase embodiment of the present invention applies the above-mentioned features of, for example, a twelve-coil stator, magnetic shielding, star wiring, and kill switches. In the exemplary briefcase embodiment, a single large pulley wheel would be mounted on a drive shaft that would be connected to a manually operated crank to turn a small pulley wheel with a single pulley V-belt. Rotation of the small pulley wheel would in turn rotate the generator shaft to turn the rotors to generate power to be stored in one or more exemplary batteries.

BRIEF DESCRIPTION OF THE DRAWINGS

These and other features, aspects, and advantages of the present invention will become better understood with regard to the following description, appended claims, and accompanying drawings in which:

FIG. 3 is a perspective view of an exemplary geared sprocket chain interconnecting an exemplary first geared sprocket wheel and an exemplary second geared sprocket wheel in the exemplary embodiment of the present invention;

FIG. 4 is a plan view of an exemplary first v-belt interconnecting exemplary third and fourth wheels in the exemplary embodiment of the present invention;

FIG. 5 is a cross-sectional view of exemplary third and fourth wheels in the exemplary embodiment of the present invention;

FIG. 23 is a plan view of bolts, spacers and nuts that are used to hold exemplary rotor/steel plate assemblies together in the further alternative exemplary device in the exemplary PMG embodiment of the present invention;

FIG. 24 is a detailed front plan view of an exemplary rotor/steel plate assembly in the further alternative exemplary device in the exemplary PMG embodiment of the present invention;

FIG. 25A is a side plan view of an exemplary rotor/steel plate assembly in the further alternative exemplary device in the exemplary PMG embodiment of the present invention;

FIG. 25B is a side plan view of a counter-posed exemplary rotor/steel plate assembly in the further alternative exemplary device in the exemplary PMG embodiment of the present invention;

FIG. 26 is a side plan view of a steel plate in the further alternative exemplary device in the exemplary PMG embodiment of the present invention;

FIG. 31 is a plan view of an exemplary first V-belt pulley and an exemplary second V-belt pulley connected via an exemplary first V-belt in the further alternative exemplary device in the exemplary PMG embodiment of the present invention;

FIG. 32 is a plan view of an exemplary third V-belt pulley and an exemplary fourth V-belt pulley connected via an exemplary second V-belt in the further alternative exemplary device in the exemplary PMG embodiment of the present invention;

FIG. 33 is a front plan exploded view of an exemplary third V-belt pulley and an exemplary fourth V-belt pulley connected via an exemplary second V-belt in the further alternative exemplary device in the exemplary PMG embodiment of the present invention;

FIG. 34 is a front plan exploded view of an exemplary first V-belt pulley and an exemplary second V-belt pulley connected via an exemplary first V-belt in the further alternative exemplary device in the exemplary PMG embodiment of the present invention;

FIG. 48 is a perspective view depicting an opened exemplary briefcase embodiment of the present invention;

DETAILED DESCRIPTION OF THE INVENTION

Figure 1:
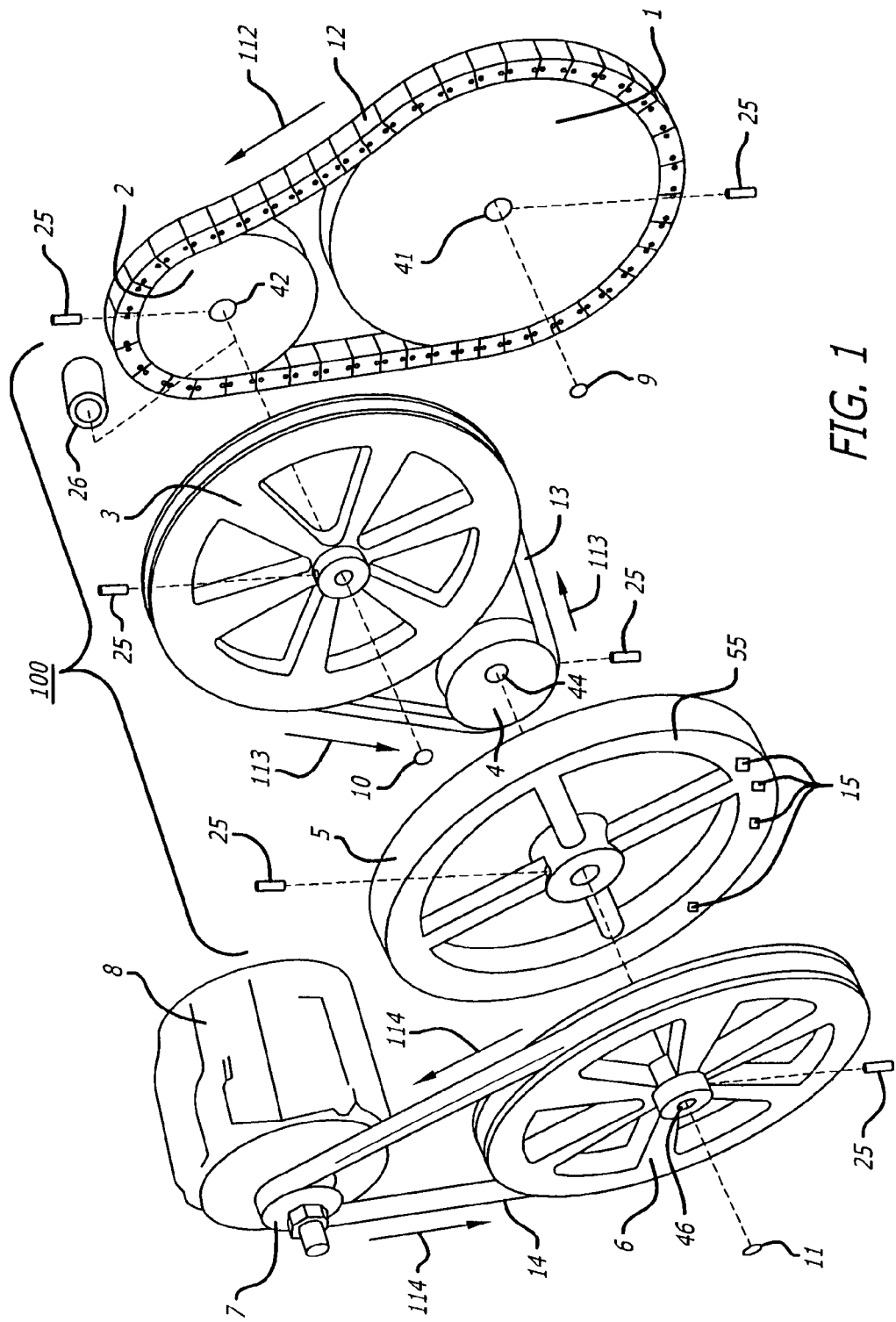
FIG. 1 is an exploded perspective view of exemplary gear box transmission components of an exemplary device for converting human power, or mechanical power, to electrical power in an exemplary embodiment of the present invention.

FIG. 1 is an exploded perspective view of exemplary gear box transmission 100 components of an exemplary device for converting human power, or mechanical power, to electrical power, in an exemplary embodiment of the present invention.

As depicted in FIG. 1, an alternator 8 is provided. In the exemplary embodiment, alternator 8 is a Chevrolet 350 V-8, 12-volt alternator.

It will be understood by someone with ordinary skill in the art that use in the exemplary embodiment of a 12-volt alternator is illustrative and not a limitation of the invention. For example, in one alternative embodiment, a 16-volt alternator could be used.

As depicted in FIG. 1, alternator 8 further comprises an alternator pulley wheel 7 mounted to alternator 8. In the exemplary embodiment, alternator pulley wheel 7 is a factory-set alternator v-belt pulley wheel with a 3.5 inch outer diameter.

The term "outer diameter" as used herein means the diameter measured from a point on the exterior perimeter of the subject component, such as a pulley, or a wheel, to a point on the opposite side of the exterior perimeter of the subject component.

It will be understood by someone with ordinary skill in the art that use in the exemplary embodiment of pulleys and wheels with particular inner and outer diameters described herein are illustrative and are not a limitation of the invention. In alternative embodiments, different inner- and outer-dimensioned pulleys and wheels could be used. However, as will be understood by someone with ordinary skill in the art, use of different inner- and outer-dimensioned pulleys and wheels could vary the gear ratios described in more detail below and could therefore impact the human-to-electrical power conversion ratios described in more detail below.

It will be understood by someone with ordinary skill in the art that the term wheel is sometimes used herein to refer to gear wheels. Gear wheels in the exemplary embodiment are identified in the figures as wheel 1, wheel 2, wheel 3, wheel 4, wheel 5, wheel 6, and an alternator pulley wheel 7. References to wheel 1, first geared sprocket wheel 1, manually-operated first gear wheel 1, and the like, will be understood to mean reference to gear wheel 1; references to wheel 2 will be understood to mean reference to gear wheel 2; references to wheel 3 will be understood to mean reference to gear wheel 3; references to wheel 4 will be understood to mean reference to gear wheel 4; references to wheel 5 and/or to flywheel 5 will be understood to mean reference to gear wheel 5; references to wheel 6 will be understood to mean reference to gear wheel 6; Wheels 20, such as depicted in, e.g., FIG. 2A, are transport wheels.

It will be further understood by someone with ordinary skill in the art that description of a particular type of gear wheel for a particular component of the exemplary embodiment is illustrative and non-limiting. For example, in the exemplary embodiment, as described further below, wheels 1 and 2 are geared sprocket wheels; wheels 3, 4 and 6 are pulley gear wheels; wheel 5 is a flywheel, Other types of gear wheels could be used in alternative embodiments. For example, in an alternative embodiment, wheels 1 and 2 could be pulley gear wheels; wheels 3, 4 and 6 could be geared sprocket wheels; flywheel 5 could be adapted to receive a pulley v-belt.

Figure 2A:
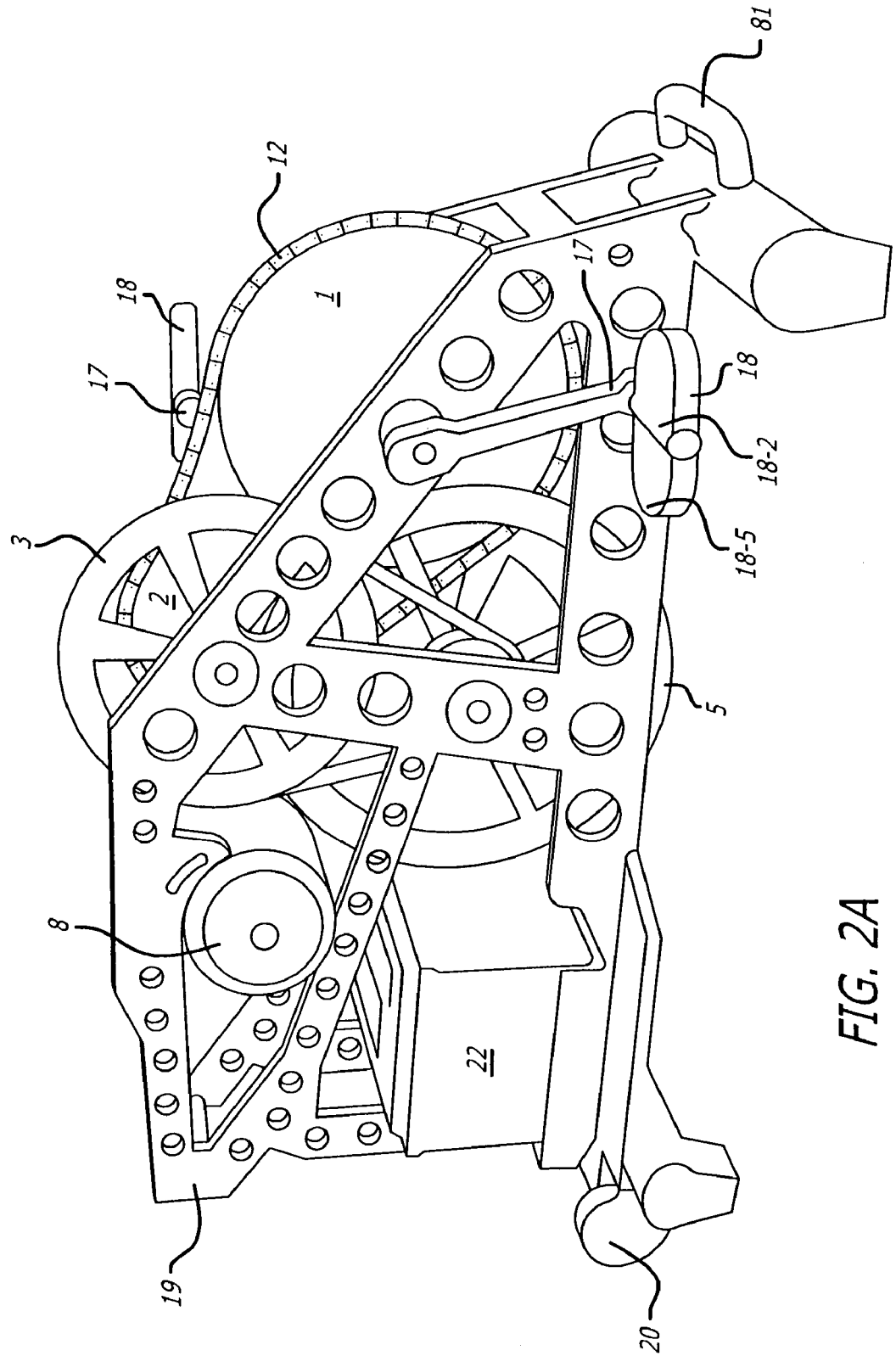
FIG. 2A is a perspective view of a left side of an assembled exemplary gear box transmission of the exemplary device for converting human power to electrical power in the exemplary embodiment of the present invention.
Figure 11:
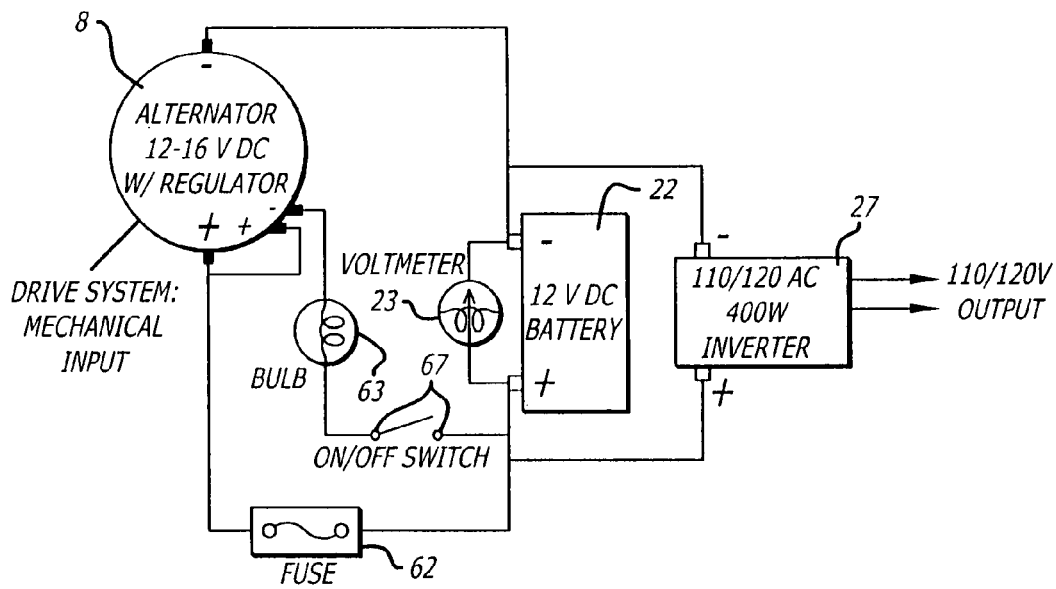
FIG. 11 is a schematic diagram of exemplary electrical components of the exemplary embodiment of the present invention.
Figure 12:
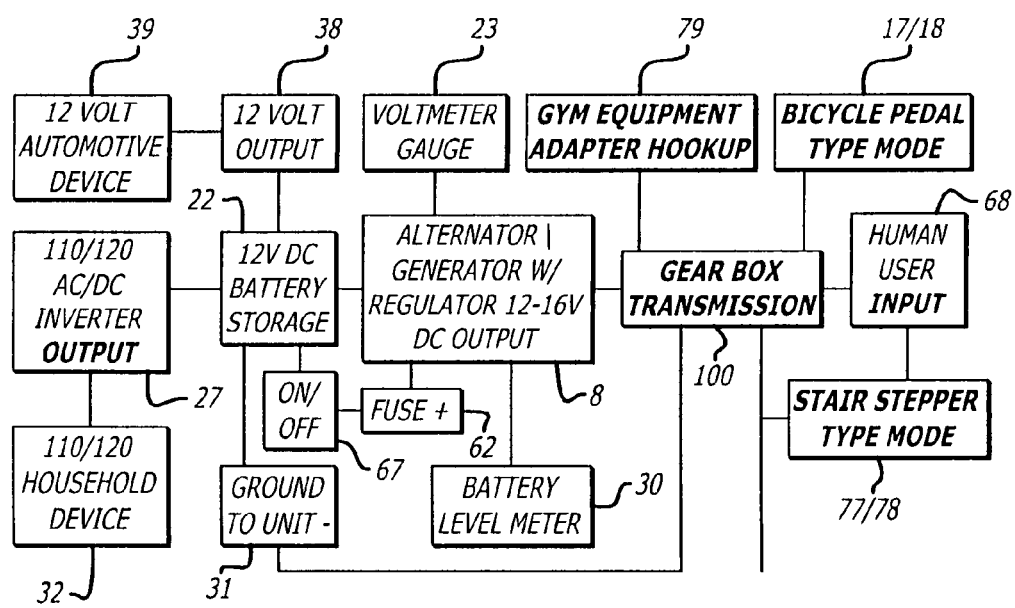
FIG. 12 is block diagram of exemplary electrical components of the exemplary embodiment of the present invention.

As will be discussed in more detail below, as depicted in FIGS. 11, 12, and 2A, alternator 8 is connected to a battery 22 for storing direct current electrical energy; battery 22 is connected to an inverter 27 for converting direct current electrical energy into alternating current electrical energy.

Returning with reference to FIG. 1, the exemplary embodiment of the present invention further provides a first wheel 1. In the exemplary embodiment, first wheel 1 is a geared sprocket (40B72) wheel with a twelve inch outer diameter.

In the exemplary embodiment, geared sprocket wheel 1 comprises an opening 41 disposed at the center of geared sprocket wheel 1, such as through which an axle can be inserted. In the exemplary embodiment, opening 41 has a three-quarter inch diameter; geared sprocket wheel 1 has an inner diameter of 0.75 inches.

The term "inner diameter" as used herein refers to the diameter of an opening in the center of a wheel, such as through which an axle can be inserted.

In the exemplary embodiment, a main drive axle 9 is inserted through opening 41. A first mechanical-operation means (see e.g., elements 17 and 18 in FIG. 2A) is mounted to one end of main drive axle 9. A second mechanical-operation means (see e.g., elements 17 and 18 in FIG. 2B) is mounted to the opposing end of main drive axle 9. In the exemplary embodiment depicted in FIG. 1, the first and second mechanical-operation means each comprise a foot pedal 18 mounted on a pedal arm 17, which is in turn mounted on main drive axle 9 using three 0.75 inch inner diameter inset bearings 16A, 16B, and 16C (See, e.g., FIGS. 15, 16, and 17).

Figure 14:
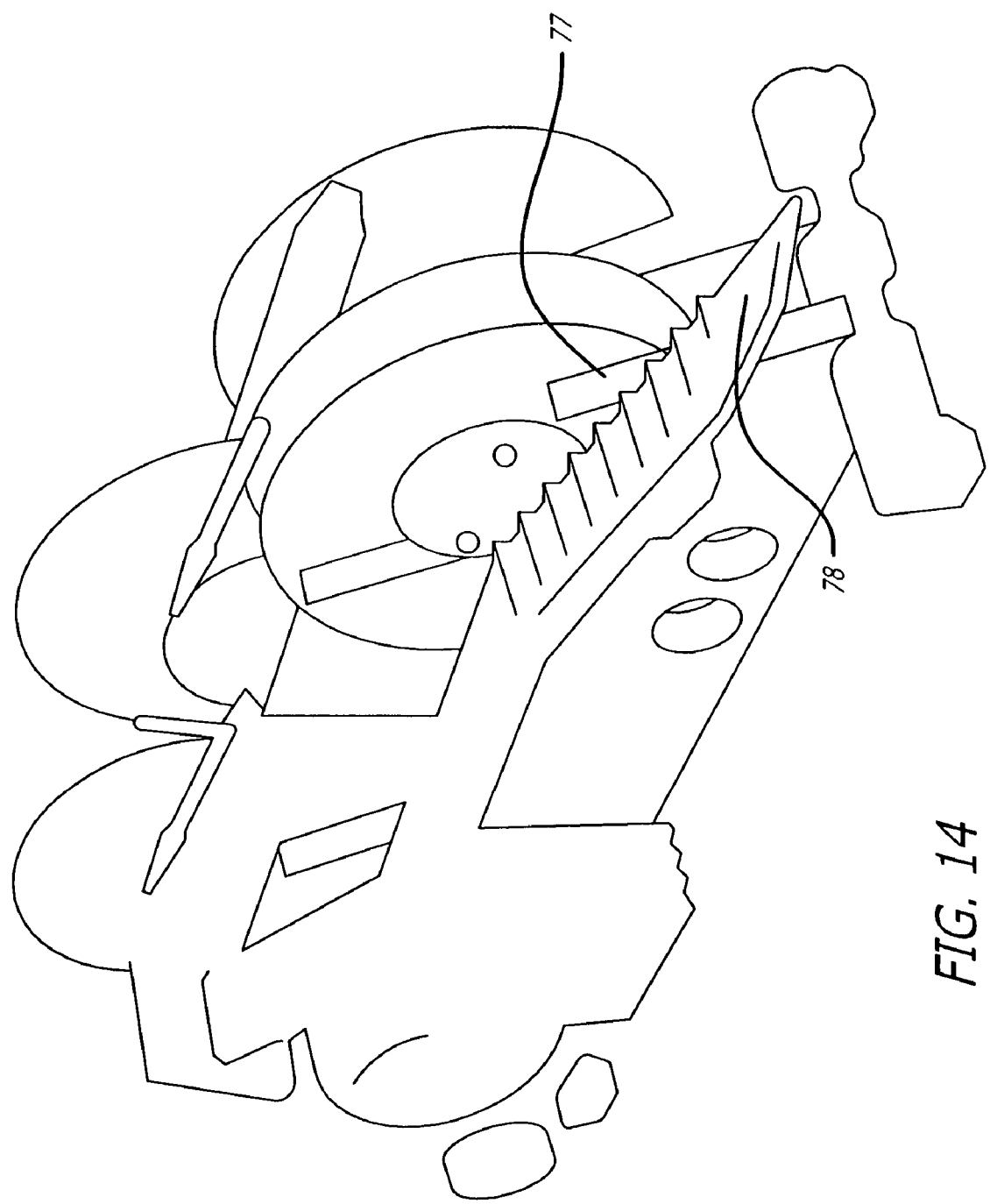
FIG. 14 is a perspective view of an alternative embodiment of the present invention in which exemplary elliptical-motion stair-stepper pedals have been attached to the exemplary main axle.

It will be understood by someone with ordinary skill in the art that use in the exemplary embodiment of manually-operated foot-pedals as mechanical-operation means is illustrative and not a limitation of the invention. For example, in the exemplary embodiment, as is further described below, manual-operation means 17 and 18 can also be hand-operated. In alternative embodiments, pedals could be provided that would be hand-operated but not foot-operated. In a further alternative embodiment, elliptical-exerciser pedals 78/77 could be used (see, e.g., FIG. 14). In a yet further alternative embodiment, stair-stepper pedals could be used. For alternative embodiments using manual-operation means that do not operate in a circular motion, an adapter between such manual-operation means and axle 9 would be provided.

Figure 15:
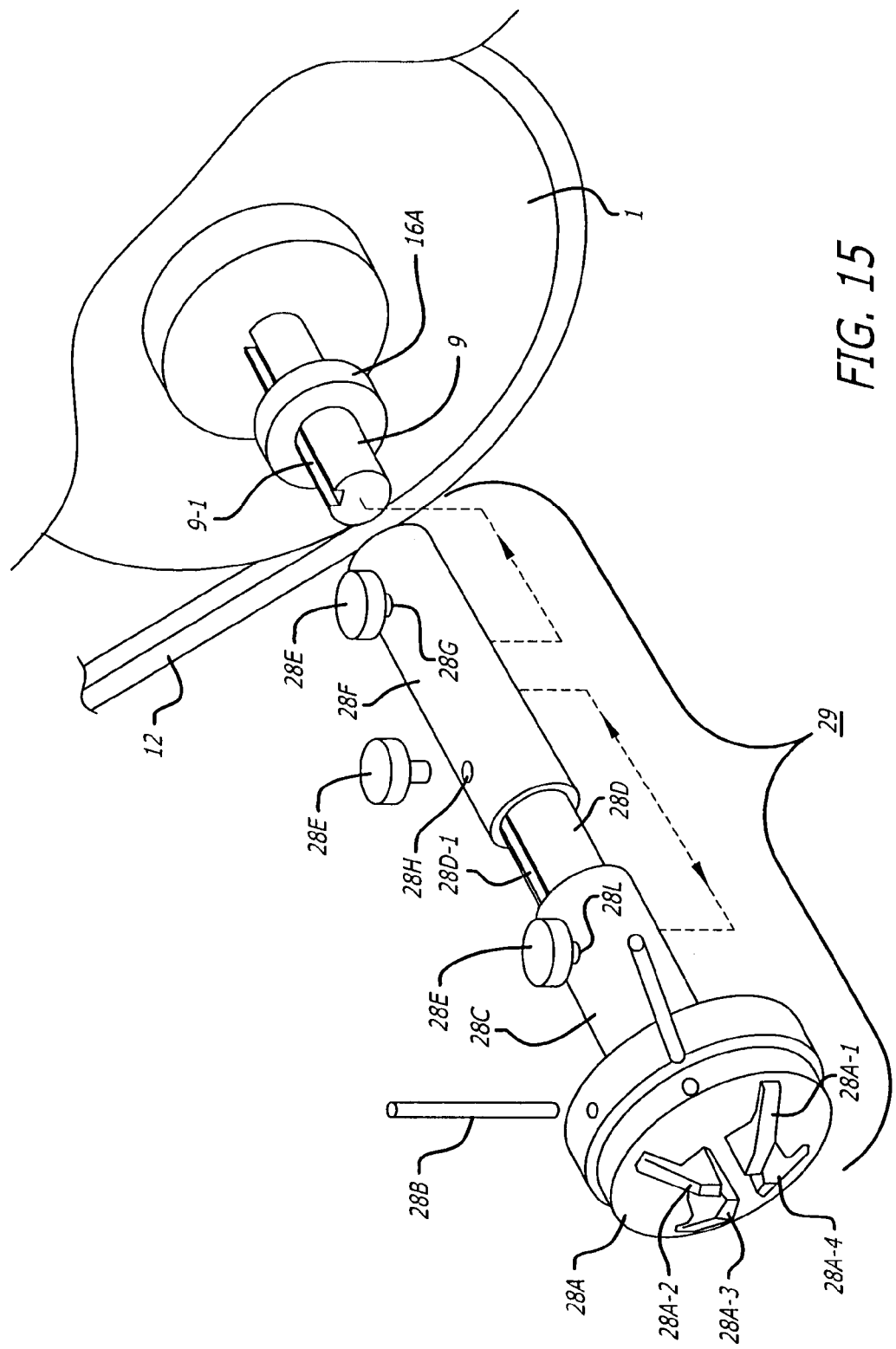
FIG. 15 is a perspective view of an exemplary rotary exercise equipment adapter for the exemplary embodiment of the present invention.
Figure 16:
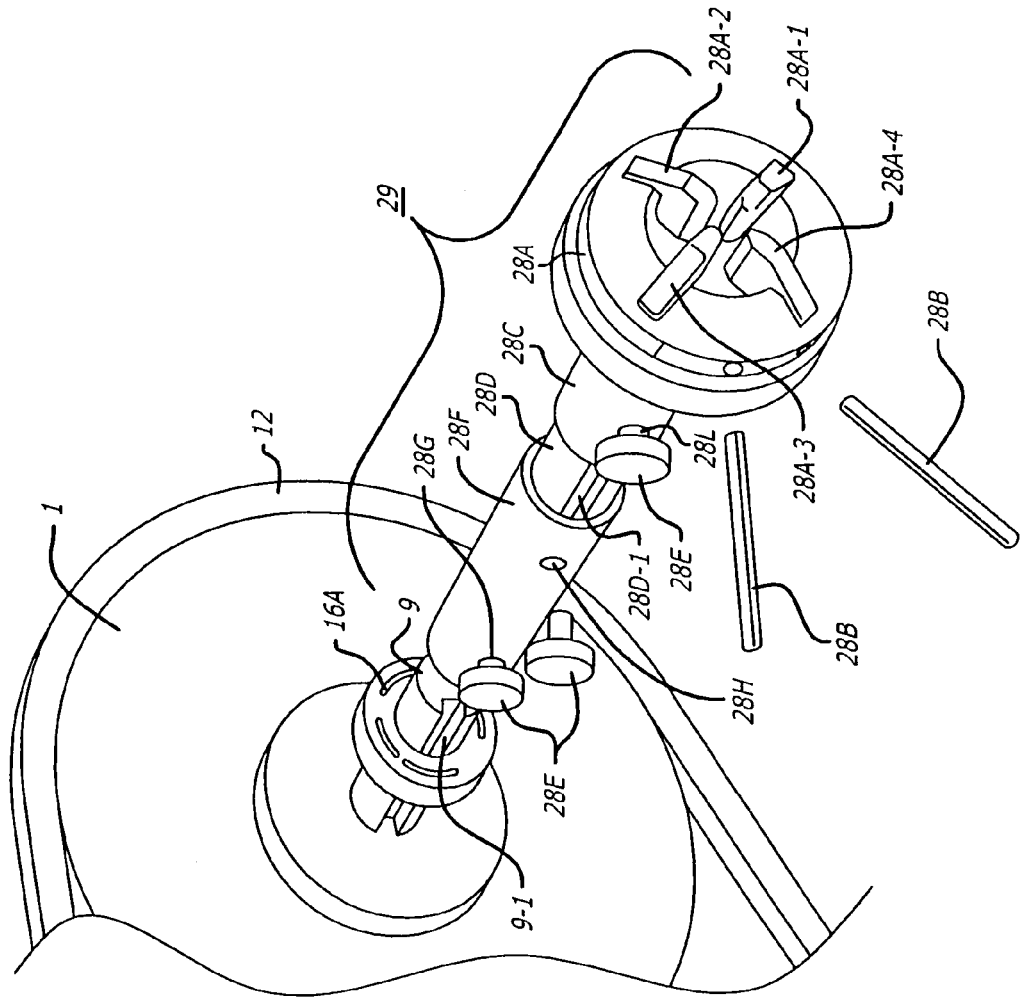
FIG. 16 is an enlarged perspective view of an exemplary rotary exercise equipment adapter for the exemplary embodiment of the present invention.

In the exemplary embodiment, with reference to FIGS. 12, 15 and 16, an adapter 79 is provided for connecting the exemplary embodiment to rotary motion exercise equipment, e.g., an exercise bicycle. Adapter 79 would be used as an alternative to manual-operation means 17 and 18.

As depicted in FIGS. 15 and 16, adapter 79 provides a grooved telescoping shaft 28D fitted in sleeve 28F. Shaft 28D provides a keyway groove 28D-1 that spans the length of shaft 28D. Screw 28E would be fastened through sleeve screw hole 28H in sleeve 28F and into groove 28D-1 to fasten sleeve 28F to shaft 28D. Axle 9 would also be provided with a keyway groove 9-1 adapted for receiving screws 28E. Screw 28E would be used to fasten sleeve 28F to axle 9 by fastening through sleeve screw hole 28G into axle groove 9-1. Telescoping sleeve 28C would be adjustably connected to shaft 28D by screwing a screw 28E through sleeve screw hole 28L in sleeve 28C into keyway groove 28D-1. Chuck (similar to a Sureline lathe chuck) 28A would be welded on, or machined as part of, telescoping sleeve 28C. Chuck keys 28B would be used to open chuck teeth 28A-1 through 28A-4 of chuck 28A to accept a center axle of a rotary exercise equipment device, such as for example, a center axle of an exercise bicycle wheel. Chuck keys 28B would then be used to tighten chuck teeth 28A-1 through 28A-4 over the subject exercise device center axle. Once chuck teeth 28A-1 through 28A-4 have been tightened, when the center axle of the subject exercise device is rotated, chuck 28A will be rotated, thereby rotating main axle 9, which will in turn rotate wheel 1 and the remainder of the gear box transmission 100.

In the exemplary embodiment, a second wheel 2, a third wheel 3, a fourth wheel 4, a fifth wheel 5, and a sixth wheel 6 are provided.

As depicted in FIG. 1, in the exemplary embodiment, second wheel 2 is a geared sprocket (40B45) wheel 2. In the exemplary embodiment, second geared sprocket wheel 2 has a seven inch outer diameter. In the exemplary embodiment, second geared sprocket wheel 2 comprises an opening 42 disposed at the center of second geared sprocket wheel 2; opening 42 has a three-quarter inch diameter. That is, second wheel 2 has an inner diameter of 0.75 inches.

As depicted in FIG. 1, third wheel 3 is a v-belt pulley wheel 3. In the exemplary embodiment, third wheel 3 has an outer diameter of 11.5 inches. In the exemplary embodiment, third wheel 3 provides an opening 43 disposed at the center of third wheel 3. In the exemplary embodiment, opening 43 has a diameter of 0.75 inches. That is, third wheel 3 has an inner diameter of 0.75 inches.

In the exemplary embodiment, a second axle 10 is disposed through opening 43 of third wheel 3 and through opening 42 of second wheel 2. In the exemplary embodiment, second axle 10 is a drive axle with an outer diameter of 0.75 inches. In the exemplary embodiment, second axle 10 is disposed through opening 42 of second wheel 2 and through center opening 43 of third wheel 3 such that second wheel 2 and the third wheel 3 are mounted on second axle 10.

As depicted in FIG. 1, in the exemplary embodiment, fourth wheel 4 is a v-belt pulley wheel. In the exemplary embodiment, fourth wheel 4 has an outer diameter of five inches. In the exemplary embodiment, an opening 44 is provided at the center of fourth wheel 4. In the exemplary embodiment, opening 44 has a diameter of 0.75 inches. That is, fourth wheel 4 has an inner diameter of 0.75 inches.

As depicted in FIG. 1, in the exemplary embodiment, fifth wheel 5 is a flywheel with a weighted rim 55. In the exemplary embodiment, fifth wheel has an outer diameter of 15.5 inches and weighs approximately fifteen pounds. In the exemplary embodiment, an opening 45 is provided at the center of fifth wheel 5. In the exemplary embodiment, opening 45 has a diameter of 0.75 inches. That is, fifth wheel 5 has an inner diameter of 0.75 inches.

Figure 6:
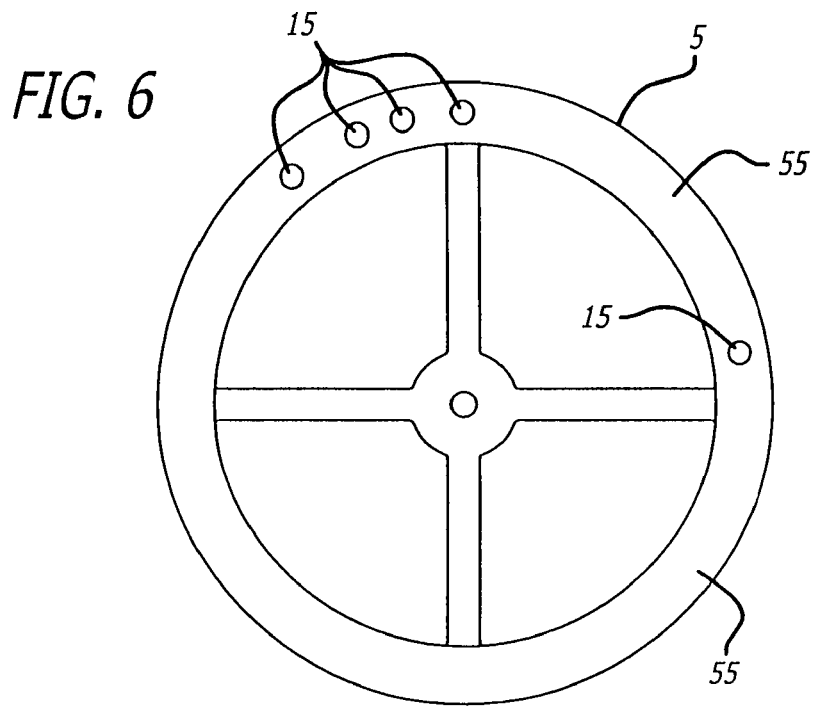
FIG. 6 is a plan view of an exemplary flywheel fifth wheel in the exemplary embodiment of the present invention.
Figure 7:
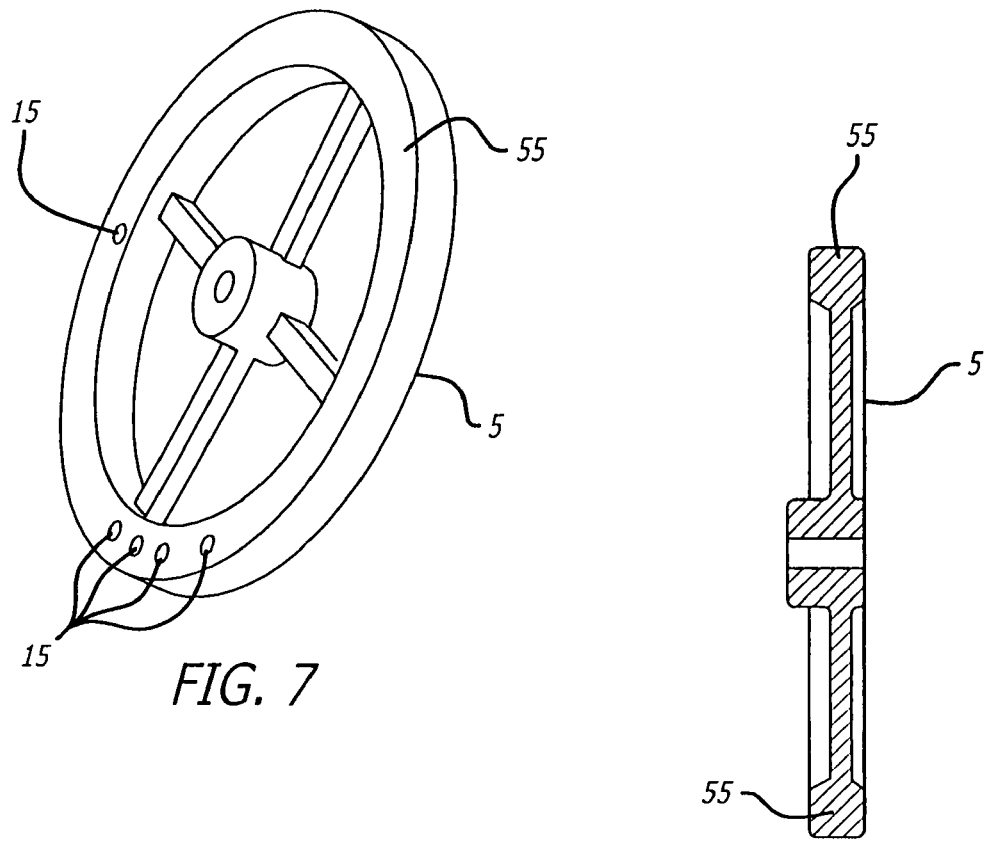
FIG. 7 is a perspective view of the exemplary flywheel fifth wheel in the exemplary embodiment of the present invention.
Figure 8:
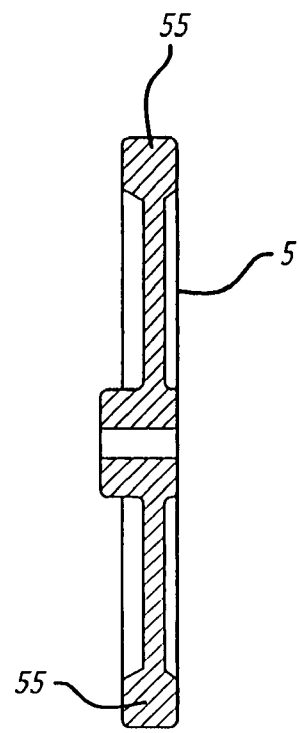
FIG. 8 is a cross-sectional view of the exemplary flywheel fifth wheel in the exemplary embodiment of the present invention.

FIGS. 6, 7, and 8 are a plan, perspective and cross-sectional views respectively of an exemplary centrifugal weighted flywheel fifth wheel 5 in the exemplary embodiment of the present invention. With reference to FIGS. 1, 6, 7 and 8, in the exemplary embodiment, fifth wheel 5 is machined with harmonic balancing holes 15. Harmonic balancing holes 15 in the exemplary embodiment traverse the entire width of the weighted rim 55 of fifth wheel 5. Harmonic balancing holes 15 would be disposed around the weighted rim 55 of fifth wheel 5 so that the weight of the rim 55 of fifth wheel 5 would be harmonically balanced to contribute to smooth operation of the exemplary embodiment of the present invention. Further, once the gear box transmission 100 is in motion, exemplary centrifugal weighted flywheel 5 will tend to keep the gear box transmission 100 in motion. Exemplary flywheel 5 would be made with spokes as opposed to a solid center. The exemplary spoked flywheel 5 is illustrative and is not a limitation of the invention.

As depicted in FIG. 1, in the exemplary embodiment, sixth wheel 6 is a v-belt pulley wheel. In the exemplary embodiment, sixth wheel 6 has an outer diameter of 11.5 inches. In the exemplary embodiment, an opening 46 is provided at the center of sixth wheel 6. In the exemplary embodiment, opening 46 has a diameter of 0.75 inches.

In the exemplary embodiment, a third axle 11 is disposed through opening 46 of sixth wheel 6, through opening 45 of fifth wheel 5, and through opening 44 of fourth wheel 4. In the exemplary embodiment, third axle 11 is a drive axle with an outer diameter of 0.75 inches. In the exemplary embodiment, third axle 11 is disposed through openings 46, 45 and 44 of sixth, fifth and fourth wheels 6, 5, and 4 respectively such that fourth, fifth and sixth wheels 4, 5 and 6 respectively are mounted on third axle 11 and such that fifth wheel 5 is mounted between fourth wheel 4 and sixth wheel 6.

In the exemplary embodiment, a first interconnecting means 12 is interconnectably mounted to first wheel 1 and second wheel 2. In the exemplary embodiment, first interconnecting means 12 is a number 40 geared sprocket chain 12. FIG. 3 is a perspective view of an exemplary geared sprocket chain interconnecting an exemplary first geared sprocket wheel and an exemplary second geared sprocket wheel in the exemplary embodiment of the present invention. In FIG. 1, arrow-headed lines labeled 112 depict a direction in which the geared sprocket chain 12 will be driven in the exemplary embodiment.

In the exemplary embodiment, interconnecting first wheel 1 to second wheel 2 with geared sprocket chain 12 results in a turning ratio for second axle 10, and therefore of the gear wheels mounted on second axle 10, of 1:1.71 (one to 1.71). That is, for each revolution of first wheel 1, second axle 10, and therefore the gear wheels mounted on second axle 10, revolve 1.71 times. Interconnected first wheel 1 with second wheel 2 is sometimes referred to herein as stage one, or the first gear stage.

In the exemplary embodiment, a second interconnecting means 13 is provided. In the exemplary embodiment, second interconnecting means 13 is a 0.5 inch v-belt (17480). FIG. 4 is a plan view of an exemplary first v-belt 13 interconnecting exemplary third and fourth wheels, 3 and 4 respectively, in the exemplary embodiment of the present invention. Arrow-headed lines labeled 113 in FIG. 1 depict a direction in which exemplary first v-belt 13 would be driven in the exemplary embodiment.

FIG. 5 is a cross-sectional view of exemplary third and fourth wheels, 3 and 4 respectively, in the exemplary embodiment of the present invention. As depicted in FIG. 5, grooves 33 in wheel 3, and 34 in wheel 4, are provided for receiving exemplary v-belt 13, as depicted in FIG. 4.

In the exemplary embodiment, interconnecting third wheel 3 to fourth wheel 4 with interconnecting means 13 results in a turning axle ratio of 1:3.93 (one to 3.93). That is, for each revolution of first wheel 1, third axle, and therefore the gear wheels mounted on third axle 11, revolves/revolve 3.93 revolutions. Interconnected third wheel 3 with fourth wheel 4 is sometimes referred to herein as stage two, or the second gear stage.

In the exemplary embodiment, as depicted in FIG. 1, a third interconnecting means 14 is provided. In the exemplary embodiment, third interconnecting means 14 is a 0.5 inch v-belt (15405).

Figure 9:
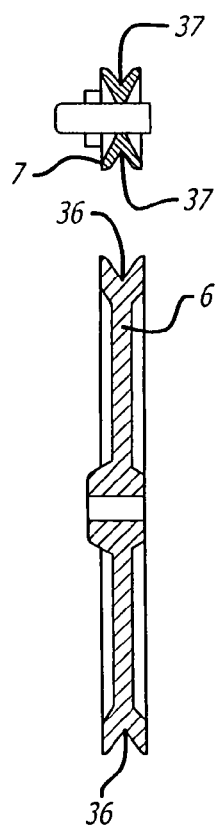
FIG. 9 is a cross-sectional view of an exemplary sixth wheel and an exemplary alternator pulley wheel in the exemplary embodiment of the present invention.

FIG. 9 is a cross-sectional view of an exemplary sixth wheel 6 and an exemplary alternator pulley wheel 7 in the exemplary embodiment of the present invention. As depicted in FIG. 9, grooves 36 in wheel 6 and 37 in alternator pulley wheel 7 are provided for receiving a v-belt, such as v-belt 14.

Figure 10:
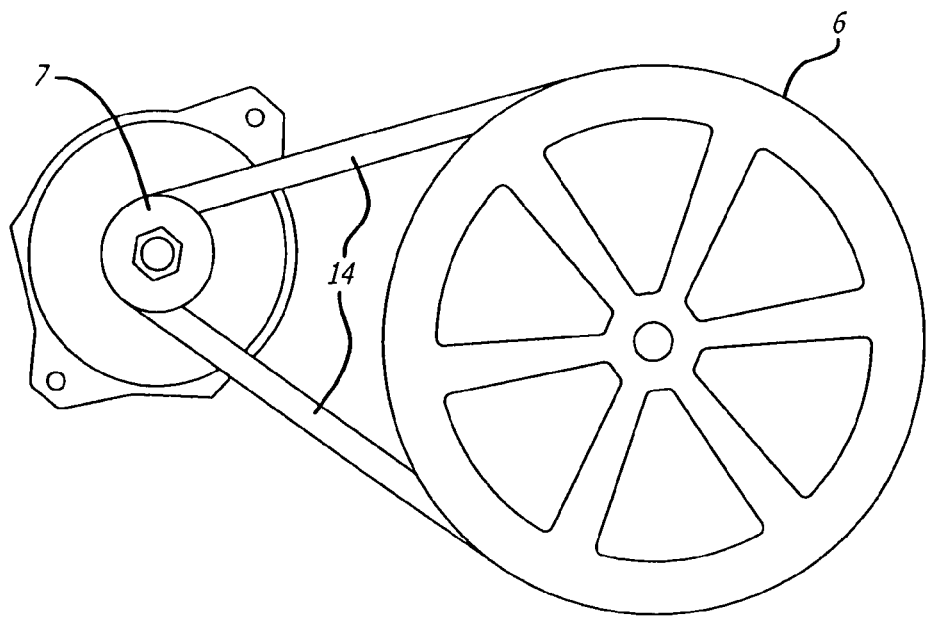
FIG. 10 is a plan view of an exemplary v-belt interconnecting the exemplary sixth wheel and the exemplary alternator pulley wheel in the exemplary embodiment of the present invention.

FIG. 10 is a plan view of an exemplary v-belt 14 interconnecting the exemplary sixth wheel 6 and the exemplary alternator pulley wheel 7 in the exemplary embodiment of the present invention. Interconnected sixth wheel 6 with alternator pulley wheel 7 is sometimes referred to herein as stage three, or the third gear stage.

As depicted in FIG. 10, in the exemplary embodiment, third interconnecting means 14 interconnects sixth wheel 6 to alternator pulley wheel 7. As previously mentioned above, in the exemplary embodiment, alternator pulley wheel 7 is a factory-set alternator v-belt pulley wheel with a 3.5 inch outer diameter. In FIG. 1, arrow-headed lines labeled 114 depict a direction in which third interconnecting means 14 would be driven in the exemplary embodiment.

In the exemplary embodiment, interconnecting sixth wheel 6 to alternator pulley wheel 7 with interconnecting means 14 results in a turning pulley wheel ratio for alternator pulley wheel 7 of 1:12.91 (one to 12.91). That is, for each revolution of first wheel 1, alternator pulley wheel 7 will revolve 12.91 times.

The interconnected wheels (elements 1 through 6; and 9 through 15) described above are sometimes collectively referred to herein as the gear-to-gear transmission assembly 100, or simply, the gear box transmission 100.

FIG. 11 is a schematic diagram of exemplary electrical components of the exemplary embodiment of the present invention. As depicted in FIG. 11, the alternator 8 is connected to a battery 22, which in the exemplary embodiment is a 12-volt battery. The battery 22 is connected to an inverter 27, which in the exemplary embodiment is a 110/120 AC 400 W inverter. According to the connection between the alternator 8, the battery 22, and the inverter 27, when electrical power is needed/being used through inverter 27, the power is obtained from battery 22. When more power is being generated through alternator 8 than is used through inverter 27, the power is stored in battery 22.

FIG. 12 is block diagram of exemplary electrical components of the exemplary embodiment of the present invention. As depicted in FIG. 12, the gear-to-gear transmission assembly/gear box transmission 100 is connected to the alternator 8, which is in turn connected, with a fuse 62 and an on/off switch 67, to battery 22, which is in turn connected to inverter 27. A voltmeter gauge 23 and a battery level meter 30 could be provided for readings. As depicted in FIG. 12, a household device or other appliance needing 110/120 household AC current could be connected to and run from electrical energy/power provided through inverter 27. Alternatively, battery 22 could also provide 12-volt output 38 for connection to devices, such as, for example, 12-volt automotive devices to power such devices.

As depicted in FIG. 12, human power 28 could be used to operate the gear box transmission 100 via foot pedals (specifically, a foot pedal 18 mounted on a pedal arm 17), via a stair-stepper mode 77, 78, or via an adapter 79 that would adapt rotary gym equipment, such as exercise bicycles, to power the device.

Figure 2B:
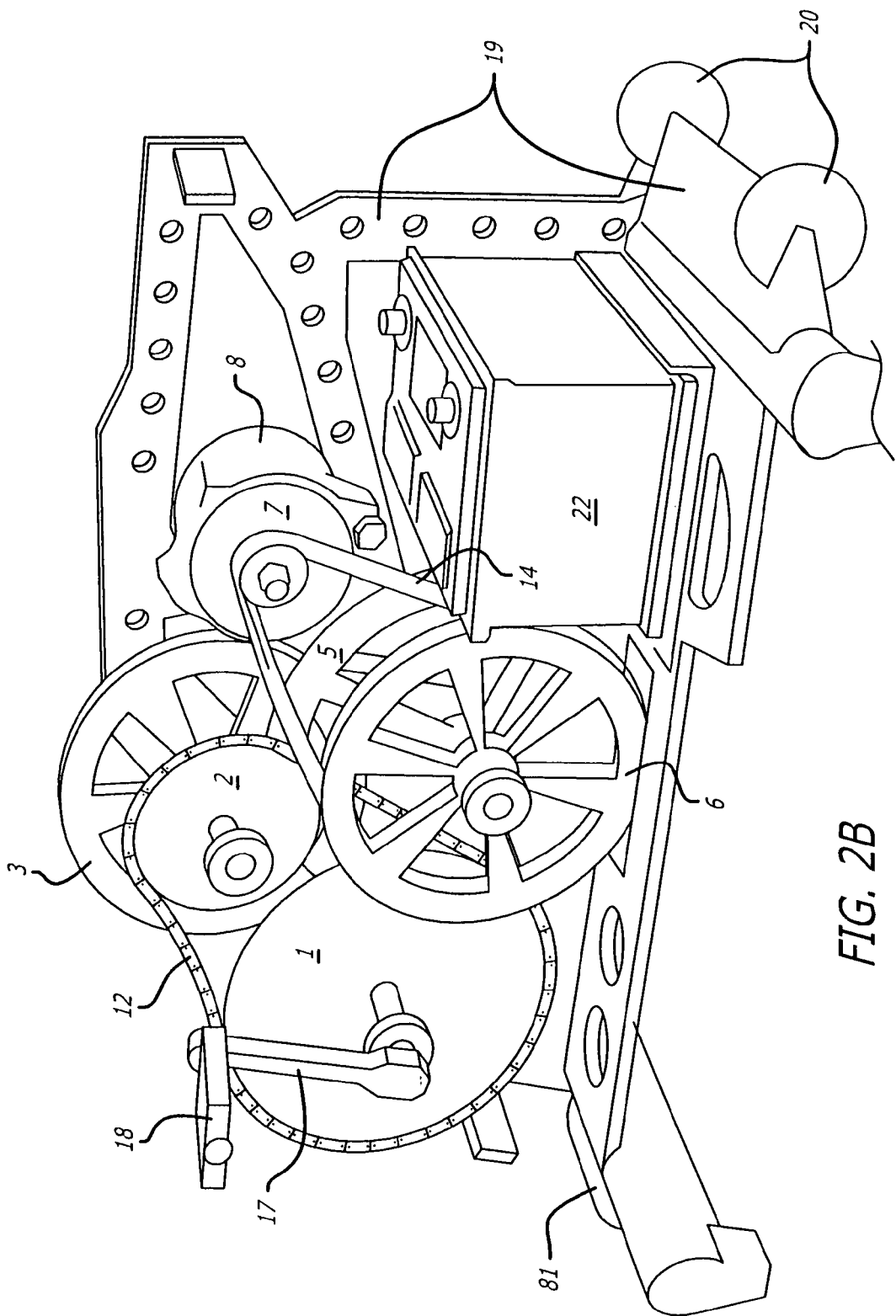
FIG. 2B is a perspective view of a right side of an assembled exemplary gear box transmission of the exemplary device for converting human power to electrical power in the exemplary embodiment of the present invention.
Figure 2C:
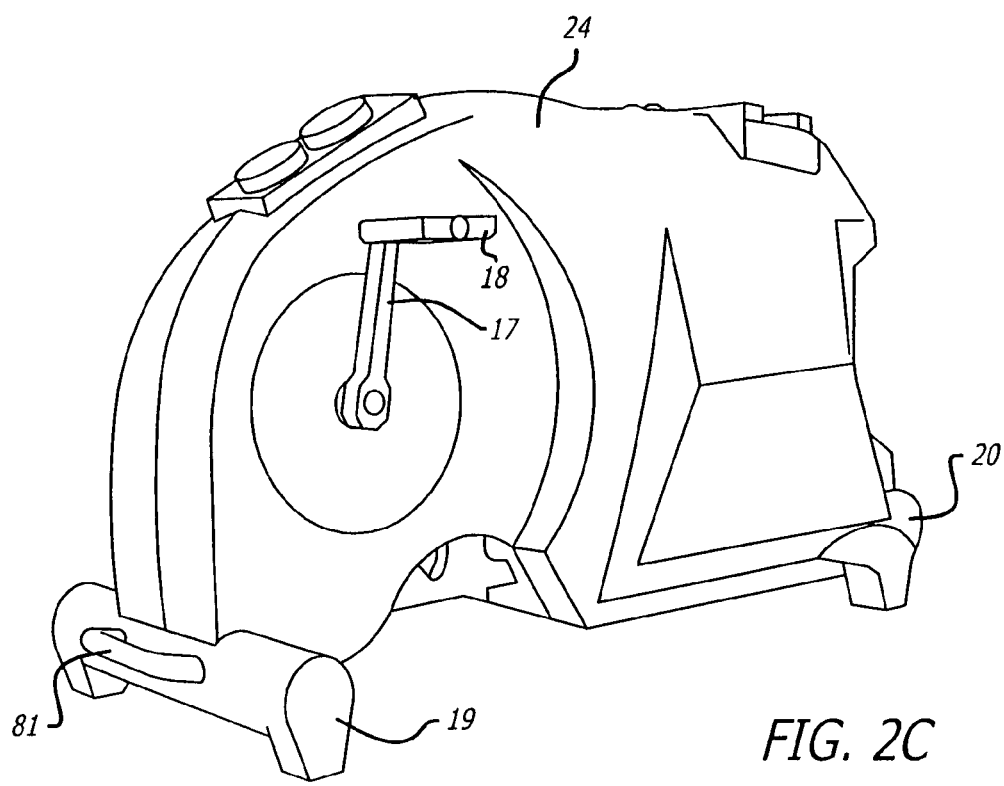
FIG. 2C is a perspective view of a right side of a fully-assembled exemplary device for converting human power to electrical power in the exemplary embodiment of the present invention.
Figure 2D:
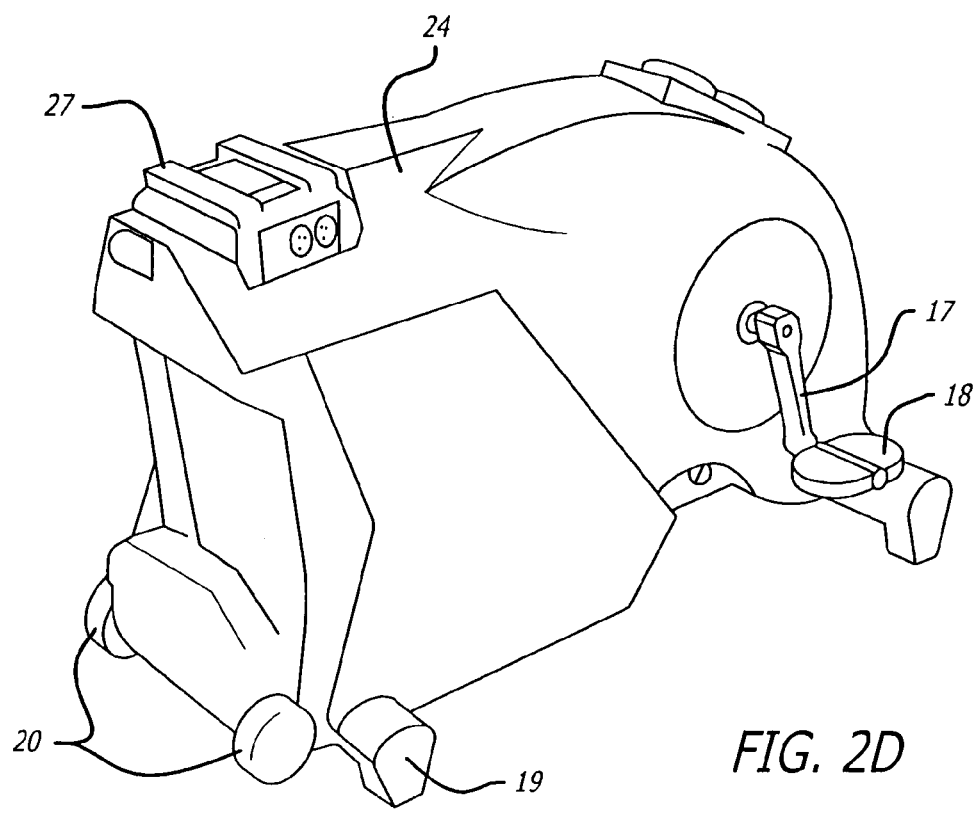
FIG. 2D is a perspective view of a left side of a fully-assembled exemplary device for converting human power to electrical power in the exemplary embodiment of the present invention.
Figure 2E:
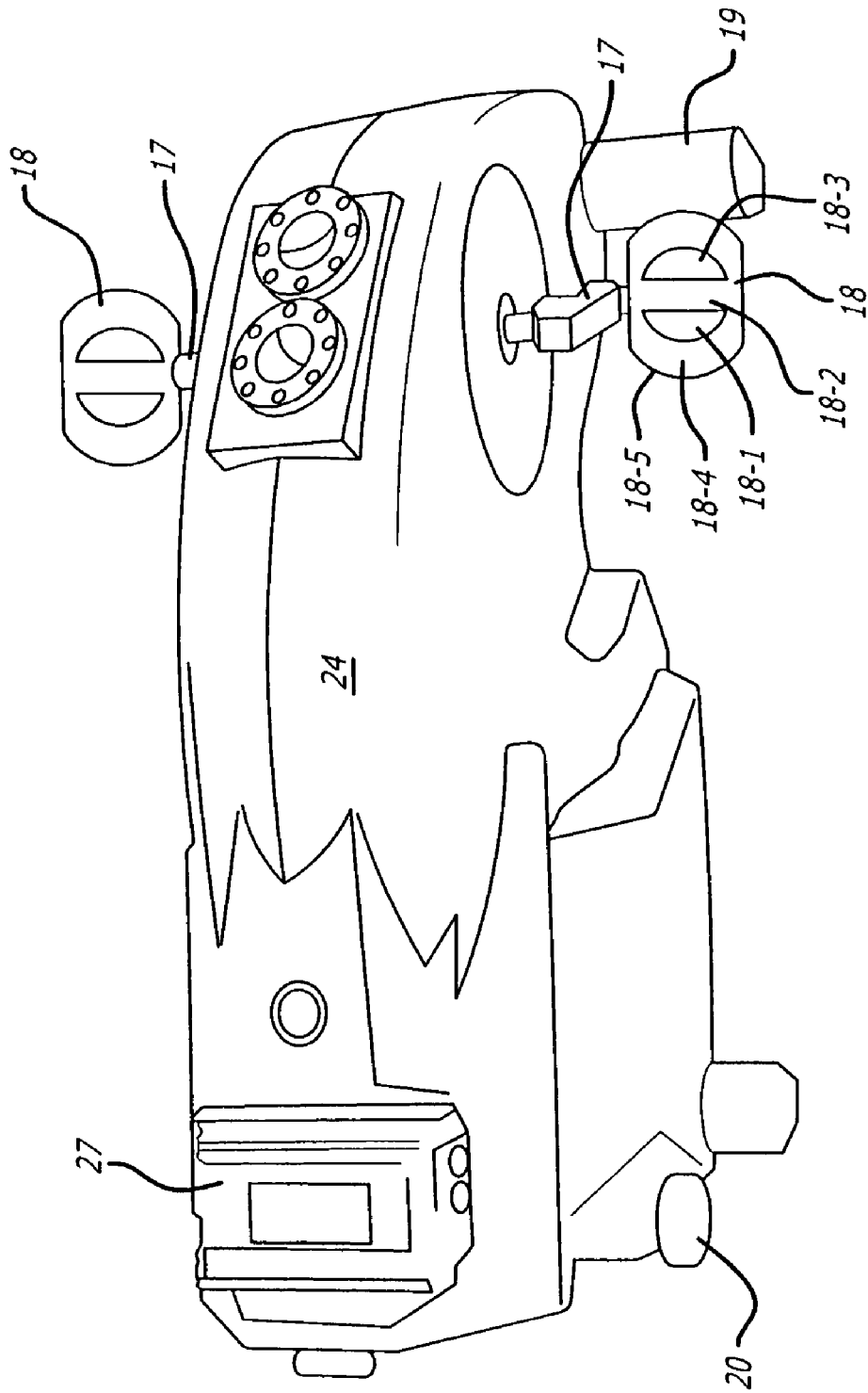
FIG. 2E is a perspective top view of a fully-assembled exemplary device for converting human power to electrical power in the exemplary embodiment of the present invention.

In the exemplary embodiment, it should be noted that the "foot" pedals 18 are adapted for use as either foot pedals, in which case a human foot would rest on top of the pedal, or as a hand pedal. With reference to FIG. 2E, each pedal of the exemplary embodiment provides a central cross-piece 18-2 which is adapted for receiving an arch of a human foot, or a palm of a human hand. A first opening 18-1 is adapted for receiving four fingers (index, middle, ring, and little fingers) of the human hand. A second opening 18-3 is adapted for receiving a thumb of the human hand. An inwardly sloping (sloping downwardly from the exterior perimeter 18-5 toward the center cross-piece 18-2) oblong ring 18-4 for cradling a ball and a heel of a human foot.

Figure 17:
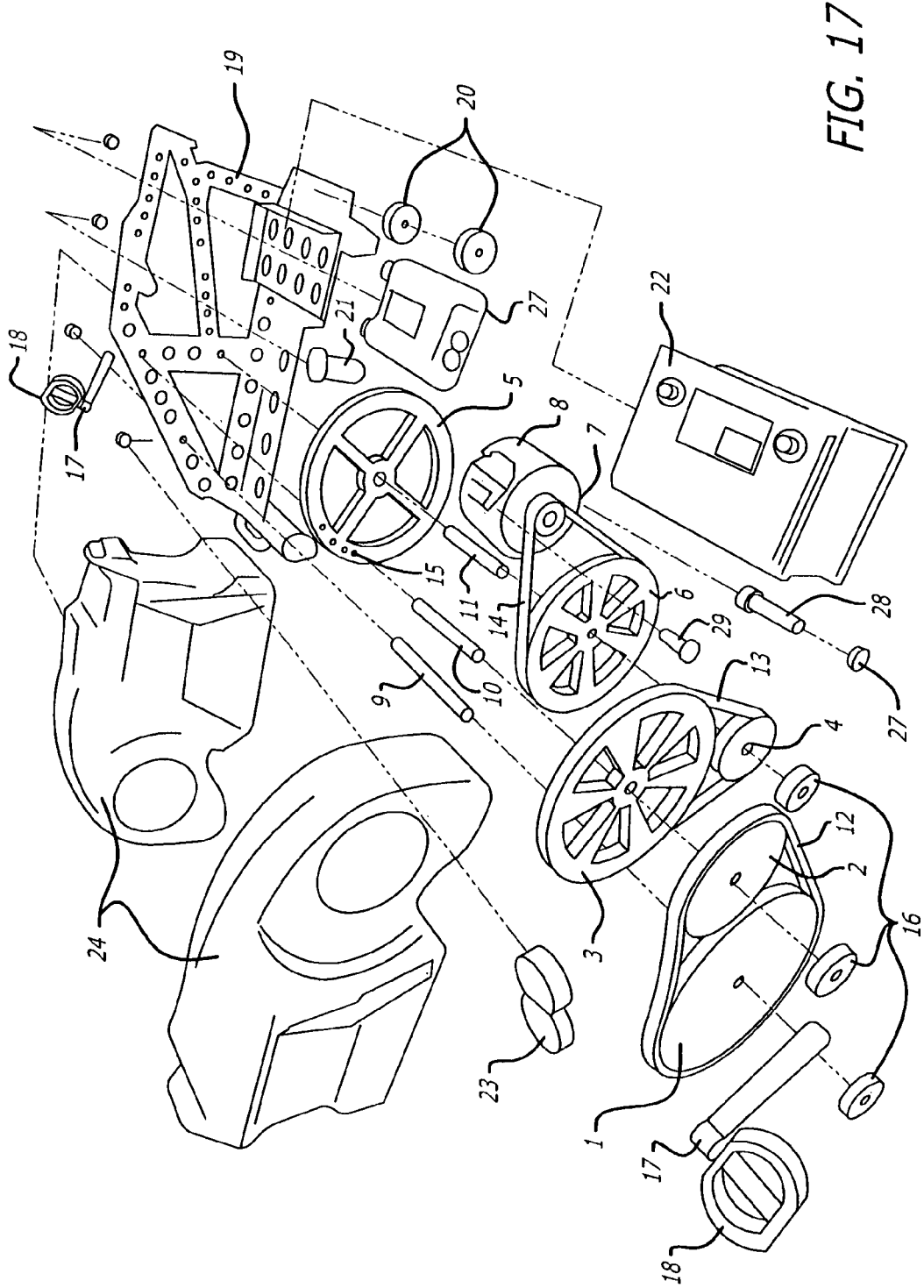
FIG. 17 is a perspective view of an unassembled exemplary embodiment of the present invention.

As depicted in e.g., FIGS. 2C, 2D, 2F and 17, the entire gear-to-gear transmission assembly/gear box transmission 100 is housed in the exemplary embodiment in a housing 24. As depicted in FIGS. 2A, 2B and 17, the entire gear-to-gear transmission assembly/gear box transmission 100 is mounted on a structural grid framework 19. Wheels 20 are mounted on structural grid framework 19 so that the entire device can be rolled on wheels 20. A handle 81 is provided. Most of the weight of the exemplary device is mounted near the wheels 20. Accordingly, the weight at the handle-end 81 of the device is fairly light. In one embodiment, handle 81 is a telescoping/retractable handle, such as is available for luggage—the telescoping shafts would be held in the framework underneath the device.

In order to use the exemplary device, a human user of the exemplary device could sit in a chair and place the entire housed gear-to-gear transmission assembly 100 in front of the chair. The human user would then place the user's respective feet on the respective exemplary foot pedals 18 and pedal the device in a bicycle-pedaling mode.

In order to generate a 12.5 voltage output on the alternator, approximately 1100 revolutions per minute (RPMs) of the alternator pulley wheel 7 are needed.

If the human user were to then pedal seventy (70) revolutions per minute, the above-described gear-to-gear ratio of the entire assembly (1:12.91) would result in 875 revolutions per minute of the alternator pulley wheel 7.

If the human user were to pedal ninety (90) revolutions per minute, the above-described gear-to-gear ratio of the entire assembly (1:12.91) would result in 1125.9 revolutions per minute of the alternator pulley wheel 7.

Therefore, with a moderate level of pedaling, averaging ninety (90) revolutions per minute or so, the 1100 RPMs necessary to achieve a 12.5 voltage output on the alternator would be achieved.

The revolutions per minute of the human user (e.g., 90) are multiplied by the exemplary gear-to-gear transmission assembly 100. The multiplication of power is accomplished by the exemplary ratios of the outer diameters of the various interconnected wheels, including the alternator pulley wheel. Specifically, in the exemplary embodiment, a larger wheel 1 with an outer diameter of twelve (12) inches is used to drive, via the geared sprocket chain 12, a smaller wheel 2 with an outer diameter of only seven (7) inches. It is the outer diameter ratio of the two wheels (12/7) that results in the multiplication of one revolution of wheel 1 resulting in 1.71 revolutions of wheel 2.

In the exemplary embodiment, wheel 2 with an outer diameter of only seven (7) inches, is connected via drive axle 10 to a much larger wheel 3 with an outer diameter of 11.5 inches. By virtue of the axle 10 connection of smaller wheel 2 to larger wheel 3, each revolution of wheel 1 results in 1.71 revolutions of not only wheel 2, but also of larger wheel 3.

In the exemplary embodiment, larger wheel 3 is then connected with v-belt 13 to smaller wheel 4 with an outer diameter of only five (5) inches. The outer diameter ratio of wheel 3 as compared to wheel 4 (11.5/5) results in the multiplication of one revolution of wheel 3 resulting in 2.3 revolutions of wheel 4. Therefore, for each revolution of wheel 1, wheel 4 revolves 3.93 times (1.71 times 2.3).

In the exemplary embodiment, smaller wheel 4 is connected via drive axle 1.1 to both flywheel 5 and larger wheel 6. By virtue of the drive axle 11 connection of smaller wheel 4 to larger wheel 6, for each revolution of wheel 4, wheel 6 also revolves one time. In the exemplary embodiment, wheel 6 has an outer diameter of 11.5 inches. Wheel 6 is connected to alternator pulley wheel 7 via v-belt 14. Alternator pulley wheel 7 has an outer diameter of only 3.5 inches. Therefore, for each complete revolution of wheel 6, alternator pulley wheel 7 will revolve 3.285 times (11.5/3.5=3.285). Therefore, for each complete revolution of wheel 1, alternator pulley wheel 7 will revolve 12.91 times (1.71 times 2.3 times 3.285=12.91).

It will be understood by someone with ordinary skill in the art that varying the outer diameters of the various interconnected wheels and the alternator pulley wheel could result in higher or lower RPMs as the case may be.

For example, in an alternative embodiment, fifth wheel flywheel 5 could be modified to itself accept an interconnecting means, such as a v-belt. In such an embodiment, a v-belt would interconnect fifth wheel flywheel 5 to alternator pulley wheel 7. Such a modification would result in an overall turn ratio of 1:16.51 for the gear-to-gear transmission assembly 100. The 1:16.51 ratio would achieve 1320.80 RPMs for 80-pedal-revolutions of wheel 1 per minute.

In a further alternative embodiment, wheel 6 would be provided with a sixteen inch outer diameter; the flywheel would be removed from between wheel 6 and wheel 4 and would be mounted instead to alternator pulley wheel 7.

Compactness of the gear box transmission 100 is achieved in the exemplary embodiment by pairing large wheels with smaller wheels which are in turn connected via drive axles to larger wheels. As can be seen in, e.g., FIG. 3, the outer rim 1-1 of wheel 1 is separated from the outer rim 2-1 of wheel 2 by a distance 48.

Figure 13A:
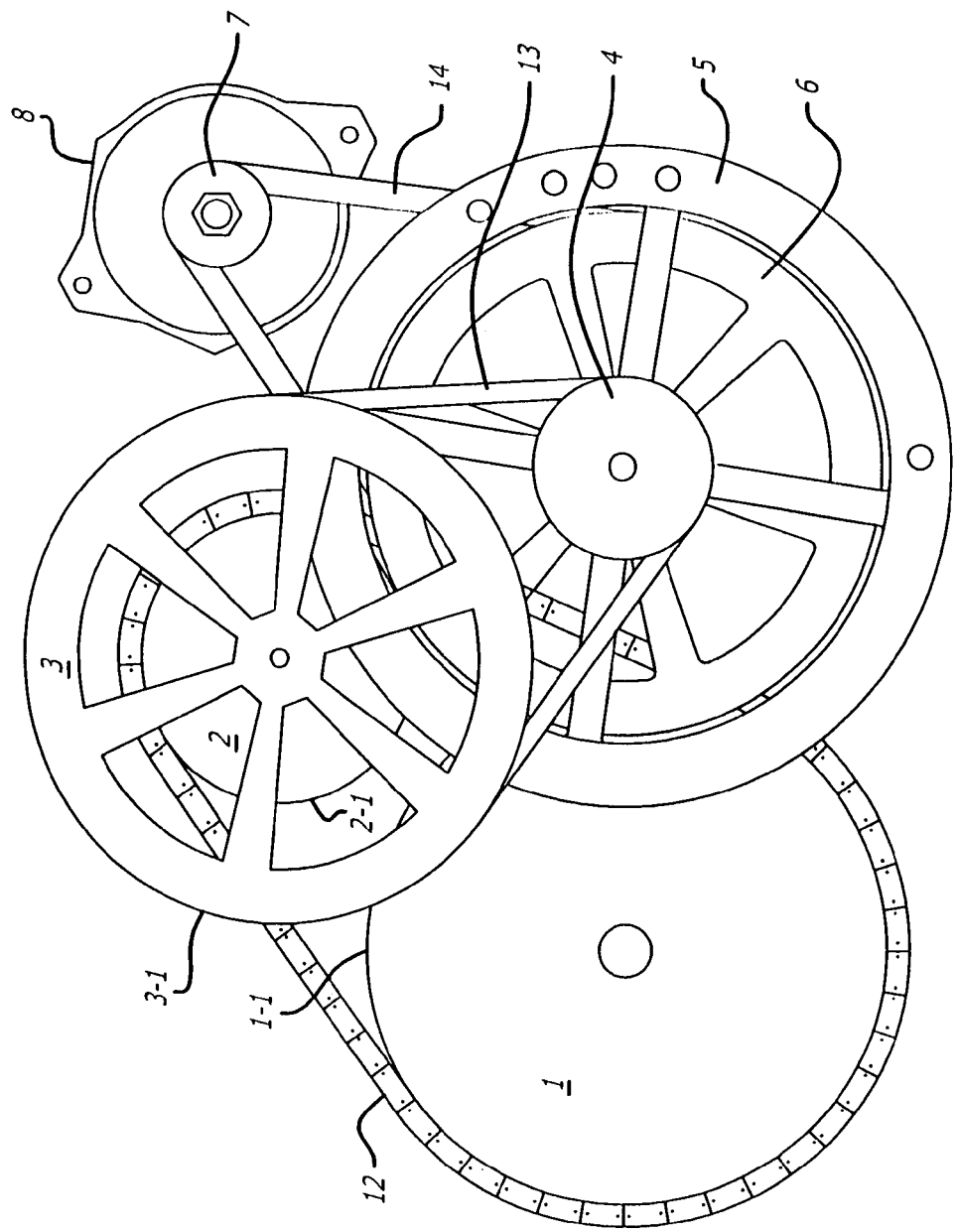
FIG. 13A is a right side plan view depicting exemplary layers of gears in the exemplary embodiment of the present invention.
Figure 13B:
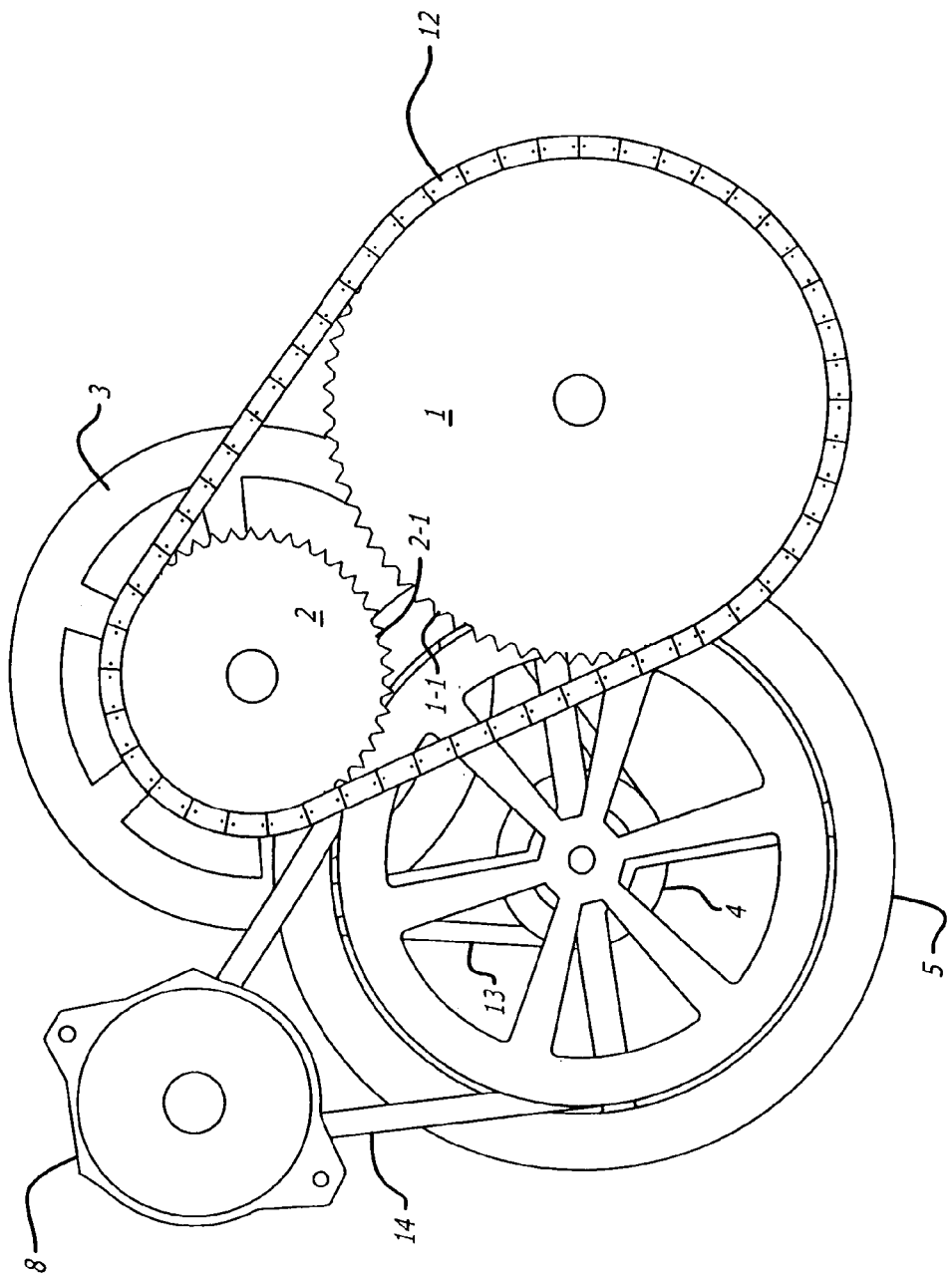
FIG. 13B is a left side plan view depicting exemplary layers of gears in the exemplary embodiment of the present invention.

FIGS. 13A and 13B depict compact layering of the three gear stages (stages one, two and three) of the exemplary embodiment. FIG. 13A is a right side plan view depicting exemplary layers of gears in the exemplary embodiment of the present invention. FIG. 13B is a left side plan view depicting exemplary layers of gears in the exemplary embodiment of the present invention.

Because the outer diameter of wheel 3 (in the exemplary embodiment, 11.5 inches) is smaller than the diameter of wheel 1 (in the exemplary embodiment, 12 inches), and because the outer rim 1-1 of wheel 1 is separated from the outer rim 2-1 of wheel 2 by a distance 48 (see FIG. 3), side-by-side mounting of wheel 3 on a common axle (10) with wheel 2 does not result in an interfering overlap with respect to the position of wheel 1 or with mechanical-operating means attached to an axle (9) mounted in wheel 1.

Similarly, the assembly of wheels 4, 5 and 6 on a single axle 11, and aligning the rim of wheels 4 and 3 for receipt of v-belt 13 does not result in any interference as between wheels 3, 4, 5 and/or 6, or with respect to wheels 2 and 1.

The exemplary device and its gear ratios balance high front-end torque with high-speed low torque at the back-end of the device. Alternative gear ratios could be used without departing from the spirit of the invention, but could result in alternative front-end torque or back-end speed. (Reference to the front-end of the device is meant to refer to the wheel 1/handle 81 end of the device; reference to the back-end of the device is meant to refer to the alternator 8/battery 22 end of the device).

Figure 21:
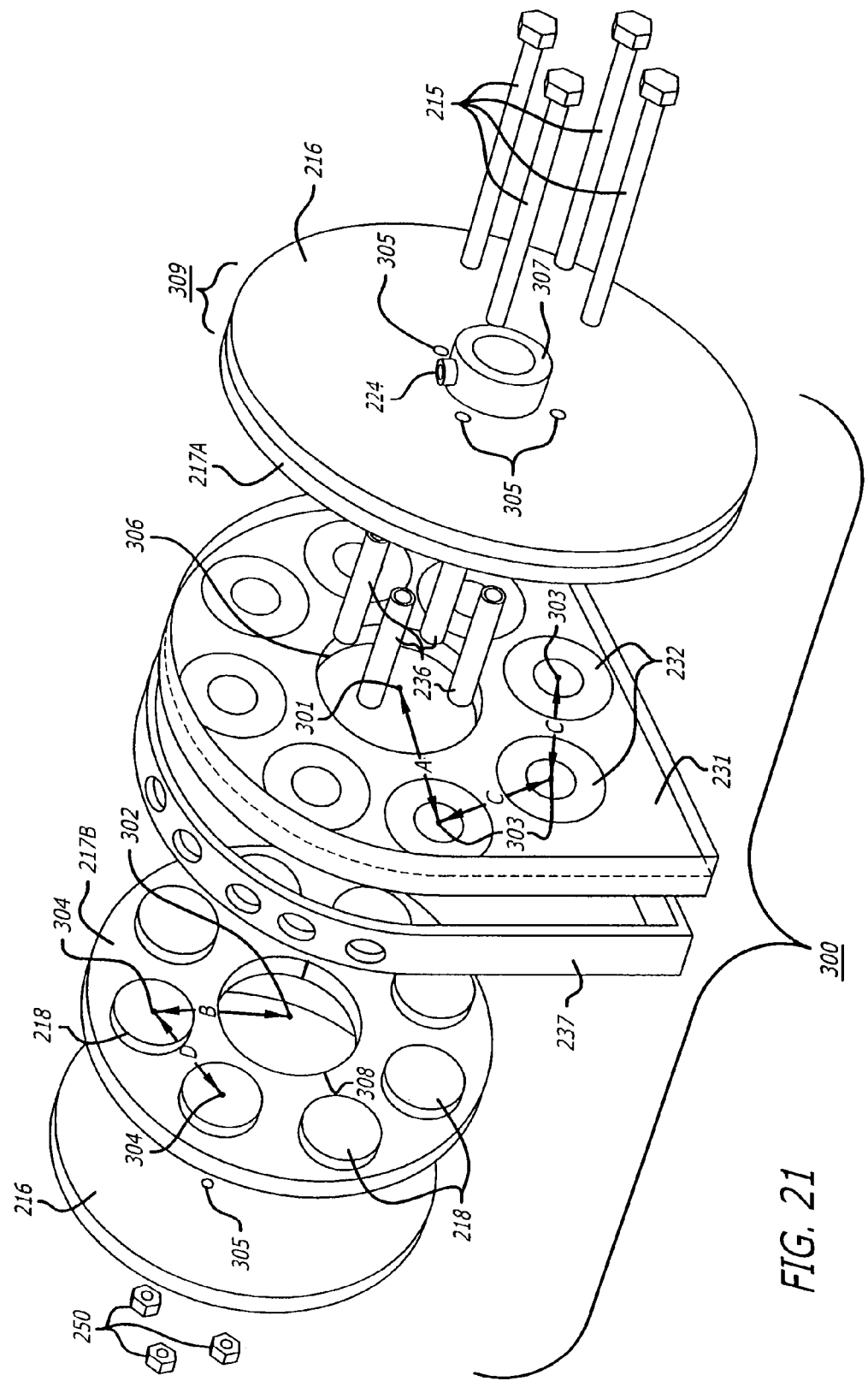
FIG. 21 is an exploded perspective view of exemplary components of an exemplary permanent magnet generator assembly of the further alternative exemplary device in the exemplary PMG embodiment of the present invention.
Figure 22:
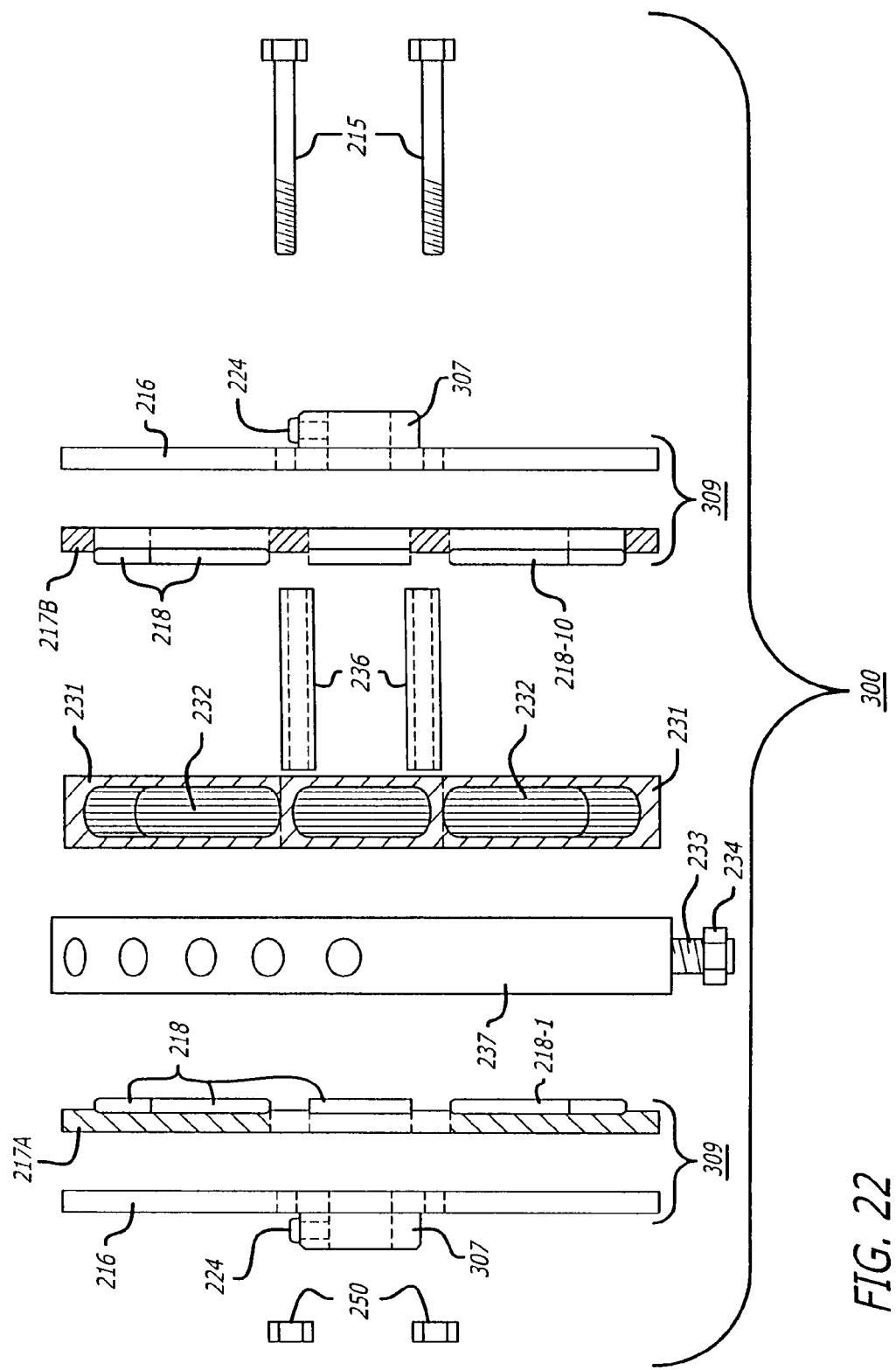
FIG. 22 is an exploded front plan view of exemplary components of the exemplary permanent magnet generator assembly of the further alternative exemplary device in the exemplary PMG embodiment of the present invention.

A yet further alternative exemplary embodiment (sometimes referred to herein as the "PMG embodiment" or as the "exemplary PMG embodiment") of the present invention is described. In the exemplary PMG embodiment of the present invention, instead of a simple flywheel gearwheel (element 5, e.g., FIG. 1) and a separate, self-contained alternator (element 8, e.g., FIG. 1) (such as an automotive alternator) as was employed in the exemplary embodiment, an exemplary permanent magnet generator (also sometimes referred to herein as a "PMG") assembly 300 such as is depicted in FIGS. 21 and 22, is used. In the exemplary PMG embodiment of the present invention, a portion of the permanent magnet generator assembly 300 acts as one of the gear wheels. Further, the permanent magnet generator assembly 300, when operated, generates electrical power in the form of alternating current (AC). Therefore, because it generates electrical power in the form of alternating current, the permanent magnet generator assembly 300 is an "alternator". Accordingly, as compared to a simple flywheel gearwheel (element 5, e.g., FIG. 1) and a separate, self-contained alternator (element 8, e.g., FIG. 1) (such as an automotive alternator) as was employed in the exemplary embodiment, in the exemplary PMG embodiment of the present invention, the alternator is integral to the gear wheel comprising, in part, the permanent magnet generator assembly 300.

The permanent magnet generator assembly 300 will generate low voltage, "three phase" AC. In the exemplary PMG embodiment of the present invention, as will be discussed further below, the alternating current generated by operating the permanent magnet generator assembly 300 will be changed into "direct current" (DC) for charging a 12 volt battery (See, e.g., element 243, FIG. 18).

Figure 18:
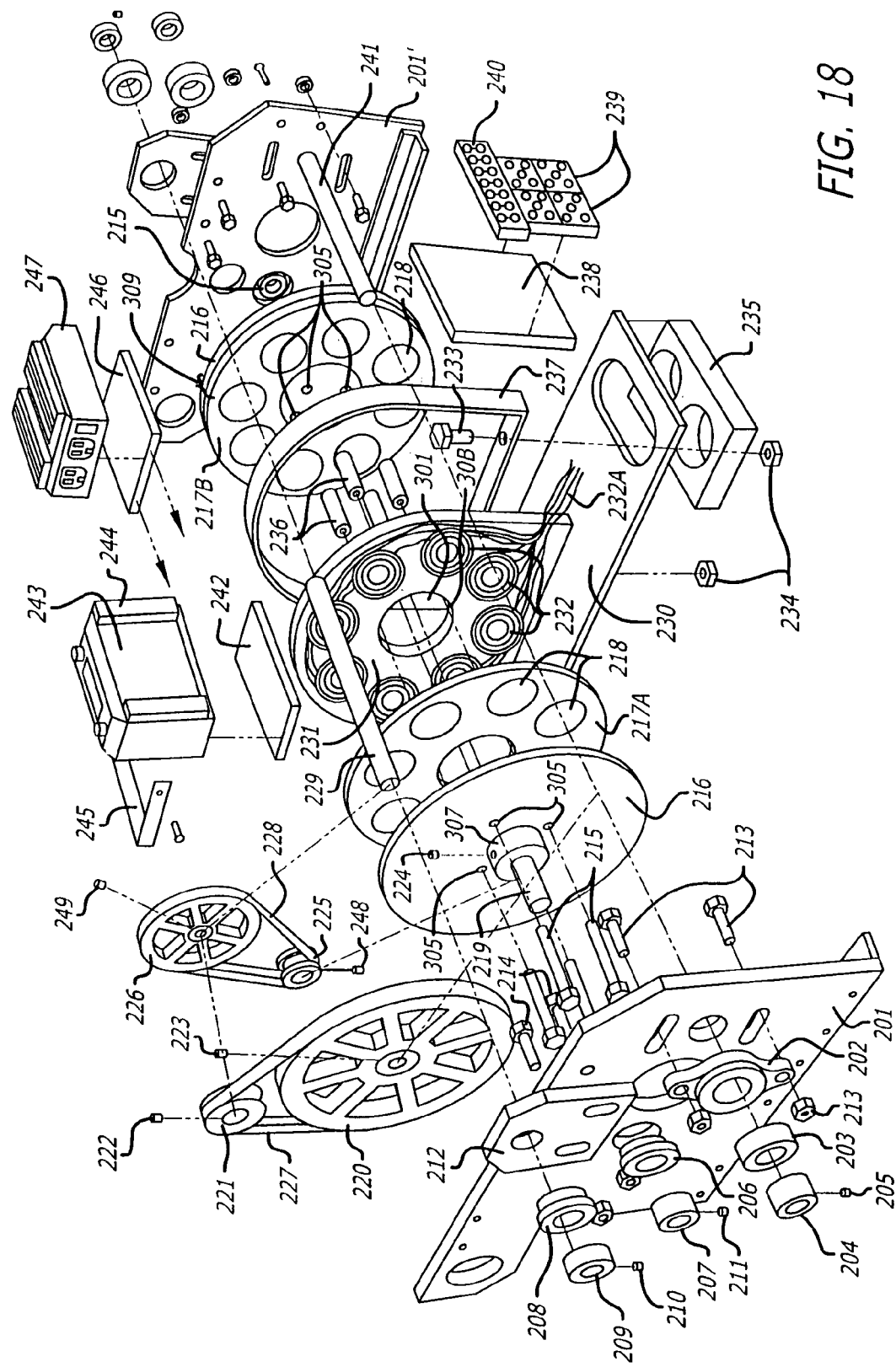
FIG. 18 is an exploded perspective view of further alternative exemplary gear box transmission components of a further alternative exemplary device for converting human power, or mechanical power, to electrical power in a yet further alternative exemplary embodiment (sometimes referred to herein as the "PMG embodiment" or the "exemplary PMG embodiment") of the present invention.

FIG. 18 is an exploded perspective view of further alternative exemplary gear box transmission components, including the exemplary permanent magnet generator assembly 300, of the further alternative exemplary device for converting human power, or mechanical power, to electrical power in the exemplary PMG embodiment of the present invention.

Returning with reference to FIGS. 21 and 22, the exemplary permanent magnet generator assembly element 300 comprises a stator 231 and two rotors (217a and 217b). (Reference herein to a rotor 217 will be understood to apply to each of the two rotors 217a and 217b).

The stator 231 of the exemplary PMG assembly 300 comprises a high-temperature epoxy into which is imbedded a plurality of coils 232 of wire; a center hole 306 of stator 231 is provided. In the exemplary permanent magnet generator assembly 300, eight coils 232 of wire are provided. In the exemplary PMG assembly 300, each coil 232 comprises two-hundred (200) winds of 16-gauge coated magnet wires. Each coil 232 forms substantially a circle with a center point 303; each coil 232 measures approximately one-and-one-half inches in diameter. In the exemplary PMG assembly 300, the coils 232 are imbedded in the stator equidistant from a center point 301 of the stator 231 so that the center point 303 of each coil 232 is substantially the same distance from center point 301 of the stator 231. The distance that the center point 303 of a coil 232 is positioned from center point 301 will be referred to as "Radius A."

In the exemplary PMG assembly 300, each coil 232 is separated from a coil 232 on either side by a substantially standard distance, referred to herein as "Distance C." In the exemplary PMG assembly 300, the center point 303 of a first coil 232 is Distance C from the center point 303 of each coil 232 on either side of the first coil 232.

In the exemplary PMG assembly 300, the stator 231 is encased around its perimeter in an aluminum stator casing 237; the exemplary aluminum stator casing 237 comprises aluminum that is approximately one-eighth of an inch thick, and is approximately one inch wide.

In the exemplary PMG assembly 300, each rotor 217 comprises a high-temperature epoxy into which is imbedded eight permanent magnets 218. In the exemplary PMG assembly 300, each rotor 217 comprises a disk of epoxy that measures approximately twelve inches in diameter having a center 302. In the exemplary PMG assembly 300, a center hole 308 is provided in each rotor 217.

In the exemplary PMG assembly 300, each permanent magnet 218 comprises a high-quality neodymium magnet measuring approximately one-half inch thick, and one-and-one-half inch in diameter with a center 304. In the exemplary PMG assembly 300, the permanent magnets 218 are imbedded in the respective rotor 217 at a substantially standard distance; the substantially standard distance is measured from the center 302 of the rotor 217 to the respective center 304 of each of the respective permanent magnets 218. The substantially standard distance that the center point 304 of a permanent magnet 218 is positioned from center 302 of the respective rotor 217 will be referred to as "Radius B."

In the exemplary PMG assembly 300, the permanent magnets 218 are imbedded in the respective rotor 217, alternating face-up poles. For example, as depicted in FIG. 25A, magnets 218-1, 218-3, 218-5 and 218-7 would be imbedded in the epoxy rotor 217a so that a north pole would be face up; magnets 218-2, 218-4, 218-6 and 218-8 would be imbedded in the epoxy rotor 217a so that a south pole would be face up. In rotor 217b, as depicted in, e.g., FIG. 25B, magnets 218-10, 218-12, 218-14, and 218-16 would be imbedded in the epoxy rotor 217b so that a south pole would be face up; magnets 218-11, 218-13, 218-15 and 218-17 would be imbedded in the epoxy rotor 217b so that a north pole would be face up.

In the exemplary PMG assembly 300, the center 304 of a first permanent magnet 218 is separated from the center 304 of a permanent magnet 218 on either side of the first permanent magnet 218 by a substantially standard distance, referred to herein as "Distance D." In the exemplary PMG assembly 300, the center 304 of the first permanent magnet 218 is Distance D from the center 304 of each permanent magnet 218 on either side of the first permanent magnet 218.

In the exemplary PMG assembly 300, Distance C is approximately equal to Distance D; Radius A is approximately equal to Radius B. Accordingly, in the exemplary PMG assembly 300, when rotor 217a is placed (such as depicted, e.g., in FIGS. 18, 21, and 22) so that the magnets 218 of rotor 217a are facing the magnets 218 of rotor 217b, and when the magnets 218 of rotor 217a are aligned with the magnets 218 of rotor 217b so that the magnets 218 of rotor 217a are counter-posed to the magnets 218 of rotor 217b, rotor 217a is substantially a visual mirror image of rotor 217b, and vice versa.

Even though when the magnets 218 of rotor 217a are counter-posed to the magnets 218 of rotor 217b, rotor 217a is substantially a visual mirror image of rotor 217b, the magnets of rotor 217a must be opposite in face-up pole from the corresponding counter-posed magnets 218 of rotor 217b. That is, a first magnet 218-1 (See FIG. 25A) of rotor 217a must attract a second, counter-posed magnet 218-10 (See FIG. 25B) of rotor 217b.

In the exemplary PMG assembly 300, each rotor 217 is mounted to a respective steel plate 216. In the exemplary PMG assembly 300, the steel plate 216 is made of stainless steel. Stainless steel is used in the exemplary embodiment because it is not magnetic and because it does not spoil the effect of the magnets 218.

In the exemplary PMG assembly 300, each steel plate 216 measures approximately one-quarter inch (¼") in thickness and measures approximately twelve inches in diameter. In the exemplary PMG assembly 300, each steel plate 216 provides a stop collar 307 that is welded in a center of the respective steel plate 216; each steel plate 216 provides four holes 305 through which bolts can be threaded. In the exemplary PMG assembly 300, the stop collar 307 measures approximately three-quarters of an inch (¾") in thickness. In the exemplary PMG assembly 300, four fine thread bolts 215 are provided, each measuring approximately one-quarter inch (¼") in diameter, and measuring approximately three inches (3") long.

In the exemplary PMG assembly 300, in order to maintain the mirror-image, counter-posed-attraction relationship as described above between the magnets 218 of rotor 217a and the magnets 218 of rotor 217b, each rotor 217 is mounted to a respective steel plate 216 to form a rotor 217/steel plate 216 assembly 309 (see, e.g., FIGS. 18, 21, 22, 25A and 25B). Four bolts 215 are fitted through the four respective holes 305 of a first rotor 217/steel plate 216 assembly 309 (see, e.g., FIGS. 18, 21, 22, 25A and 25B), e.g., the assembly 309 comprising rotor 217b and a respective steel plate 216. The four bolts 215 are slid through four respective spacing bars 236 that are extended through the inside of the perimeter of hole 306 in the stator 231. The ends of the four bolts 215 are then threaded through the four holes 305 in the other rotor/plate assembly 309 (e.g., the assembly 309 comprising rotor 217a and a respective steel plate 216). The threaded ends of each the four bolts 215 are each secured with a nut 250, such as in the exemplary PMG assembly 300, a one-quarter inch (¼") nyloc nut 250.

With reference to FIG. 18, in the exemplary PMG assembly 300, a shaft 219 is inserted through the stop collar 307 and hole 308 in a first rotor/plate assembly 309, e.g., rotor 217a/plate 216, through the center of the hole 306 in the stator 231, and through the hole 308 and stop collar 307 of a second rotor/plate assembly 309, e.g., rotor 217b/plate 216. A set screw 224 is threaded through each stop collar 307 to hold the shaft 219 in the exemplary PMG assembly 300.

With reference to FIG. 18, each end of shaft 219 is rotatably anchored in opposing sides of aluminum framework casing 201 and 201' respectively, using a bearing with stop ring 206 on each end of shaft 219.

Figure 20:
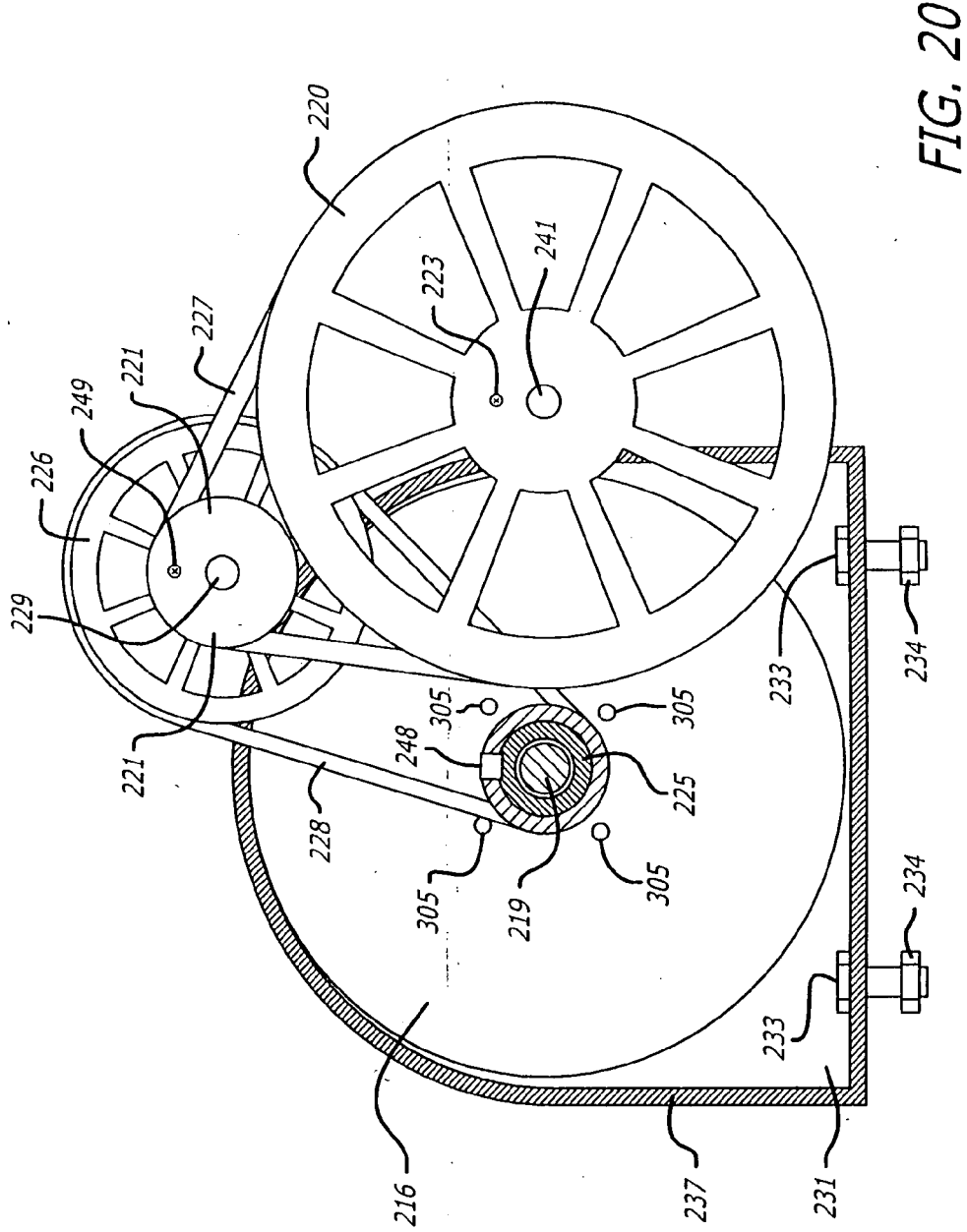
FIG. 20 is a side plan view of a drive system and speed differential of the further alternative exemplary device in the exemplary PMG embodiment of the present invention.

Continuing with reference to FIG. 18, in the exemplary PMG assembly 300, the stator 231, encased in the aluminum stator casing 237, is bolted using bolts 233 to bolt the casing 237 to an aluminum framework casing floor panel 230 (See also, FIG. 20). Ends 232a of the coils 232 are attached to block connectors 240 which are in turn connected to bridge rectifiers 239.

With reference to FIG. 20, a first pulley 225, such as a one-and-one-half inch (1½") V-belt pulley 225, is attached to one exposed end of shaft 219. First pulley 225 is set in place on the exposed end of shaft 219 using a set screw 248. Much of the rest of the further alternative exemplary device is similar in operation to the exemplary embodiment and is described only in overview.

First V-belt pulley 225 is connected with a first V-belt 228 to a second V-belt pulley 226. In the exemplary PMG embodiment, second V-belt pulley 226 measures approximately seven inches (7") in diameter. A third pulley 221 is connected to V-belt pulley 226 via an upper shaft 229. In the exemplary PMG embodiment, third V-belt pulley 221 measures approximately three inches (3") in diameter.

Third V-belt pulley 221 is connected via a second V-belt 227 to a fourth V-belt pulley wheel 220. In the exemplary PMG embodiment, fourth V-belt pulley 220 measures approximately 12 inches (12") in diameter. In the exemplary PMG embodiment, fourth V-belt pulley 220 is attached to a main pedal drive shaft 241. In the exemplary PMG embodiment, main pedal drive shaft 241 is approximately three-quarters of an inch (¾") in diameter and is milled to accommodate fourth V-belt pulley 220, a set screw 223, and a pedal armature 350.

Figure 37:
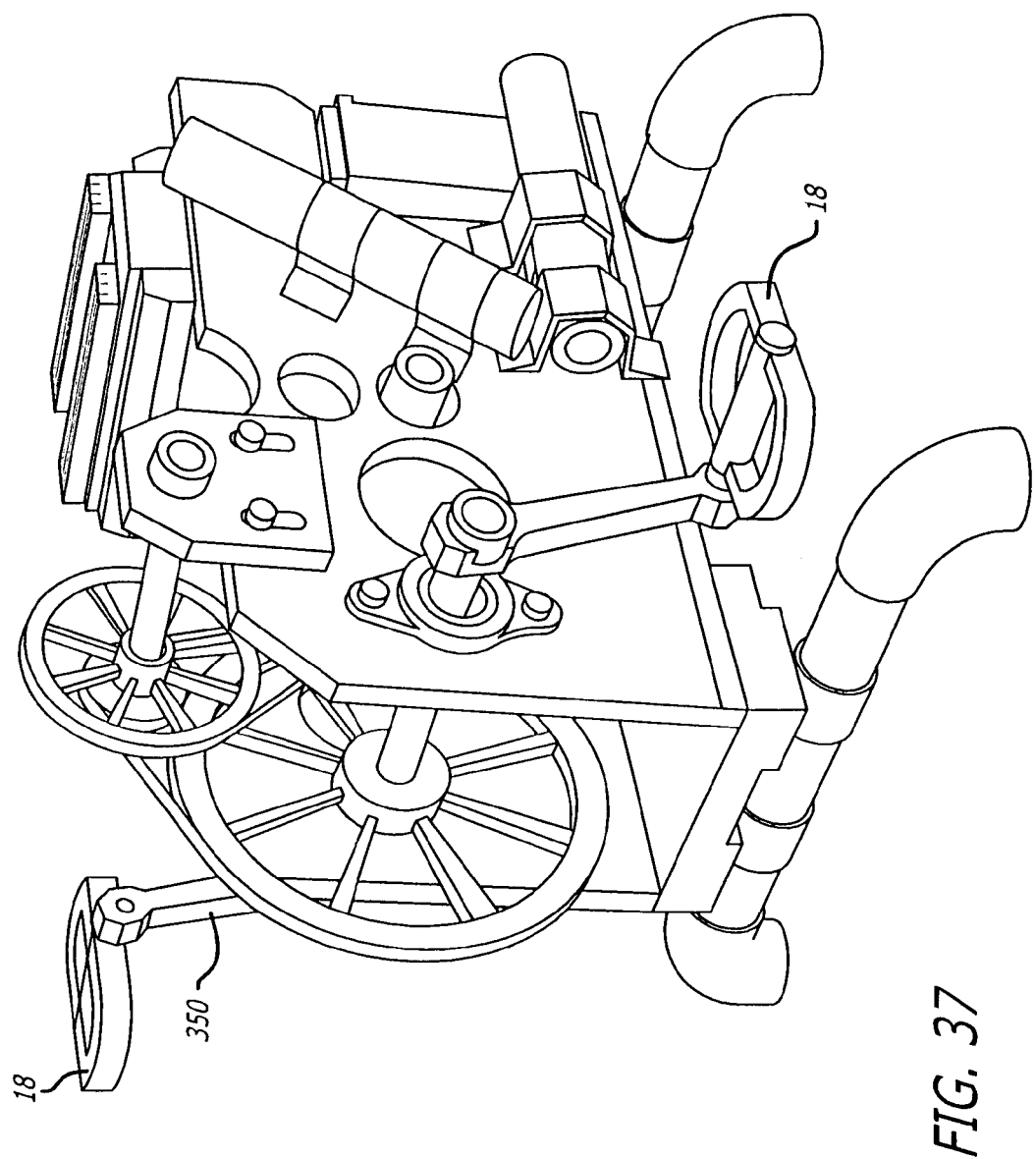
FIG. 37 is a perspective view of a foot/hand pedal operable device of the exemplary PMG embodiment of the present invention.

The further exemplary embodiment of the present invention may be operated by attaching foot pedals (or hand pedals) 18 to the pedal armature 350. FIG. 37 is a perspective view of a foot/hand pedal operable device of the further exemplary embodiment of the present invention.

Figure 19:
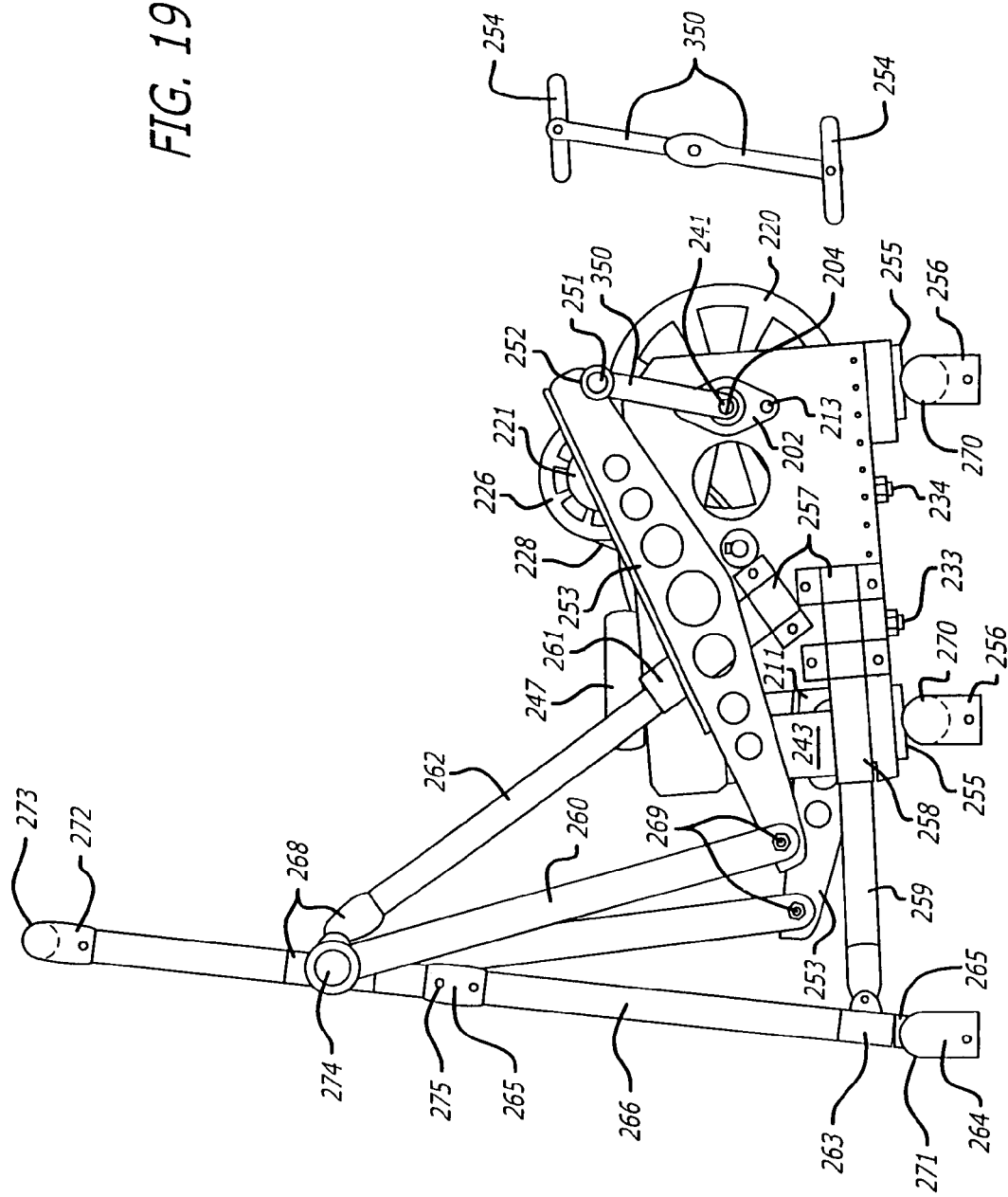
FIG. 19 is a side plan view of an assembled exemplary PMG embodiment of the present invention.
Figure 35:
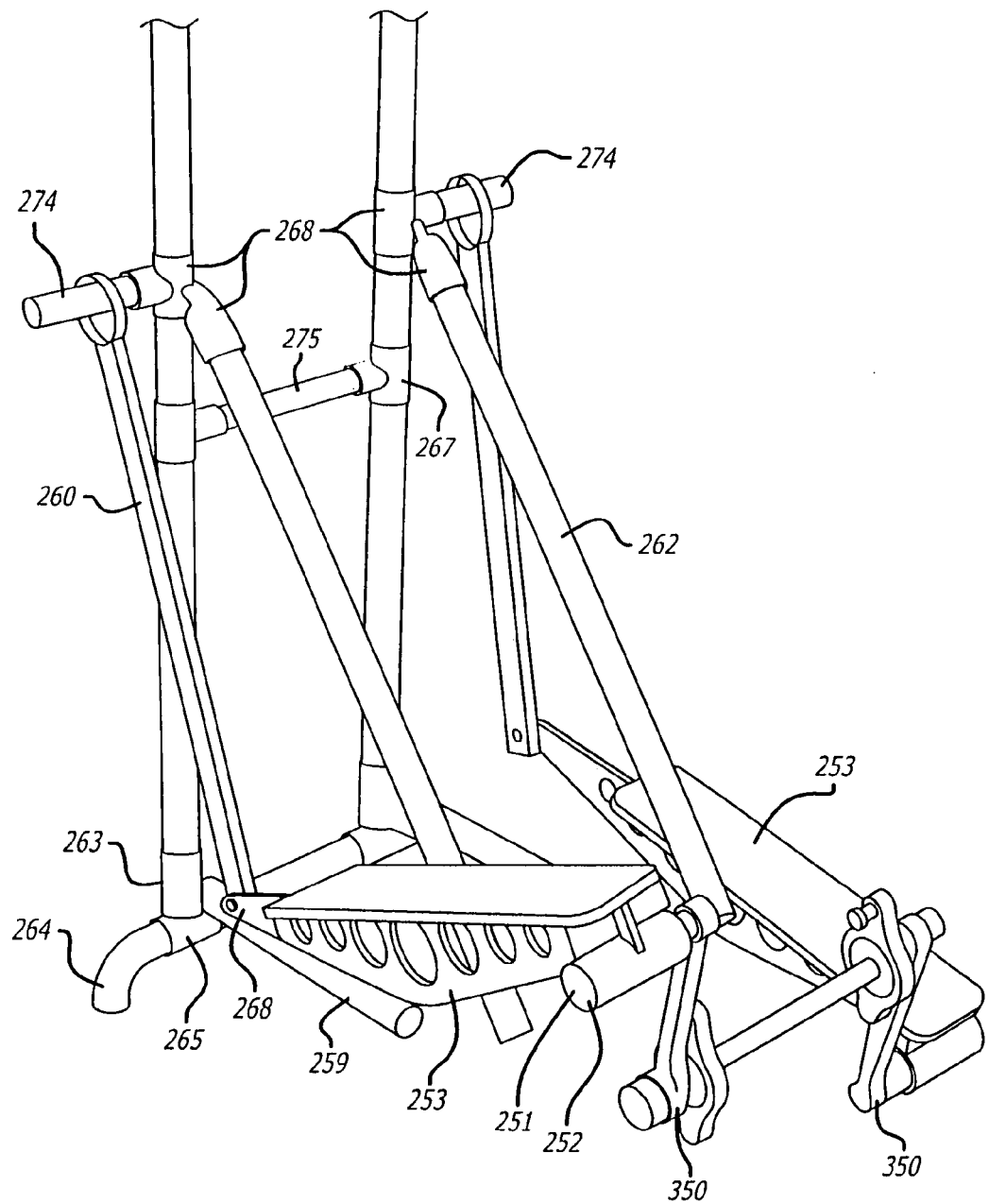
FIG. 35 is a perspective view of an elliptical ski/stair-stepper pedal framework of the exemplary PMG embodiment of the present invention.
Figure 36:
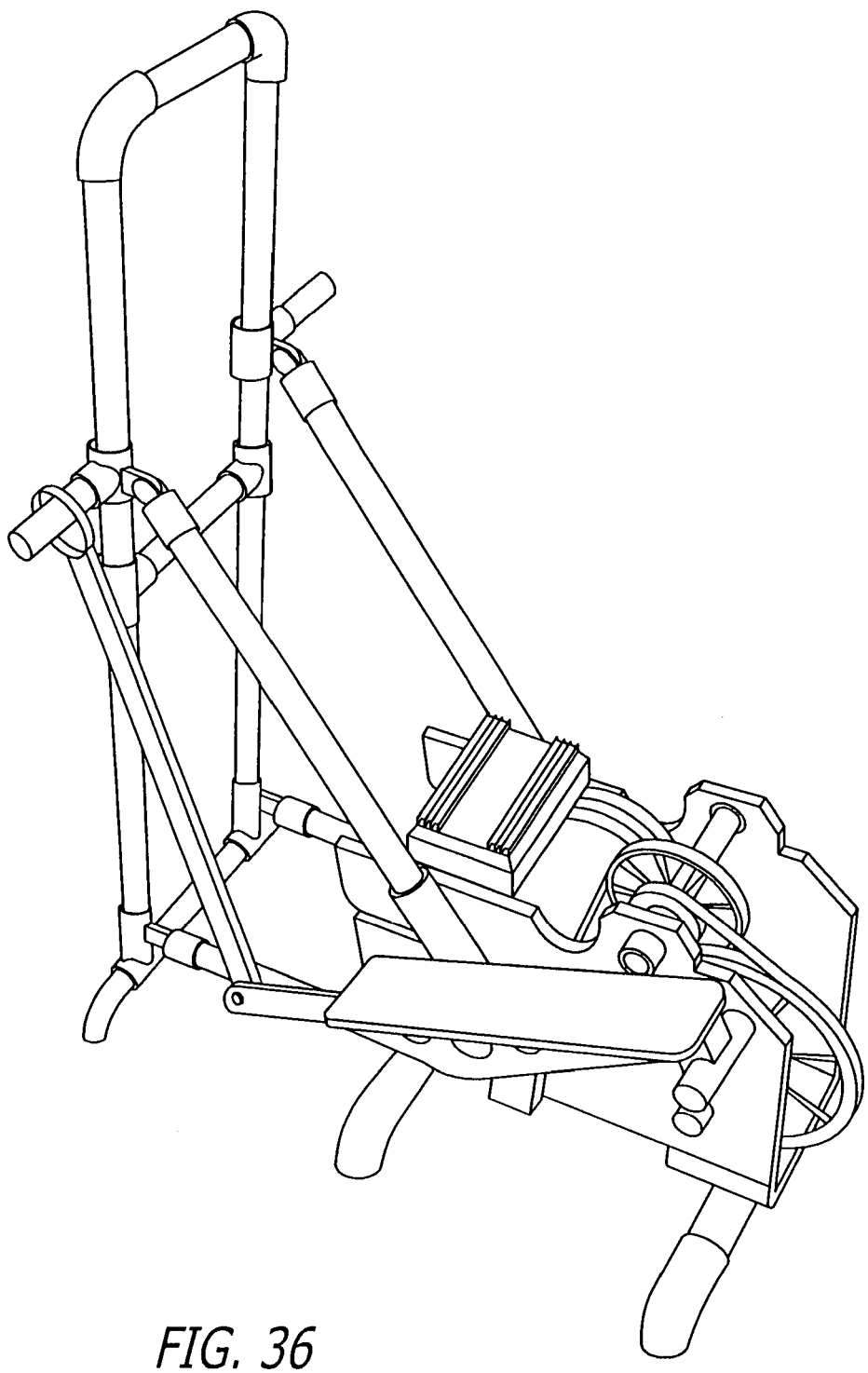
FIG. 36 is a perspective view of an elliptical ski/stair-stepper pedal operable device of the exemplary PMG embodiment of the present invention.

With reference to FIGS. 19 and 35, the further exemplary embodiment of the present invention may also be operated by attaching elliptical ski/stair-stepper pedals 253 to the pedal armature 350. FIGS. 19 and 35 depict elliptical ski/stair-stepper pedals 253 connected to respective pedal armatures 350. As depicted in FIGS. 19 and 35, an elliptical ski/stair-stepper pedal 253 is further connected to a pivot speedrail fitting 268 with 3 points of attachment which is in turn connected to a ring-welded steel swing bar 260. The ring-welded steel swing bar 260 is attached to a vertical bar 274 for stepper steps. FIGS. 35 and 36 show perspective views of an elliptical ski/stair-stepper pedal operable device of the further exemplary embodiment of the present invention.

A partial parts list for the exemplary PMG embodiment is provided below. The element numbers (also referred to herein as a part number, e.g., element 201 may be alternatively referred to as "part 201" or "Part 201") listed below will be referenced in one of FIGS. 18 through 39, although the majority of the parts listed below can be viewed in FIG. 18. In view of the Figures and the partial parts list, someone with ordinary skill in the art will understand assembly of the entire device.

Partial Parts List for Exemplary PMG Embodiment

201 ¼" aluminum framework casing—machined to accept all component parts (2 each per unit (includes both 201 and 201')).
202 ¾" flush pillowblock (2 each per unit). Holds Part 203 that keys into Part 202.
203 ¾" I.D. (interior diameter) bearing to fit Part 202 (2 each per unit)
204 ¾" I.D. stop collar with set screw (Part 205) (2 each per unit) 205 Set screw for 204.
206 ¾" I.D. bearing with stop ring (2 each per unit). Keys into Part 219.
207 ¾" I.D. stop collar for Part 206.
208 ¾" I.D. bearing with stop ring (2 each per unit). Keys into Part 212.
209 ¾" stop collar for Part 208 (2 each per unit).
210 Set screw for Part 208 stop collar (1 each per stop collar).
211 Set screw for Part 207 stop collar (1 each per stop collar).
212 Adjustable ¼" aluminum bearing plate to house rod for Parts 221, 226, and 229
213 ¼"×1¼" fine thread bolts and ¼" nyloc nut (element 250). 214 ditto 213 above.
215 ¼"×3" fine thread bolts and nyloc nuts.
216 ¼"×12" steel plate with ¾" stop collar welded dead center.
217 High-temperature epoxy casting housing for Part 218 magnets.
218 ½"×1½" high-quality neodymium magnets.
219 ¾ C.R. (cold rolled) steel permanent magnet generator (PMG) shaft.
220 12" V-belt pulley.
221 3" V-belt pulley.
222 Set screw for Part 221.
223 Set screw for Part 220.
224 Set screw for Part 216.
225 1½" V-belt pulley.
226 7" V-belt pulley.
227 V-belt for Parts 220 and 221 (17400).
228 V-belt for Parts 226 and 225 (17313).
229 ¾ C.R. steel upper shaft.
230 ¼" aluminum framework casing—floor panel.
231 High-temperature epoxy encasement.
232 8 coils at 200 winds at 16-gauge coated magnet wires—PMG coils/electrical coils.
233 ¼"×1" bolts for mounting stator framework (2 for stator).
234 ¼" nuts for Part 233.
235 1" riser block.
236 2¼"×⅟₁₆" thick×⅜" I.D. stand off/spacer tubing.
237 1"×⅛" aluminum stator casing (to hold Part 231+232).
238 ½" thick electrical block connector including bridge rectifiers mounting plates.
239 (4) 12-volt bridge rectifiers.
240 (1) 8 pairs of electrical block connectors.
241 ¾" diameter main pedal drive shaft (milled to accommodate Parts 220, 350, and 204).
242 ¼" aluminum battery base.
243 LA12150 12-volt mini lead-acid battery.
244 ¾" thick neoprene battery bumpers.
245 Battery retaining strap.
246 Mounting plate for 12-volt/110 200-watt inventer.
247 12 DC volt/110 AC 200-watt power inverter.
248 Set screw for Part 225.
249 Set screw for Part 226.
250 ¼" nyloc nut 251 ⅜"×6" hardened bolt with nut plus lockwashers.
252 ⅜" I.D.×1" O.D. (outer diameter) bearings to hold Part 251 (2 each per side).
253 StairStepper Step (reinforced) (2 per unit).
254 Foot pedals for pedal mode.
255 1½" horizontal speedrail flush fitting (4 per unit).
256 1¼" I.D.×90-degree speedrail fitting (4 per unit) footings.
257 1" I.D.×1/16" galvanized pipe straps (8 per unit).
258 1" O.D.×¾" I.D. aluminum tube (housing for lower telescopic structure of StairStepper mode framework with set screw (2 per unit).
259 ¾" O.D. lower support StairStepper framework (2 per unit) (fits into Part 258).
260 1½"×⅛" steel swing bar for stepper steps. 1¼" ring welded to top.
261 1" O.D.×¾" I.D. aluminum tube (housing for upper telescopic structure of StairStepper mode framework with set screw (2 per unit).
262 ¾" O.D. upper support StairStepper framework (2 per unit—fits into Part 261)
263 ¾" I.D. pivot speedrail fitting with 2 points of attachment.
264 ¾" I.D.×90-degree elbow speedrail fitting (stepper framework base feet)
265 ¾" I.D.×"T" speedrail fitting.
266 ¾" O.D. aluminum tube—vertical stepper framework.
268 ¾" I.D. pivot speedrail fitting with 3 points of attachment
269 ¼"×1¼" hardened bolt—stepper elbow joint (attaches Part 253 to Part 260).
270 1¼" O.D. aluminum tube—rear+mid unit "leg" support/horizontal stabilization.
271 ¾" O.D. aluminum tube—front base StairStepper horizontal stabilization
272 ¾" E.D.×90-degree elbow speedrail—top, stepper handhold.
273 ¾" O.D. aluminum tube—handhold bar.
274 ¾" O.D. steel tube with stop (main vertical connection for Part 260).
275 ¾" O.D. aluminum tube for Horizontal stepper frame stabilization.
330 secondary 12 volt battery
333 battery isolator/regulator
345 110/120 AC/DC inverter
350 Pedal armature FIG. 19 is a side plan view of an assembled exemplary PMG embodiment of the present invention showing the supportive framework of the exemplary PMG device. As depicted in FIG. 19, a reinforced StairStepper Step 253 is provided, one on each side of the unit. As an alternative to StairStepper Step 253, the exemplary PMG embodiment is provided with alternative operational means in the form of foot pedals 254 for pedal mode operation. Either the foot pedals 254, or the StairStepper Step 253, can be attached to pedal armature 350. One pedal armature 350 is provided on each side of the device, attached to either end of main pedal drive shaft 241.

As depicted in FIG. 19, the exemplary supporting framework of the exemplary PMG device comprises among other things, horizontal speedrail flush fittings 255 (4 per unit). The exemplary supporting framework of the exemplary PMG device further comprises ninety-degree speedrail fitting footings 256 (4 per unit). Galvanized pipe straps 257 (8 per unit) are used to reinforce various connections. The exemplary supporting framework of the exemplary PMG device further comprises aluminum tubing 258 (2 per unit) (with set screw) as housing for lower telescopic structure components of the StairStepper mode framework. The exemplary supporting framework of the exemplary PMG device, further comprises a lower support StairStepper framework 259 (2 per unit) that fits into aluminum tubing 258. The exemplary supporting framework of the exemplary PMG device further comprises steel swing bar 260 with a one and one-quarter inch ring welded to top for stepper steps. The exemplary supporting framework of the exemplary PMG device further comprises aluminum tube 261 (2 per unit) (with set screw) as housing for upper telescopic structure of StairStepper mode framework. The exemplary supporting framework of the exemplary PMG device further comprises upper support StairStepper framework 262 (2 per unit) for fitting into aluminum tube 261. The exemplary supporting framework of the exemplary PMG device further comprises pivot speedrail fitting 263 with 2 points of attachment and ninety-degree elbow speedrail fitting 264 as stepper framework base feet.

As depicted in FIG. 19, the exemplary supporting framework of the exemplary PMG device further comprises a "T" speedrail fitting 265, aluminum tube 266 as vertical stepper framework, and pivot speedrail fitting 268 with 3 points of attachment. The exemplary supporting framework of the exemplary PMG device further comprises hardened bolt 269 stepper elbow joint (attaches 253 to 260). The exemplary supporting framework of the exemplary PMG device further comprises aluminum tube rear-device and mid-device "leg" support/horizontal stabilization units 270. The exemplary supporting framework of the exemplary PMG device further comprises aluminum tube front base StairStepper horizontal stabilization unit 271. The exemplary supporting framework of the exemplary PMG device further comprises ninety-degree elbow speedrail 272 as a top, stepper handhold. The exemplary supporting framework of the exemplary PMG device further comprises aluminum tube 273 as a handhold bar, steel tube 274 with stop as a main vertical connection for element 260, and aluminum tube 275 as a horizontal stepper frame stabilization.

Returning with reference to FIG. 18, and with reference to FIG. 20, as human power is applied to pedals (either foot pedals 18 (FIG. 37), or elliptical ski/stair-stepper pedals 253 (FIG. 36)), the main pedal drive shaft 241 will rotate, thereby causing fourth V-belt pulley 220 to rotate. As fourth V-belt pulley 220 rotates, V-belt 227 will cause third V-belt pulley 221 to rotate, causing rotation of second V-belt pulley 228 via upper shaft 229. As second V-belt pulley 228 rotates, first V-belt pulley 225 will rotate via V-belt 228. As first V-belt pulley 225 rotates, PMG shaft 219 will rotate, causing rotation of the exemplary rotor/steel plate assemblies 309 (FIG. 18).

With reference to FIG. 18, as the rotors 217 of the exemplary rotor/steel plate assemblies 309 are rotated, the counterposed magnets become aligned (although in normal operation, only momentarily) with a respective coil 232 so that magnetic flux passes from a magnet, (e.g., North-pole faced-up magnets 218-1, 218-3, 218-5 and 218-7 respectively) on one rotor, e.g., 217a, to the counter-posed magnet (e.g., South-pole faced-up magnets 218-10, 218-12, 218-14 and 218-16 respectively) on the other rotor, e.g., 217b, through the respective coil 232; and from North-pole faced up magnets 218-11, 218-13, 218-15 and 218-17 on, e.g., rotor 217b, to the counter-posed South-pole faced-up magnets 218-2, 218-4, 218-6 and 218-8 on, e.g., rotor 217a. As the rotors continue to turn, the magnetic flux passing from one rotor, e.g., 217a, to the other rotor, e.g., 217b through a particular coil 232, alternates so that the next pair of counter-posed magnets that are aligned with that coil 232 cause an alternate magnetic flux to pass through the coil 232. The alternating magnetic flux moving through the respective coils 232 of the stator 231 produces electric power in the form of alternating current.

Figure 38:
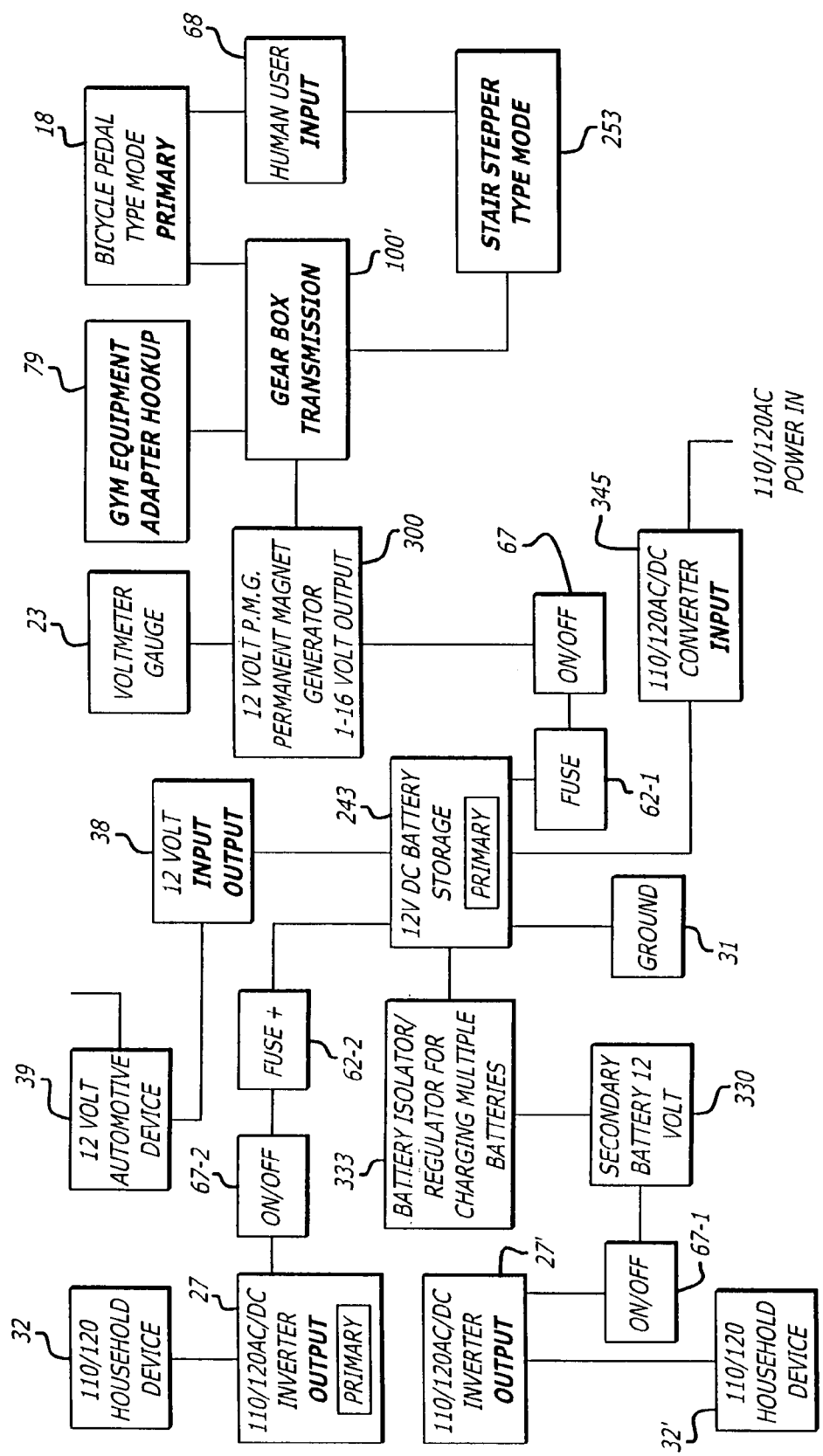
FIG. 38 is a block diagram depicting exemplary electrical components in relation to physical components in the further alternative exemplary device in the exemplary PMG embodiment of the present invention.

FIG. 38 is a block diagram depicting exemplary electrical components in relation to physical components in the exemplary PMG device in the exemplary PMG embodiment of the present invention. As depicted in FIG. 38, the gear-to-gear transmission assembly/gear box transmission 100' can be driven by human user input 68 via either bicycle pedal (foot pedal) mode 18, or via stair stepper mode 253. As depicted in FIG. 38, the gear box transmission could be connectable to a gym equipment adapter 79 as was previously described above.

As depicted in FIG. 38, the gear-to-gear transmission assembly/gear box transmission 100' is connected to the permanent magnet generator assembly 300, which is in turn connected to on/off switch 67, which is in turn connected, via a fuse 62-1, to battery 243. In the PMG embodiment, battery 243 is a 12-volt mini lead-acid battery. As depicted in FIG. 38, battery 243 is a primary storage of the power generated by operating the PMG assembly 300. Battery 243 is connected to a ground 31. Battery 243 is also connectable to a device operable with 12-volt power 38, such as a 12-volt automotive device 39. Battery 243 is connected to a fuse 62-2, which is in turn connected, via an on/off switch 67-2, to a first 110/120 AC/DC inverter 27 that can convert the 12-volt DC energy to 110/120 AC power for supplying power to a device that operates using 110/120 AC power, such as a household device 32. Battery 243 is also connected, or connectable, to a battery isolator/regulator 333 for charging multiple batteries such as a secondary battery 330. The secondary battery 330 could also be connected, via an on/off switch 67-1, to a second 110/120 AC/DC inverter 27' that can convert the 12-volt DC energy to 110/120 AC power for supplying power to a device that operates using 110/120 AC power, such as a household device 32'.

Figure 39:
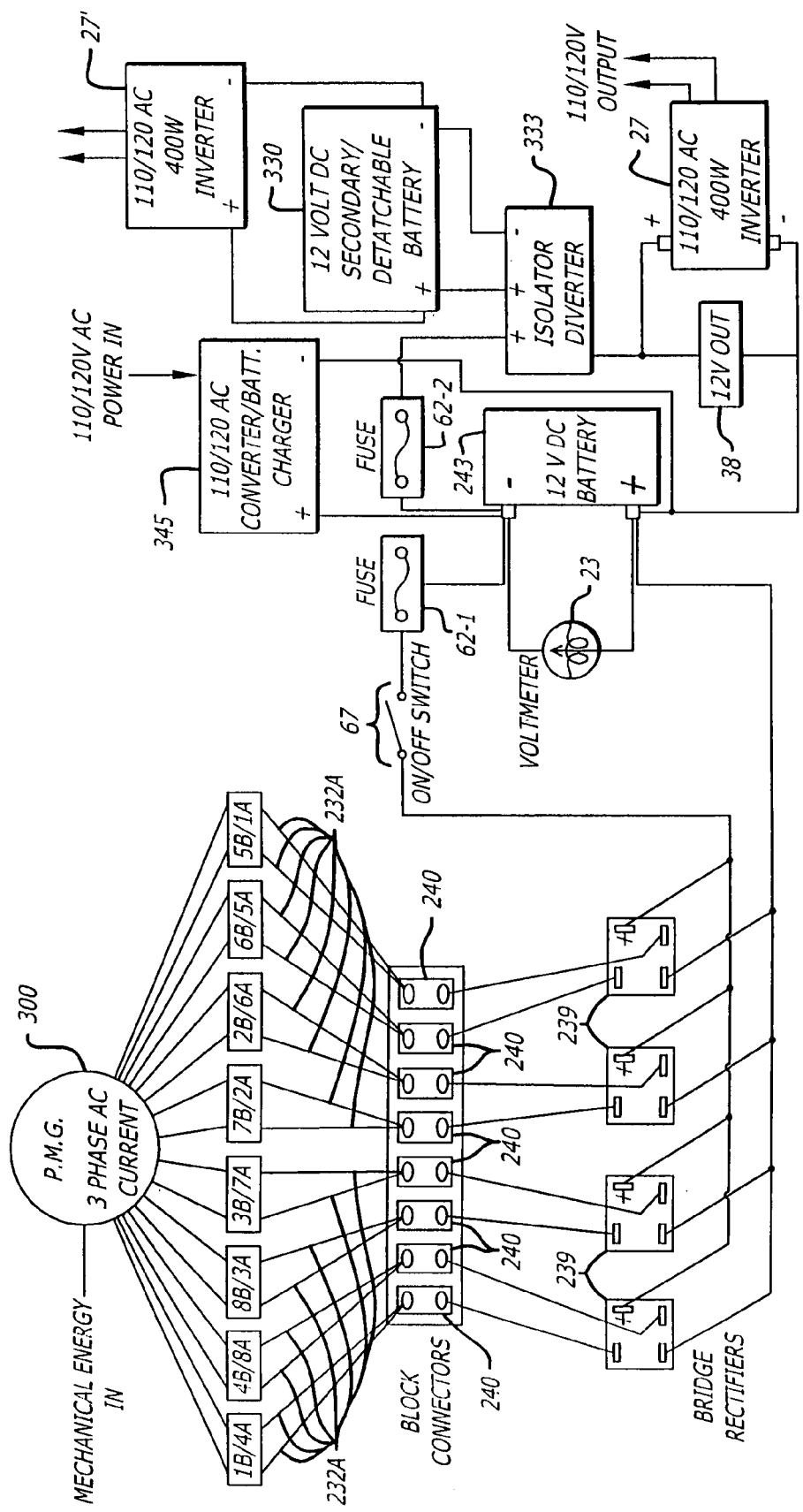
FIG. 39 is a schematic diagram depicting exemplary connections between the exemplary PMG assembly and various electrical components of the further alternative exemplary device in the exemplary PMG embodiment of the present invention.

FIG. 39 is a schematic diagram depicting exemplary connections between the exemplary PMG assembly 300 and various electrical components of the exemplary PMG device in the exemplary PMG embodiment of the present invention. As depicted in FIG. 39, ends 232a of the coils (element 232 in, e.g., FIG. 18) are attached to block connectors 240 which are in turn connected to bridge rectifiers 239. The alternating current generated by operating the permanent magnet generator assembly 300 is changed via the bridge rectifiers 239 into 'direct current' (DC) for charging a 12-volt battery 243. The bridge rectifiers 239 are connected to the battery 243 via an on/off switch 67, and a fuse 62-1. A voltmeter 23 is provided to measure the charge to battery 243. Battery 243 is connected to a first 110/120 AC inverter 27 (such as a 400 W inverter) to run devices that are operable via 110/120 AC power. An isolator diverter 333 is connected, or connectable, to battery 243 via fuse 62-2. Isolator diverter 333, when connected to charged battery 243, can be used to charge secondary batteries, e.g., 330, which can in turn be connected to a second 110/120 AC inverter 27' (such as a 400 W inverter) to run devices that are operable via 110/120 AC power. As depicted in FIG. 38, a converter 345 could be connected to battery 243 to convert input 110/120 AC current to 12-volt direct current to allow input to charge battery 243.

As compared to the exemplary embodiment which required that the alternator pulley wheel must rotate about 1100 times per minute in order to generate electricity, the exemplary PMG embodiment with the exemplary PMG assembly 300 recognizes electricity generation with very low RPMs. Indeed, the exemplary PMG embodiment with the exemplary PMG assembly 300 recognizes electricity generation following early rotation of the rotors.

FURTHER PMG EMBODIMENTS

Figure 40:
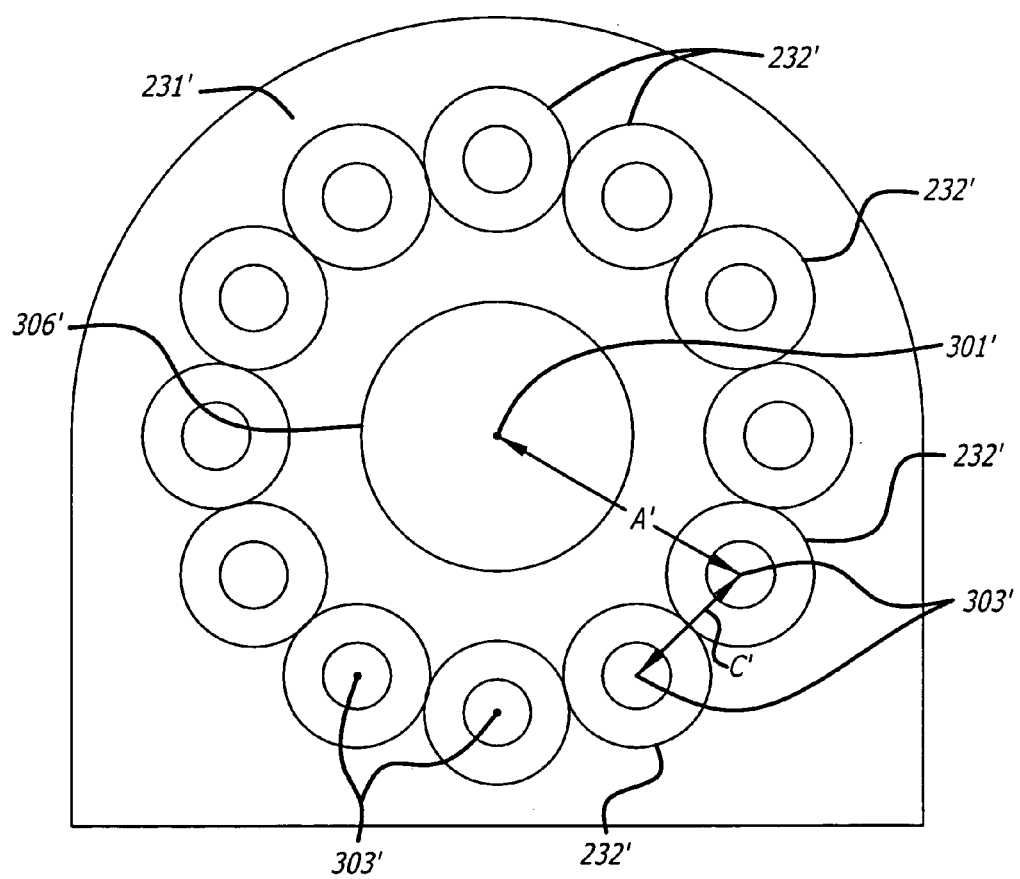
FIG. 40 is a side plan view of an alternative exemplary twelve-coil stator in an exemplary twelve-coil PMG embodiment of the present invention.
Figure 41:
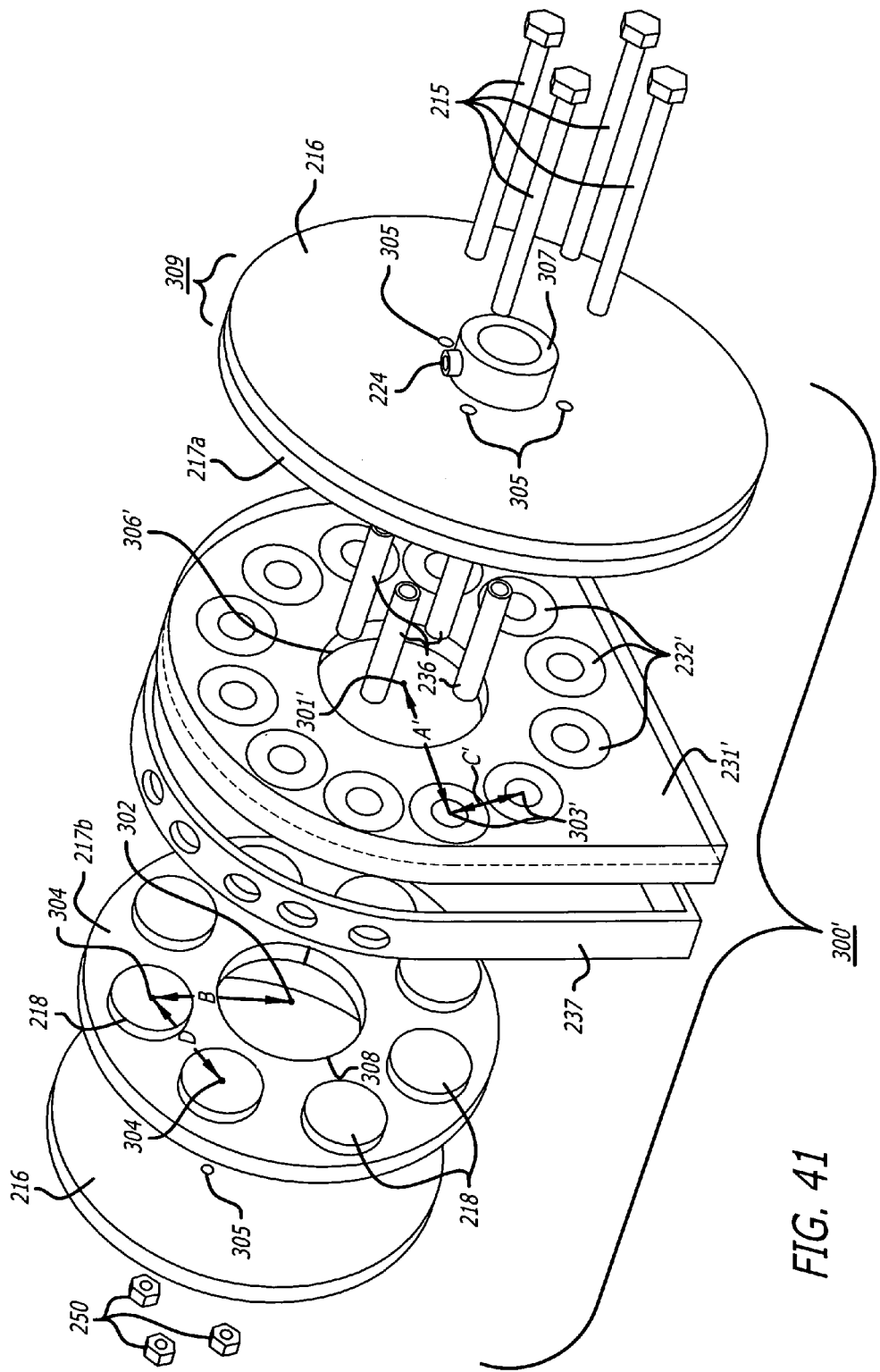
FIG. 41 is an exploded perspective view of exemplary components of an exemplary twelve-coil permanent magnet generator assembly of the present invention.

FIG. 40 is a side plan view of an alternative exemplary twelve-coil stator 231' in an exemplary twelve-coil PMG embodiment of the present invention. FIG. 41 is an exploded perspective view of exemplary components of an exemplary twelve-coil permanent magnet generator assembly of the present invention.

In a first exemplary PMG embodiment variation of the present invention (sometimes referred to herein as the exemplary twelve-coil PMG embodiment), an alternative exemplary PMG device comprises, in place of the exemplary PMG assembly 300 described above with reference to, for example, FIG. 21, an alternative exemplary PMG assembly 300' as depicted, for example, in FIG. 41.

With reference to FIG. 41, the alternative exemplary PMG assembly 300' of the first exemplary PMG embodiment variation comprises an alternative exemplary stator 231'. With reference to FIGS. 40 and 41, in the first exemplary PMG embodiment variation, the alternative exemplary stator 231 comprises a high-temperature epoxy into which is imbedded a plurality of alternative exemplary coils 232' of wire; an alternative exemplary center hole 306' of alternative exemplary stator 231' is provided. In the first exemplary PMG embodiment variation, twelve alternative exemplary coils 232' (rather than eight coils 232 as depicted for the PMG assembly 300 described above with reference, for example, FIG. 21) of wire are provided. This first exemplary PMG embodiment variation may sometimes be referred to herein as the "twelve-coil PMG embodiment."

In the first exemplary PMG embodiment variation, each alternative exemplary coil 232' depicted in FIG. 40 comprises approximately one hundred fifty (150) winds of 17-gauge enamel-coated magnet wire. Each alternative exemplary coil 232' forms substantially a circle with an alternative exemplary center point 303'; each alternative exemplary coil 232' measures approximately one-and-seven-eighths (1⅞) inches in diameter. In the first exemplary PMG embodiment variation, the alternative exemplary coils 232' are imbedded in the alternative exemplary stator 231' equidistant from a center point 301' of the alternative exemplary stator 231' so that the center point 303' of each alternative exemplary coil 232' is substantially the same distance from center point 301' of the alternative exemplary stator 231'. The distance that the center point 303' of an alternative exemplary coil 232' is positioned from center point 301' will be referred to as "Radius A'."

In the first exemplary PMG embodiment variation, the center point 303' of each alternative exemplary coil 232' is separated from the center point 303' of each alternative exemplary coil 232' on either side by a substantially standard distance, referred to herein as "Distance C'." In the first exemplary PMG embodiment variation, the center point 303' of a first alternative exemplary coil 232' is Distance C' from the center point 303' of each alternative exemplary coil 232' on either side of the first alternative exemplary coil 232'.

It will be understood by someone with ordinary skill in the art that the number of twelve (12) alternative exemplary coils 232' in the first exemplary PMG embodiment variation is not a limitation of the invention. A number of alternative exemplary coils 232' more or less than twelve could be used without departing from the spirit of the invention. However, it will be understood by someone with ordinary skill in the art that it would be preferable that the number of alternative exemplary coils 232' used would be an even number to facilitate consistent generation of alternating current. Further, in order to comprise a three-phase alternator, the number of coils used should be a multiple of three (3). For example, eighteen coils could be used because eighteen (18) is a number that is both divisible by the numbers two (2) and three (3).

It will further be understood by someone with ordinary skill in the art that the number of one hundred fifty (150) winds of wire described above with respect to the alternative exemplary coils 232' is exemplary and non-limiting; more or less winds of wire could be used without departing from the spirit of the invention. Preferably, though, the number of windings should be sufficient to generate the power necessary to charge a battery; and the number of windings should not be so large as to create excess bulk for the stator casing. For example, more than one hundred (100) windings may be necessary to facilitate generation of sufficient power to charge a battery; more than two hundred (200) windings may result in coils so bulky that the coils do not fit well in the stator casing.

In the first exemplary PMG embodiment variation, even though there are twelve alternative exemplary coils 232' of wire provided (rather than eight coils 232 as depicted for the PMG assembly 300 described above with reference, for example, FIG. 21), the two rotors (217a and 217b) of the first exemplary PMG embodiment variation are substantially similar to the two rotors (217a and 217b) described above regarding the exemplary PMG assembly 300 that is depicted, for example, in FIG. 21. FIG. 41 is an exploded perspective view of exemplary components of an exemplary twelve-coil permanent magnet generator assembly 300' of the present invention.

As depicted in FIG. 41, each of the two rotors (217a and 217b) of the alternative exemplary PMG assembly 300' in the first exemplary PMG embodiment variation comprise a high-temperature epoxy disk casting (217a, 217b) into which are imbedded eight permanent magnets 218. Each rotor (217a, 217b) is then mounted on one surface of a one-quarter (¼) inch thick steel disk 216.

It will be understood by someone with ordinary skill in the art that increasing the number of coils does not substantially increase the cost of each device. However, permanent magnets, such as neodymium magnets, can be expensive. Therefore, increasing the number of permanent magnets in each rotor could raise the cost of the resulting device.

In the alternative exemplary PMG assembly 300', each rotor 217a, 217b comprises a disk of epoxy that measures approximately twelve inches in diameter having a center 302. In the alternative exemplary PMG assembly 300', a center hole 308 is provided in each rotor 217a, 217b.

In the alternative exemplary PMG assembly 300', each permanent magnet 218 comprises a high-quality neodymium magnet measuring approximately one-half inch thick, and one-and-one-half inch in diameter with a center 304. In the alternative exemplary PMG assembly 300', the permanent magnets 218 are imbedded in the respective rotor 217a, 217b at a substantially standard distance; the substantially standard distance is measured from the center 302 of the rotor 217a, 217b to the respective center 304 of each of the respective permanent magnets 218. The substantially standard distance that the center point 304 of a permanent magnet 218 is positioned from center 302 of the respective rotor 217a, 217b is referred to herein as "Radius B."

With reference to FIG. 41, in the alternative exemplary PMG assembly 300', the permanent magnets 218 are imbedded in the respective rotor 217a, 217b, alternating face-up poles. For example, as depicted in FIG. 25A, magnets 218-1, 218-3, 218-5 and 218-7 would be imbedded in the epoxy rotor 217a so that a north pole would be face up; magnets 218-2, 218-4, 218-6 and 218-8 would be imbedded in the epoxy rotor 217a so that a south pole would be face up. In rotor 217b, as depicted in, e.g., FIG. 25B, magnets 218-10, 218-12, 218-14, and 218-16 would be imbedded in the epoxy rotor 217b so that a south pole would be face up; magnets 218-11, 218-13, 218-15 and 218-17 would be imbedded in the epoxy rotor 217b so that a north pole would be face up.

With reference to FIG. 41, in the alternative exemplary PMG assembly 300', the center 304 of a first permanent magnet 218 is separated from the center 304 of a permanent magnet 218 on either side of the first permanent magnet 218 by a substantially standard distance, referred to herein as "Distance D." In both the exemplary PMG assembly 300 (depicted, for example, in FIG. 21) and in the alternative exemplary PMG assembly 300' depicted, for example, in FIG. 41, the center 304 of the first permanent magnet 218 is Distance D from the center 304 of each permanent magnet 218 on either side of the first permanent magnet 218.

In the exemplary PMG assembly 300 previously described above with respect to, for example, FIG. 21, Distance C is approximately equal to Distance D; Radius A is approximately equal to Radius B. With reference to FIG. 41, as compared to exemplary PMG assembly 300, in the alternative exemplary PMG assembly 300', Radius A' is approximately equal to Radius B, however, distance C' is less than Distance D.

As was described previously regarding the exemplary PMG assembly 300, in the alternative exemplary PMG assembly 300', when rotor 217a is placed (such as depicted, e.g., in FIGS. 18, 21, and 22) so that the magnets 218 of rotor 217a are facing the magnets 218 of rotor 217b, and when the magnets 218 of rotor 217a are aligned with the magnets 218 of rotor 217b so that the magnets 218 of rotor 217a are counter-posed to the magnets 218 of rotor 217b, rotor 217a is substantially a visual mirror image of rotor 217b, and vice versa.

As was described previously regarding the exemplary PMG assembly 300, in the alternative exemplary PMG assembly 300', even though when the magnets 218 of rotor 217a are counter-posed to the magnets 218 of rotor 217b, rotor 217a is substantially a visual mirror image of rotor 217b, the magnets of rotor 217a must be opposite in face-up pole from the corresponding counter-posed magnets 218 of rotor 217b. That is, a first magnet 218-1 (See FIG. 25A) of rotor 217a must attract a second, counter-posed magnet 218-10 (See FIG. 25B) of rotor 217b.

As was described previously regarding the exemplary PMG assembly 300, in the alternative exemplary PMG assembly 300', each rotor 217 is mounted to a respective stainless or cold rolled steel plate 216.

Continuing with reference to FIG. 41, as was described previously regarding the exemplary PMG assembly 300, in the alternative exemplary PMG assembly 300', each steel plate 216 measures approximately one-quarter inch (¼") in thickness and measures approximately twelve inches in diameter. As was described previously regarding the exemplary PMG assembly 300, in the alternative exemplary PMG assembly 300', each steel plate 216 provides a stop collar 307 that is welded in a center of the respective steel plate 216; each steel plate 216 provides four holes 305 through which bolts can be threaded. As was described previously regarding the exemplary PMG assembly 300, in the alternative exemplary PMG assembly 300', the stop collar 307 measures approximately three-quarters of an inch (¾") in thickness. As was described previously regarding the exemplary PMG assembly 300, in the alternative exemplary PMG assembly 300', four fine thread bolts 215 are provided, each measuring approximately one-quarter inch (¼") in diameter, and measuring approximately three inches (3") long.

As was described previously regarding the exemplary PMG assembly 300, in the alternative exemplary PMG assembly 300', in order to maintain the mirror-image, counter-posed-attraction relationship as described above between the magnets 218 of rotor 217a and the magnets 218 of rotor 217b, each rotor 217 is mounted to a respective steel plate 216 to form a rotor 217/steel plate 216 assembly 309 (see, e.g., FIGS. 18, 21, 22, 25A and 25B). Four bolts 215 are fitted through the four respective holes 305 of a first rotor 217/steel plate 216 assembly 309 (see, e.g., FIGS. 18, 21, 22, 25A and 25B), e.g., the assembly 309 comprising rotor 217b and a respective steel plate 216. With reference to FIG. 41, the four bolts 215 are slid through four respective spacing bars 236 that are extended through the inside of the perimeter of hole 306' in the alternative exemplary stator 231'. The ends of the four bolts 215 are then threaded through the four holes 305 in the other rotor/plate assembly 309 (e.g., the assembly 309 comprising rotor 217a and a respective steel plate 216). The threaded ends of each the four bolts 215 are each secured with a nut 250, such as for example, a one-quarter inch (¼") nyloc nut 250.

With reference to FIG. 41, and FIGS. 25A and 25B, it will be understood by someone with ordinary skill in the art that, in the alternative exemplary PMG assembly 300', because Radius A' is approximately equal to Radius B, as the rotors 217a and 217b are rotated, counter-posed magnets, for example North-pole faced-up magnet 218-1 and counter-posed South-pole faced-up magnet 218-10 as depicted in FIGS. 25A and 25B, become aligned (although in normal operation, only momentarily) with an alternative exemplary coil 232'. When counter-posed magnets are aligned with an alternative exemplary coil 232', magnetic flux passes from a North-pole faced-up magnet, (e.g., North-pole faced-up magnet such as 218-1 depicted in FIG. 25A) on one rotor, e.g., 217a, to the counter-posed magnet (e.g., South-pole faced-up magnet 218-10 depicted in FIG. 25B) on the other rotor, e.g., 217b, through the aligned alternative exemplary coil 232'. As the rotors continue to turn, the magnetic flux passing through a particular alternative exemplary coil 232', alternates so that the next pair of counter-posed magnets that are aligned with that particular alternative exemplary coil 232' cause an alternate magnetic flux to pass through the coil 232. The alternating magnetic flux moving through the respective alternative exemplary coils 232' of the alternative exemplary stator 231' produces electric power in the form of alternating current.

As will be understood by someone with ordinary skill in the art, in exemplary PMG assembly 300 previously described above, because distance C is equal to Distance D and because Radius A is equal Radius B, then when one counter-posed pair of magnets (e.g., North-pole faced-up magnet 218-1 and counter-posed South-pole faced-up magnet 218-10 as depicted in FIGS. 25A and 25B) are aligned with any particular alternative exemplary coil 232 (e.g., as depicted in FIG. 21), then all of the other counter-posed pairs of magnets (e.g., North-pole faced-up magnets 218-3, 218-5 and 218-7 respectively on one rotor, e.g., 217a, paired with the counter-posed magnet, e.g., South-pole faced-up magnets 218-12, 218-14 and 218-16 respectively on the other rotor, e.g., 217b, and North-pole faced up magnets 218-11, 218-13, 218-15 and 218-17 on, e.g., rotor 217b, paired with the counter-posed South-pole faced-up magnets 218-2, 218-4, 218-6 and 218-8 on, e.g., rotor-217a would also be aligned with the other respective coils 232.

However, as will be understood by someone with ordinary skill in the art, as compared to exemplary PMG assembly 300, because in alternative exemplary PMG assembly 300', distance C' is less than Distance D, and because there are more alternative exemplary coils 232' in the alternative exemplary stator 231' than there are pairs of counter-posed magnets (218-1 through 218-8 and 218-10 through 218-17) in the respective rotors 217a and 217b, then when one counter-posed pair of magnets (e.g., North-pole faced-up magnet 218-1 and counter-posed South-pole faced-up magnet 218-10 as depicted in FIGS. 25A and 25B) is aligned with any particular alternative exemplary coil 232', one or more of the other counter-posed pairs of magnets may not necessarily be aligned with any of the other alternative exemplary coils 232'.

As will be understood by someone with ordinary skill in the art, in various alternative exemplary embodiments of PMG assembly 300', the number of counter-posed pairs of magnets in rotors 217a and 217b that would not be aligned at any one time with alternative exemplary coils 232' of the alternative exemplary stator 231' would depend on the number of coils and the number of counter-posed pairs of magnets used in the particular embodiment.

Figure 51:
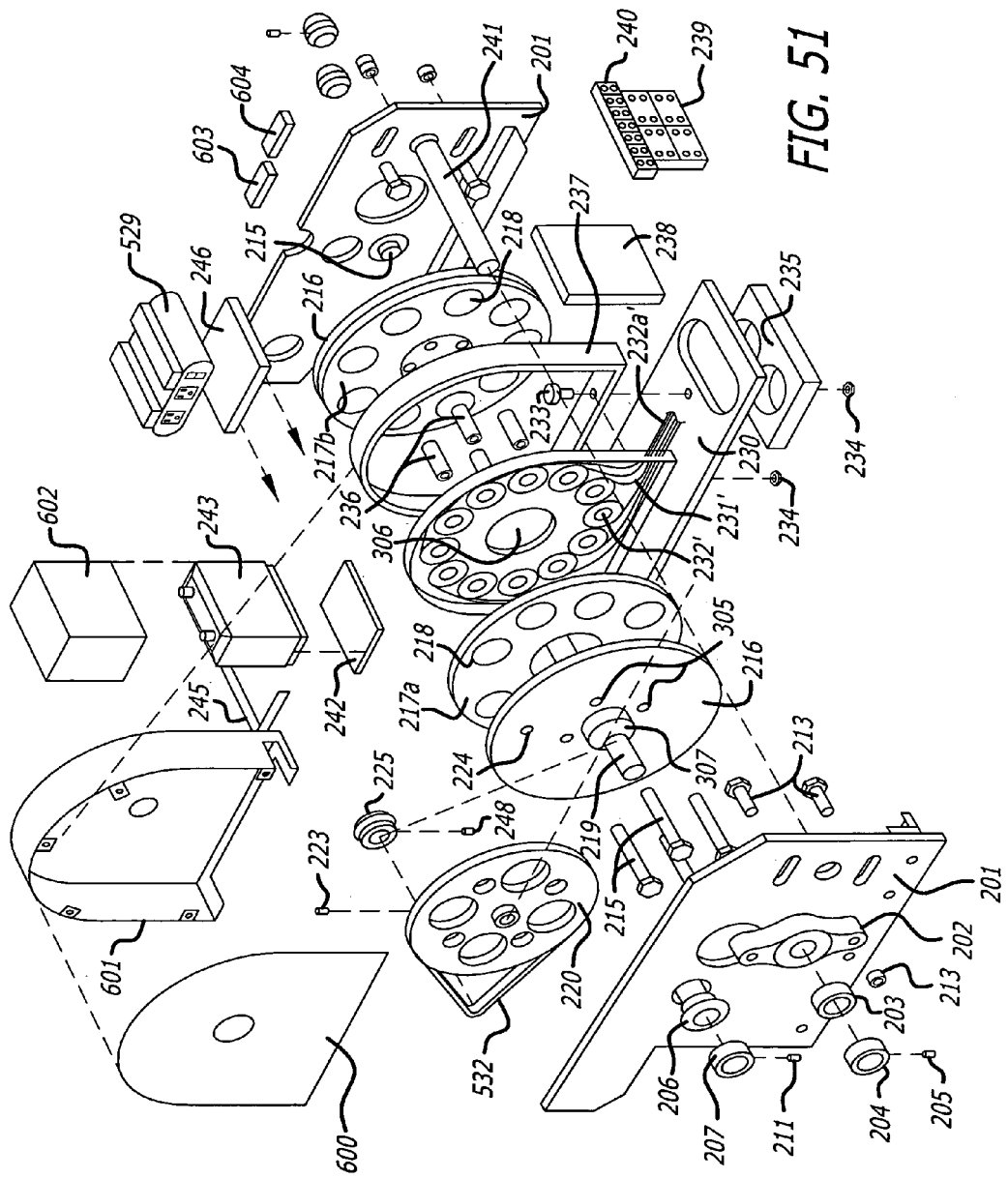
FIG. 51 is an exploded perspective view of an exemplary twelve-coil PMG embodiment device of the present invention.

It will be understood by someone with ordinary skill in the art that because there are more alternative exemplary coils 232' in the alternative exemplary stator 231' than there are pairs of counter-posed magnets (218-1 through 218-8 and 218-10 through 218-17) in the respective rotors 217a and 217b, then as compared to the exemplary PMG assembly 300 previously described above, fewer revolutions per minute of the rotors 217a and 217b of alternative exemplary PMG assembly 300' are needed to generate power at a level sufficient to begin charging a battery, e.g., battery 243 (depicted, e.g., in FIG. 51).

Figure 42:
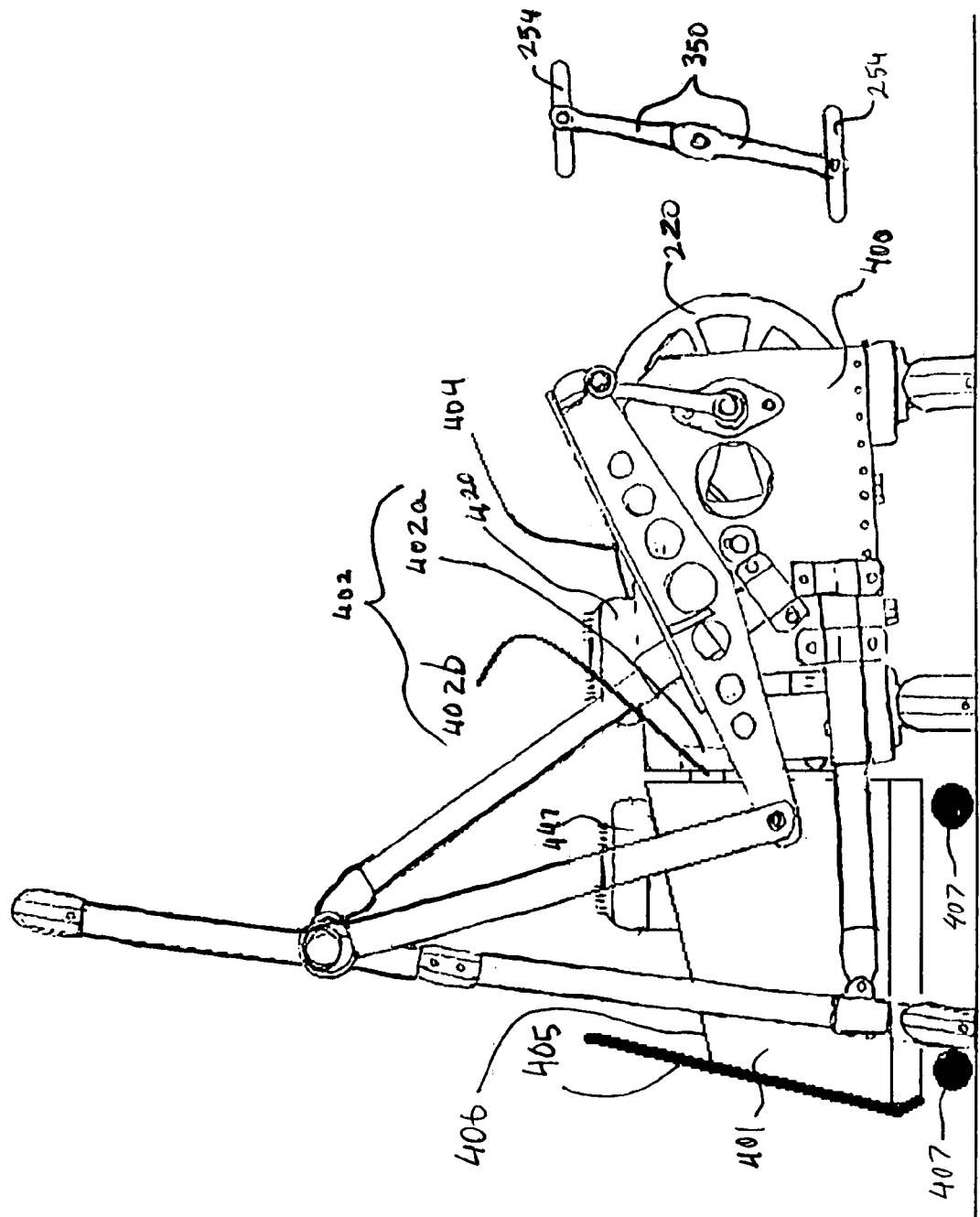
FIG. 42 is a side plan view of an assembled further alternative exemplary PMG device of a second exemplary PMG embodiment variation of the present invention in which an exemplary secondary battery is undocked from the device.
Figure 43:
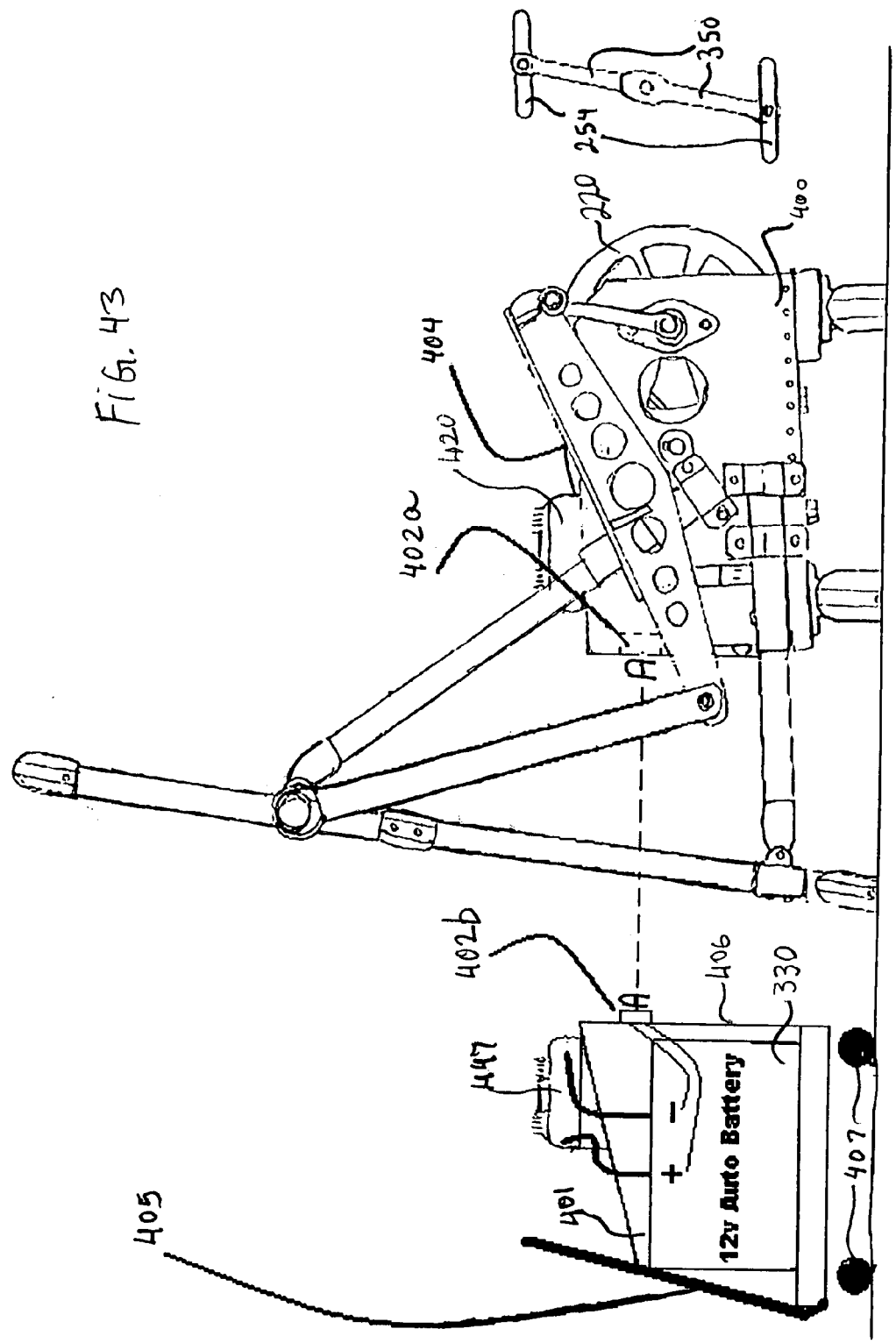
FIG. 43 is a side plan view of an assembled further alternative exemplary PMG device of a second exemplary PMG embodiment variation of the present invention in which an exemplary secondary battery is docked with the device.

Another difference between the exemplary PMG embodiment described above with respect to, for example, FIG. 18, and the alternative exemplary PMG embodiment described with respect to, for example, FIGS. 42 and 43, is that only two pulley wheels would be used.

FIG. 51 is an exploded perspective view of an exemplary twelve-coil PMG embodiment device of the present invention. As depicted in FIG. 51, the alternative exemplary PMG embodiment would comprise e.g., a small pulley wheel 225 (see similar element 531 in briefcase embodiment depicted in, e.g., FIGS. 45, 47, and 48), and a larger (e.g., approximately twelve (12) inches in diameter) pulley wheel 220 (a portion of which is visible in FIGS. 42 and 43). In FIG. 18, small pulley wheel 225, and larger pulley wheel 220, were not connected directly to each other with a V-belt—rather, there were additional intervening pulley wheels and V-belts used in the exemplary PMG embodiment. However, in FIG. 51, a single V-belt 532 is depicted for connecting small pulley wheel 225, and larger pulley wheel 220.

As with the exemplary PMG embodiment, in the alternative exemplary PMG embodiment, as depicted in FIG. 51, pulley wheel 220 is attached to a main pedal drive shaft 241. In the alternative exemplary PMG embodiment, main pedal drive shaft 241 is milled to accommodate pulley wheel 220, a set screw 223, and a pedal armature 350.

It will be understood by someone with ordinary skill in the art that the use of less pulley wheels results in less torque, and is therefore easier for a user to pedal. Further, it will be understood by someone with ordinary skill in the art that the above-described increased number of coils 232' and resulting lower-RPM requirement to generate storable charge, facilitates the implementation of a reduced number of pulley wheels to operate the alternative exemplary PMG embodiment.

Similar to the exemplary PMG embodiment, in the alternative exemplary PMG embodiment, as depicted in FIG. 51, the alternative exemplary stator 231' is encased around its perimeter in an aluminum stator casing 237. Similar to the exemplary PMG embodiment, in the alternative exemplary PMG embodiment, as depicted in FIG. 51, the alternative exemplary stator 231', encased in the stator casing 237, is bolted using bolts 233 to bolt the stator casing 237 to an aluminum framework casing floor panel 230. Ends 232a' of the alternative exemplary coils 232' are attached to block connectors 240 which are in turn connected to bridge rectifiers 239; the bridge rectifiers 239 are connected to "kill" switches 603 and 604; the "kill" switches are connected to batteries 243 and 602; the batteries are connected to an inverter 529, such as an 800-Watt inverter. As will be understood by someone with ordinary skill in the art, "kill" switches are sometimes referred to as cutoff switches. As will be understood by someone with ordinary skill in the art, "kill" switches such as "kill" switches 603 and 604, that are connected between a PMG embodiment and a battery can be used to "kill" the connection between the PMG embodiment and the relevant battery.

Similar to the exemplary PMG embodiment, in the alternative exemplary PMG embodiment, as depicted in FIG. 51, shaft 219 is inserted through the stop collar 307 and hole 308 in a first rotor/plate assembly, e.g., rotor 217a/plate 216, through the center of the hole 306' in the alternative exemplary stator 231', and through the hole 308 and stop collar 307 of a second rotor/plate assembly, e.g., rotor 217b/plate 216. A set screw 224 is threaded through each stop collar 307 to hold the shaft 219 in place.

It will be understood by someone with ordinary skill in the art that even though the shaft 219 that extends through each of the rotors 217a and 217b also extends through the center of the hole 306' of the alternative exemplary stator 231', because alternative exemplary stator 231' is encased in the stator casing 237, which is bolted to a framework casing floor panel 230, the alternative exemplary stator 231' remains stationary relevant to rotations of the rotors 217a and 217b. That is, even though the rotors 217a and 217b are coaxial to the alternative exemplary stator 231', when the rotors 217a and 217b rotate by the turning of shaft 219, the alternative exemplary stator 231' remains stationary.

Further, it will be understood by someone with ordinary skill in the art that by fastening set screws 224 through each stop collar 307 of each rotor/plate assembly, e.g., rotor 217a/plate 216 and 217b/216, the counterposed magnetic poles of pairs of magnets as between a first rotor, e.g., rotor 217a/plate 216 and a second rotor, e.g., 217b/216 can be aligned and maintained while the rotors 217a and 217b rotate by the turning of shaft 219.

Magnetic Shielding

In a second exemplary PMG embodiment variation of the present invention, a further alternative exemplary PMG device comprises, for example, a PMG assembly similar to the exemplary PMG assembly 300 described above with reference to, for example, FIG. 21, or a PMG assembly similar to the alternative exemplary PMG assembly 300' described above with reference to, for example, FIG. 41. In the second exemplary PMG embodiment variation, the PMG assembly (e.g., 300 or 300', or some further variation) is separated from the battery being charged, e.g., battery 243 (see, e.g., FIGS. 18 and 51) and/or e.g., battery 602 (see, e.g., FIG. 51) and/or, e.g., battery 330 (see, e.g., FIG. 38) with magnetic shielding, such as with high magnetic permeability shielding, such as for example, "mu metal." An embodiment that uses magnetic shielding is sometimes referred to herein as a magnetic shielding embodiment.

As will be understood by someone with ordinary skill in the art, "mu metal" is an alloy comprising nickel, iron, and molybdenum that has a high magnetic permeability—that is, it is what is sometimes described as a "soft" ferromagnetic material.

As will be understood by someone with ordinary skill in the art, the description of "mu metal" is not a limitation of the present invention. Rather, other types of materials, whether now known or in the future discovered, that exhibit similar magnetic permeability properties, or magnetic shielding properties, could be used without departing from the spirit of the present invention, including, for example, materials such as supermalloy, supermumetal, nilomag, sanbold, Mo-Permalloy, Ultraperm, M-1040, and the like.

In the second exemplary PMG embodiment variation of the present invention, mu metal is used to encase the PMG assembly (e.g., 300 (e.g., FIG. 21) or 300' (e.g., FIG. 40), or some further variation). In the second exemplary PMG embodiment variation of the present invention, mu metal is also used to encase each battery being charged, e.g., battery 243 (see, e.g., FIGS. 18 and 51) and/or e.g., battery 602 (see, e.g., FIG. 51) and/or, e.g., battery 330 (see, e.g., FIG. 38). Further, in the second exemplary PMG embodiment variation of the present invention, mu metal conduit is used to encase wiring.

In the various exemplary PMG devices depicted herein, the battery being charged, e.g., battery 243 (see, e.g., FIGS. 18 and 51) and/or e.g., battery 602 (see, e.g., FIG. 51) and/or, e.g., battery 330 (see, e.g., FIG. 38), is depicted in close proximity to the PMG assembly (e.g., 300 (e.g., FIG. 21) or 300' (e.g., FIG. 40), or some further variation). It will be understood by someone with ordinary skill in the art that locating the battery to be charged in close proximity to the PMG assembly is not a limitation of the present invention. Rather, it would be possible in various further alternative embodiments of the present invention to further separate the battery to be charged from the PMG assembly. However, one way to do so would involve stringing some expanse of wiring between the battery to be charged and the PMG assembly. Further, doing so would involve providing additional space to locate the battery so removed, and to locate the expanse of wire connecting, and at the same time, separating the battery and the PMG assembly. In order to minimize the space needed for locating an operable PMG device, the various exemplary PMG devices depicted herein show the battery being charged, e.g., battery 243 (see, e.g., FIGS. 18 and 51) and/or e.g., battery 602 (see, e.g., FIG. 51) and/or, e.g., battery 330 (see, e.g., FIG. 38), in close proximity to the PMG assembly (e.g., 300 (e.g., FIG. 21) or 300' (e.g., FIG. 41), or some further variation).

In the various exemplary PMG devices depicted herein, because of the close proximity of the battery being charged, e.g., battery 243 (see, e.g., FIGS. 18 and 51) and/or e.g., battery 602 (see, e.g., FIG. 51) and/or, e.g., battery 330 (see, e.g., FIG. 38) to the PMG assembly (e.g., 300 (e.g., FIG. 21) or 300' (e.g., FIG. 41), or some further variation), the close proximity of the magnetic field of the PMG assembly may tend to interact with the storage of power in the battery being charged. Without magnetic shielding, the tendency of interaction between the magnetic field of the PMG assembly (e.g., 300 (e.g., FIG. 21) or 300' (e.g., FIG. 41), or some further variation) and the battery tended to drain the battery of any charge stored.

In the second exemplary PMG embodiment variation, separation of the PMG assembly (e.g., 300 or 300', or some further variation) from the battery being charged, e.g. battery 243 (see, e.g., FIG. 18) and/or, e.g., battery 330 (see, e.g., FIG. 38) with magnetic shielding, such as with high magnetic permeability shielding, such as for example, "mu metal," tends to reduce the interaction between the magnetic field of the PMG assembly and the storage of power in the battery being charged. Therefore, with the "mu metal" shielding, drain of the charge in the battery by the interaction of the PMG assembly is reduced.

FIG. 42 is a side plan view of an assembled further alternative exemplary PMG device of a second exemplary PMG embodiment variation of the present invention in which a PMG casing 400 comprises magnetic shielding, such as high magnetic permeability shielding, such as for example, "mu metal." In the further alternative exemplary PMG device of the second exemplary PMG embodiment variation of the present invention depicted in FIG. 42, the PMG casing 400 comprising magnetic shielding material holds the PMG assembly (e.g., 300 or 300', or some further variation) and separates it from the battery being charged (see, e.g. battery 243 (see, e.g., FIG. 18) and/or, e.g., battery 330 (see, e.g., FIG. 38)). In the further alternative exemplary PMG device of the second exemplary PMG embodiment variation of the present invention depicted in FIG. 42, the battery being charged (not visible in FIG. 42) is encased in a battery casing 401 that also comprises magnetic shielding material.

In FIG. 51, magnetic shielding components 600 and 601 are used to encase the rotors 217a and 217b (on their respective steel disks 216) and the stator 231' (and its stator casing 237) of the alternative exemplary PMG embodiment.

Battery Docking Charge Link

The further alternative exemplary PMG device of the second exemplary PMG embodiment variation of the present invention depicted in FIG. 42 also depicts a battery docking charge link 402 comprising a connection between a power input charge link 402b of a secondary battery 330 (not visible in FIG. 42 but depicted in FIG. 43) with a power output charge link 402a of the PMG assembly (not visible in FIG. 42) that is contained within the PMG casing 400. The further alternative exemplary PMG device of the second exemplary PMG embodiment variation of the present invention depicted in FIG. 42 depicts a battery/battery casing assembly 406 comprising a secondary battery (e.g., element 330 depicted in FIG. 43, but not visible in FIG. 42) that is encased in battery casing 401. FIG. 42 further depicts battery/battery casing assembly 406 comprising an inverter 447 on top of battery casing 401.

FIG. 42 depicts battery/battery casing assembly 406 as docked (connected) with battery docking charge link 402. When the secondary battery (e.g., element 330 depicted in FIG. 43, but not visible in FIG. 42) that is encased in battery casing 401 is docked (connected) with battery docking charge link 402, "kill" switch(es) 404 may be turned to an "on" position so that secondary battery 330 may be charged through a user's operation of the PMG device.

FIG. 43 is a side plan view of the assembled further alternative exemplary PMG device of the second exemplary PMG embodiment variation of the present invention with a partial cutaway of battery casing 401 of the battery/battery casing assembly 406 showing secondary battery 330 that is encased in battery casing 401. (Primary battery 243 (not shown in FIG. 43, but see, for example, FIG. 51), is "on board" under, and contained within, PMG casing 400).

FIG. 43 depicts secondary battery 330 that is encased in battery casing 401 as being undocked (disconnected) from the further alternative exemplary PMG device. When secondary battery 330 is undocked from the battery docking charge link 402, the "kill" switch(es) 404 may be switched to the "off" position. However, as will be understood by someone with ordinary skill in the art, when the secondary battery 330 is undocked, and therefore disconnected, from the PMG device, the "kill" switch for the secondary battery 330 does not need to be turned to the "off" position. Rather, disconnecting (undocking) the secondary battery 330 is equivalent to the "kill" switch for the secondary battery 330 being switched to the "off" position.

In the undocked state of secondary battery 330 depicted in FIG. 43, the power input charge link 402b of secondary battery 330 has been disconnected and removed away along line A-A from the power output charge link 402a of the PMG assembly (not visible in FIG. 43) that is contained within the PMG casing 400.

It will be understood by someone with ordinary skill in the art that once a user is finished operating the PMG device, that turning the "kill" switch(es), e.g., 404, to the "off" position will prevent drain on the charge stored in the primary battery 243 (see, e.g., FIG. 51) and secondary battery 330 depicted, for example, in FIG. 43.

As previously mentioned above, FIG. 51 is an exploded perspective view of an exemplary twelve-coil PMG embodiment device of the present invention. As depicted in FIG. 51, the alternative exemplary PMG embodiment would comprise two "kill" switches 603 and 604. In addition to primary battery 243, FIG. 51 also depicts an auxiliary on-board battery 602. In the alternative exemplary PMG embodiment of the present invention depicted in FIG. 51, one "kill" switch, e.g., 603, would be wired to control charge into, and drain from, primary battery 243; the other "kill" switch, e.g., 604, would be wired to control charge into, and drain from, auxiliary on-board battery 602.

FIG. 51 also depicts an 800-Watt inverter 529. It will be understood by someone with ordinary skill in the art that description herein of a particular Wattage of any inverter described herein is not a limitation of the invention. Rather, inverters for other Watt levels could be used without departing from the spirit of the invention. Further, in some embodiments, where, as depicted in FIG. 51, multiple batteries (e.g., primary battery 243 and auxiliary on-board battery 602), are used, a separate inverter could be used for each battery.

FIGS. 42 and 43 depict swivel wheels 407 attached on the bottom of the battery/battery casing assembly 406. FIGS. 42 and 43 also depict a telescoping pull handle 405 attached to the battery/battery casing assembly 406. The docking/undocking link 402 (comprising the power input charge link 402b of secondary battery 330 and the power output charge link 402a of the PMG assembly), the telescoping pull handle 405, and the swivel wheels 407 facilitate portability for movement of a charged secondary battery 330 within the battery casing 401 away from the PMG device when the charged secondary battery 330 has been undocked from the PMG device. The portability of secondary battery 330 provides a user with the ability to charge the secondary battery 330 in one location, and then move the charged secondary battery 330 to another location to power, for example, a larger appliance that may not be easily moveable.

Star Wiring

It will be understood by someone with ordinary skill in the art that FIG. 39 depicts an exemplary delta wiring configuration of wiring connections between the exemplary PMG assembly 300 described previously above and various electrical components of the further alternative exemplary device in the exemplary PMG embodiment of the present invention.

Figure 44:
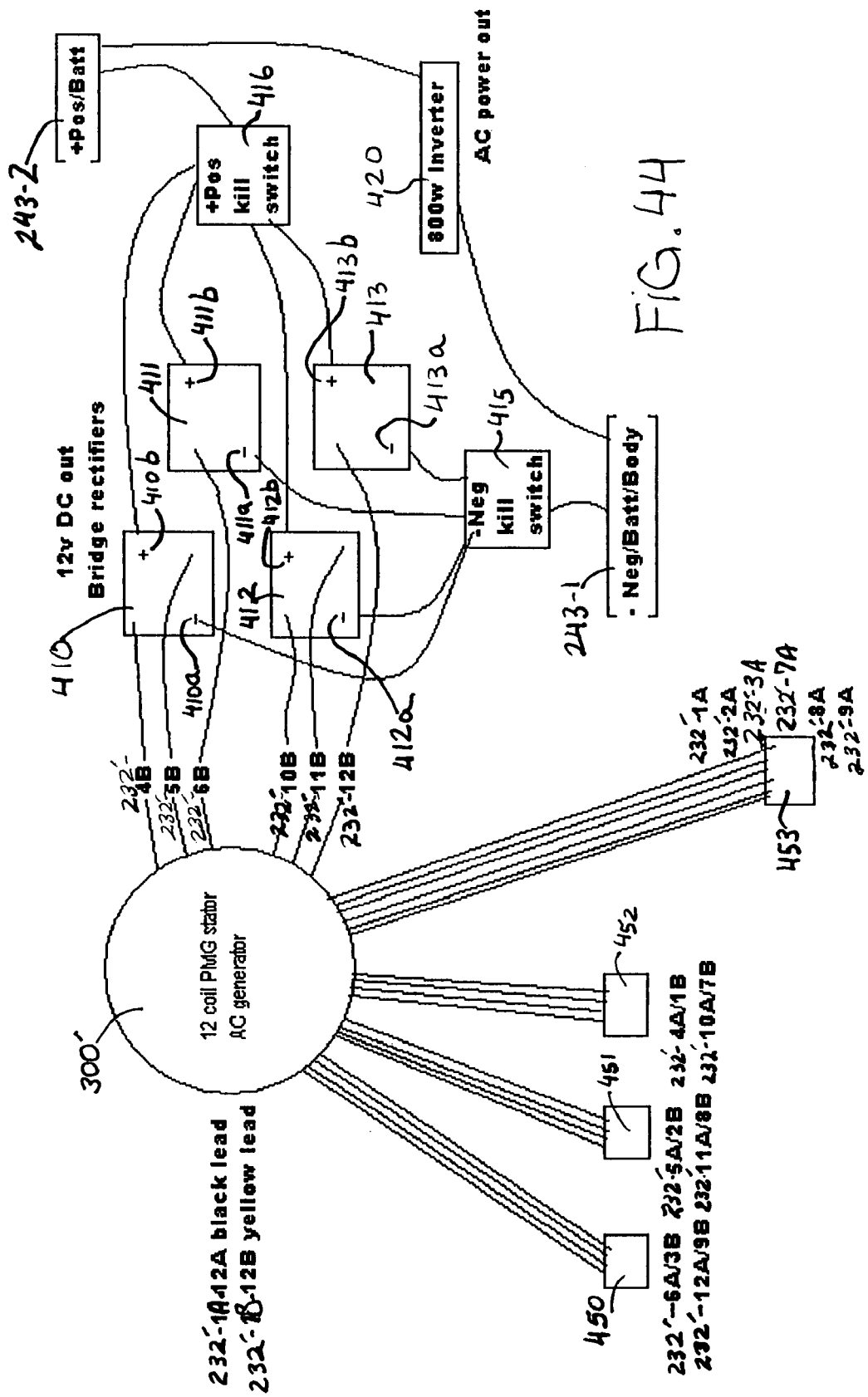
FIG. 44 is a semi-schematic diagram depicting exemplary connections for an exemplary twelve-coil PMG assembly in an alternative exemplary PMG embodiment of the present invention.

Because as was previously described above, as compared to the exemplary PMG assembly 300 previously described above, fewer revolutions per minute of the rotors 217a and 217b of alternative exemplary PMG assembly 300' are needed to generate power at a level sufficient to begin charging a battery, e.g., battery 243 (depicted, e.g., in FIG. 51), then the alternative exemplary PMG assembly 300' comprises a star wiring configuration, as depicted in overview in the semi-schematic drawing of FIG. 44 of wiring connections in an exemplary twelve-coil PMG embodiment of the present invention.

As will be understood by someone with ordinary skill in the art, with a star wiring configuration for a three-phase alternator such as alternative exemplary PMG assembly 300', the start of each of the three phases is connected together and connections from the ends of the three phases are taken to provide the three phases.

As will be understood by someone with ordinary skill in the art, with Delta wiring configurations, on the other hand, the starts and ends are connected—that is, the end of phase one (1) is connected to the start of phase two (2); the end of phase two (2) is connected to the start of phase three (3); and the end of phase three (3) is connected to the start of phase one (1).

Further, it will be understood by someone with ordinary skill in the art that star configurations, as compared to delta configurations, generate a high voltage at a low current; whereas a delta configuration generates a low voltage at a high current.

It will be understood by someone with ordinary skill in the art that use of a star or delta wiring configuration is not a limitation of the present invention. Rather, for example, in some embodiments, operation of the relevant PMG assembly would begin with connection to a star wiring configuration, and then at a certain RPM, would switch to a delta wiring configuration.

Figures 27, 28, 29, 30:
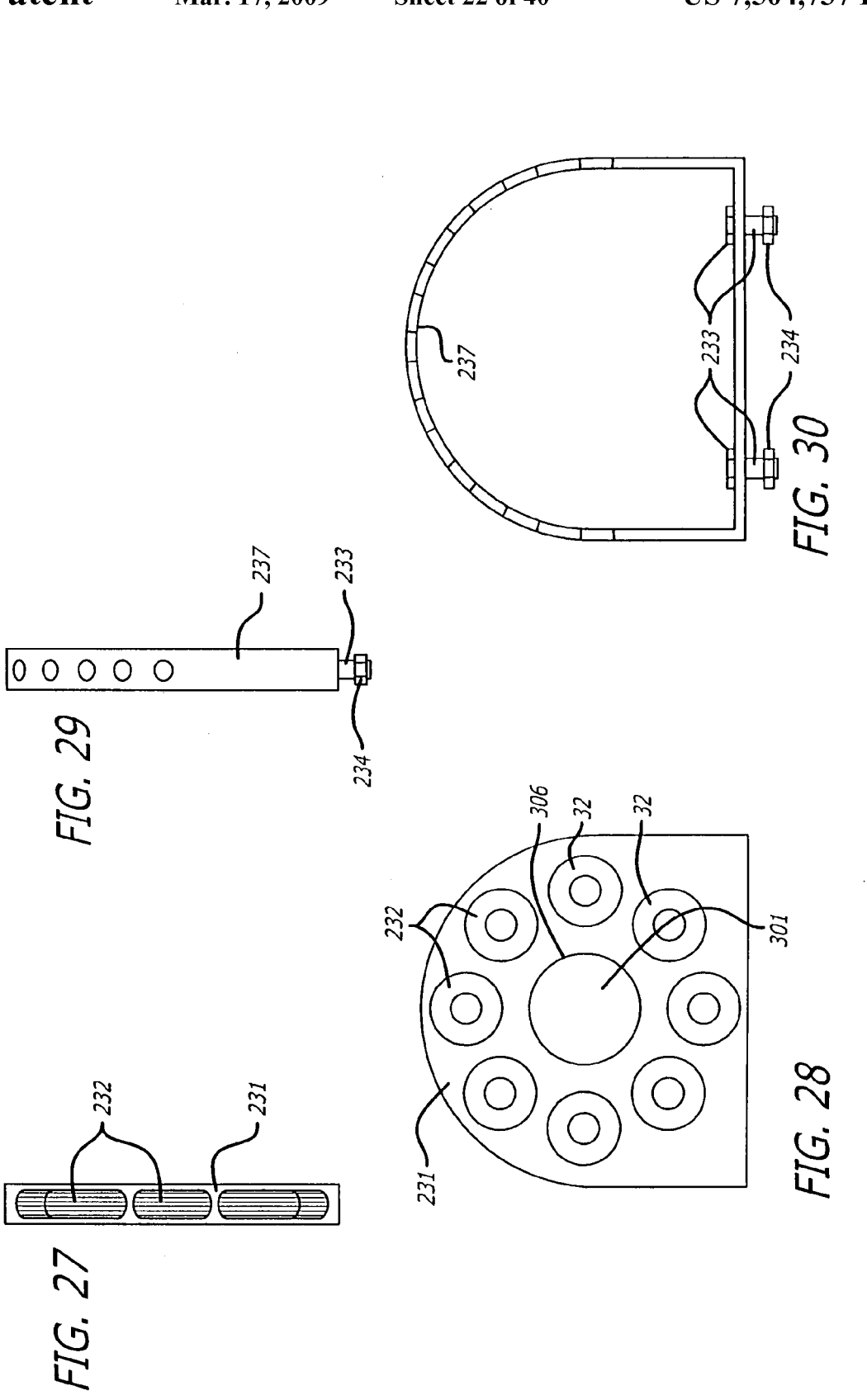
FIG. 27 is a cross-sectional front view of an exemplary stator in the further alternative exemplary device in the exemplary PMG embodiment of the present invention.
FIG. 28 is a side plan view of an exemplary stator in the further alternative exemplary device in the exemplary PMG embodiment of the present invention.
FIG. 29 is a front plan view of an exemplary stator casing in the further alternative exemplary device in the exemplary PMG embodiment of the present invention.
FIG. 30 is a side plan view of an exemplary stator casing in the further alternative exemplary device in the exemplary PMG embodiment of the present invention.

In both delta and star wiring configurations, the three phase output wires are connected to bridge rectifiers (see, e.g., bridge rectifiers 410-413 depicted in FIG. 44) to rectify the generated alternating current voltage into direct current voltage for charging a battery, e.g., battery 243 (depicted, for example, in FIGS. 29 and 51).

In the twelve-coil PMG embodiment, there is provided an "A" (black) lead wire and a "B" (yellow) lead wire for each of the alternative exemplary coils 232'. The twelve-coil PMG embodiment lead wires are mentioned on FIG. 44 as 232'-1A through 232'-12A and 232'-1B through 232'-12B. Wiring connection hook-up 450 depicts wiring connection hookup of the twelve-coil PMG embodiment lead wires 232'-6A, 232'-3B, 232'-12A, and 232'-9B. Wiring connection hoop-up 451 depicts wiring connection hookup of the twelve-coil PMG embodiment lead wires 232'-5A, 232'-2B, 232'-111A, and 232'-8B. Wiring connection hook-up 452 depicts wiring connection hookup of the twelve-coil PMG embodiment lead wires 232'-4A, 232'-1B, 232'-10A, and 232'-7B. Wiring connection hook-up 453 depicts wiring connection hookup of the twelve-coil PMG embodiment lead wires 232'-1A, 232'-2A, 232'-3A, 232'-7A, 232'-8A, and 232'-9A.

FIG. 44 depicts connection of the twelve-coil PMG embodiment lead wires 232'-4B and 232'-5B to bridge rectifier 410. FIG. 44 depicts connection of the twelve-coil PMG embodiment lead wire 232'-6B to bridge rectifier 411. FIG. 44 depicts connection of the twelve-coil PMG embodiment lead wires 232'-10A and 232'-11B to bridge rectifier 412. FIG. 44 depicts connection of the twelve-coil PMG embodiment lead wire 232'-12B to bridge rectifier 413.

FIG. 44 depicts connection of the negative outputs (410a, 411a, 412a, and 413a) of the bridge rectifiers 410-413 to a negative "kill" switch 415, which is in turn connected to the negative input 243-1 of battery 243 (not separately depicted in FIG. 44). FIG. 44 depicts connection of the positive outputs (410b, 411b, 412b, and 413b) of the bridge rectifiers 410-413 to a positive "kill" switch 416, which is in turn connected to the positive input 243-2 of battery 243 (not separately depicted in FIG. 44).

As depicted in FIG. 44, in the battery (243 comprising 243-1/243-2) of the further alternative exemplary PMG device of a second exemplary PMG embodiment variation of the present invention is connected to an 800 watt inverter. In the further alternative exemplary PMG device, the 800 watt inverter is analog. An analog inverter is used because an analog device only uses power when it is turned on; whereas a digital device is always "on," drawing at least some power. Even though a digital device's use of power is not great, constant use of even a small amount over an extended period of time will drain power stored in a battery.

As was previously mentioned above, it will be understood by someone with ordinary skill in the art that description herein of a particular Wattage of any inverter described herein is not a limitation of the invention. Rather, inverters for other Watt levels could be used without departing from the spirit of the invention.

BRIEFCASE EMBODIMENT

The above-described magnetic shielding facilitates close-proximity configuration of the various elements of a PMG device. An exemplary "briefcase" embodiment that would use magnetic shielding is depicted in FIGS. 45 through 50. The exemplary briefcase embodiment would comprise a twelve-coil PMG assembly such as the exemplary twelve-coil PMG assembly 300' described above. As previously explained above, the description herein of twelve coils on the stator of a PMG assembly is not a limitation of the invention. Numbers of coils other than twelve per stator, and numbers of magnets other than eight per rotor, could be used without departing from the spirit of the present invention.

Figure 45:
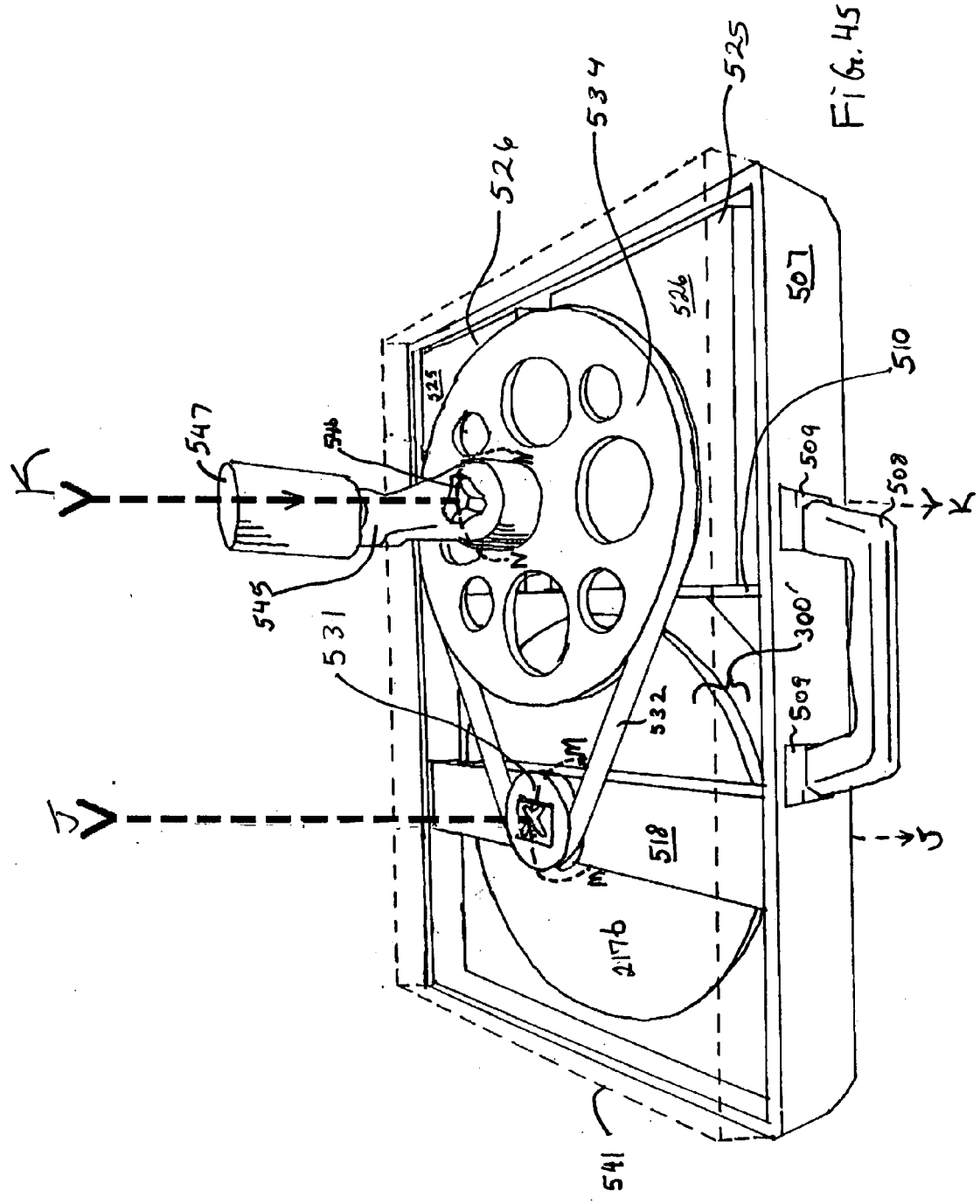
FIG. 45 is a top perspective view of an exemplary briefcase embodiment of the present invention in which the top, or lid, of the briefcase-like container has been cutaway.

FIG. 45 depicts a top perspective view of an exemplary briefcase embodiment of the present invention in which the top, or lid 541, of the briefcase-like container has been cut-away to show the alignment of a small pulley wheel 531, a large pulley wheel 534, a single V-belt 532, a twelve-coil PMG 300', and two batteries 525 and 526.

As will be described further below, the exemplary briefcase embodiment of the present invention could be operated by a single foot pedal or hand crank, or could be operated with two foot pedals/hand cranks.

Figure 46:
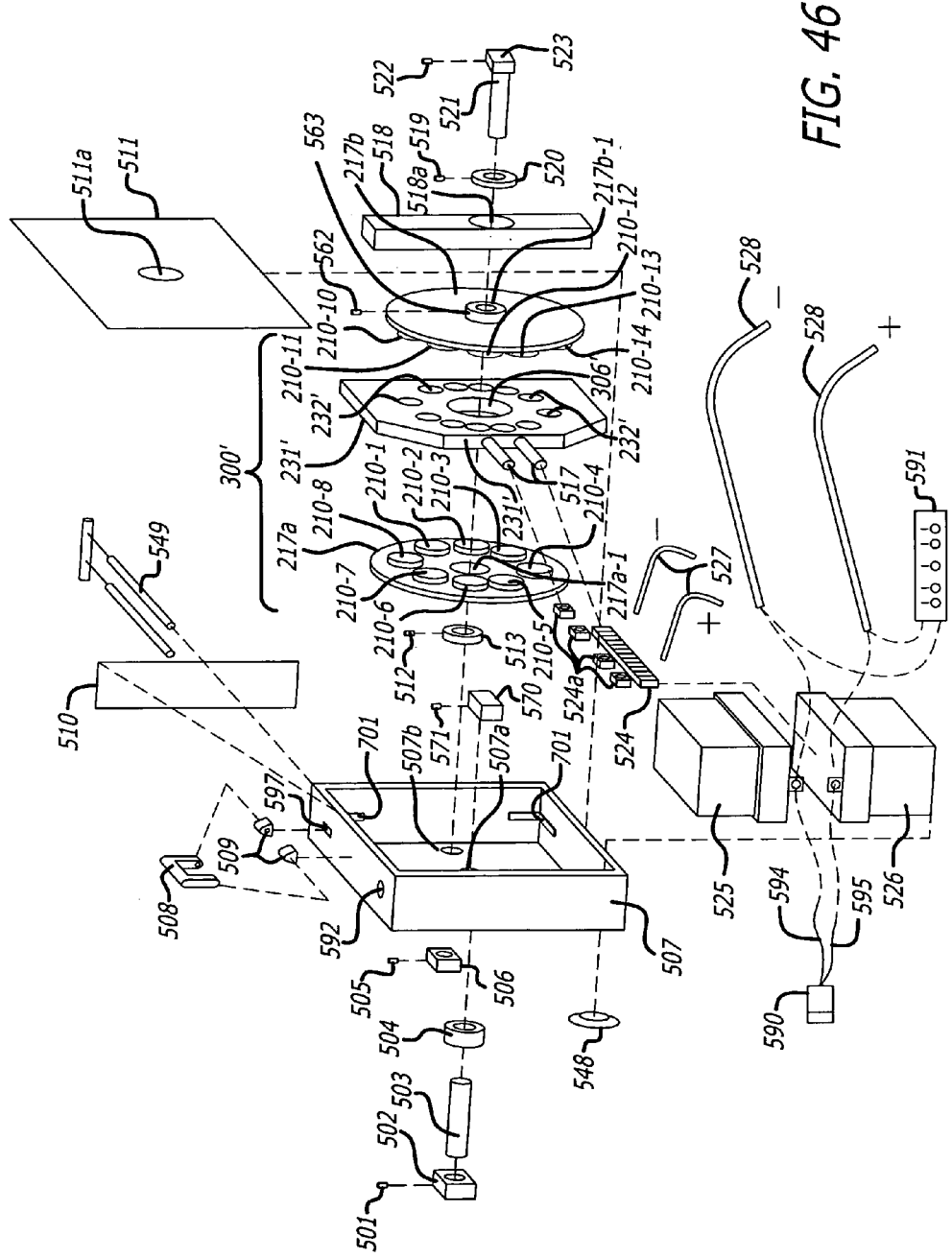
FIG. 46 is an exploded perspective view of an exemplary PMG-half of an exemplary briefcase embodiment of the present invention.

FIG. 46 is an exploded perspective view of an exemplary PMG-half of an exemplary briefcase embodiment of the present invention. As depicted in FIG. 46, the exemplary PMG-half of the exemplary briefcase embodiment would comprise a set screw 501, a crank key 502, a drive wheel shaft 503, and a bearing 504 for the drive wheel shaft 503. Set screw 501 would be used to fasten crank key 502 on the end of the drive wheel shaft 503. Drive wheel shaft 503 would be inserted through bearing 504 and through opening 507a in a main base casing 507. Set screw 571 would be used to fasten large drive pulley wheel shaft key 570 over the end of drive wheel shaft 503 that would be inserted through opening 507a. As further described below, large drive pulley wheel shaft key 570 would key into a key hole 580 (see, e.g., FIG. 47) of a large (e.g., twelve-inch diameter) main power drive pulley 534 (see, e.g., FIG. 47). Optional rotation of drive wheel shaft 503 will be described further below.

Figure 47:
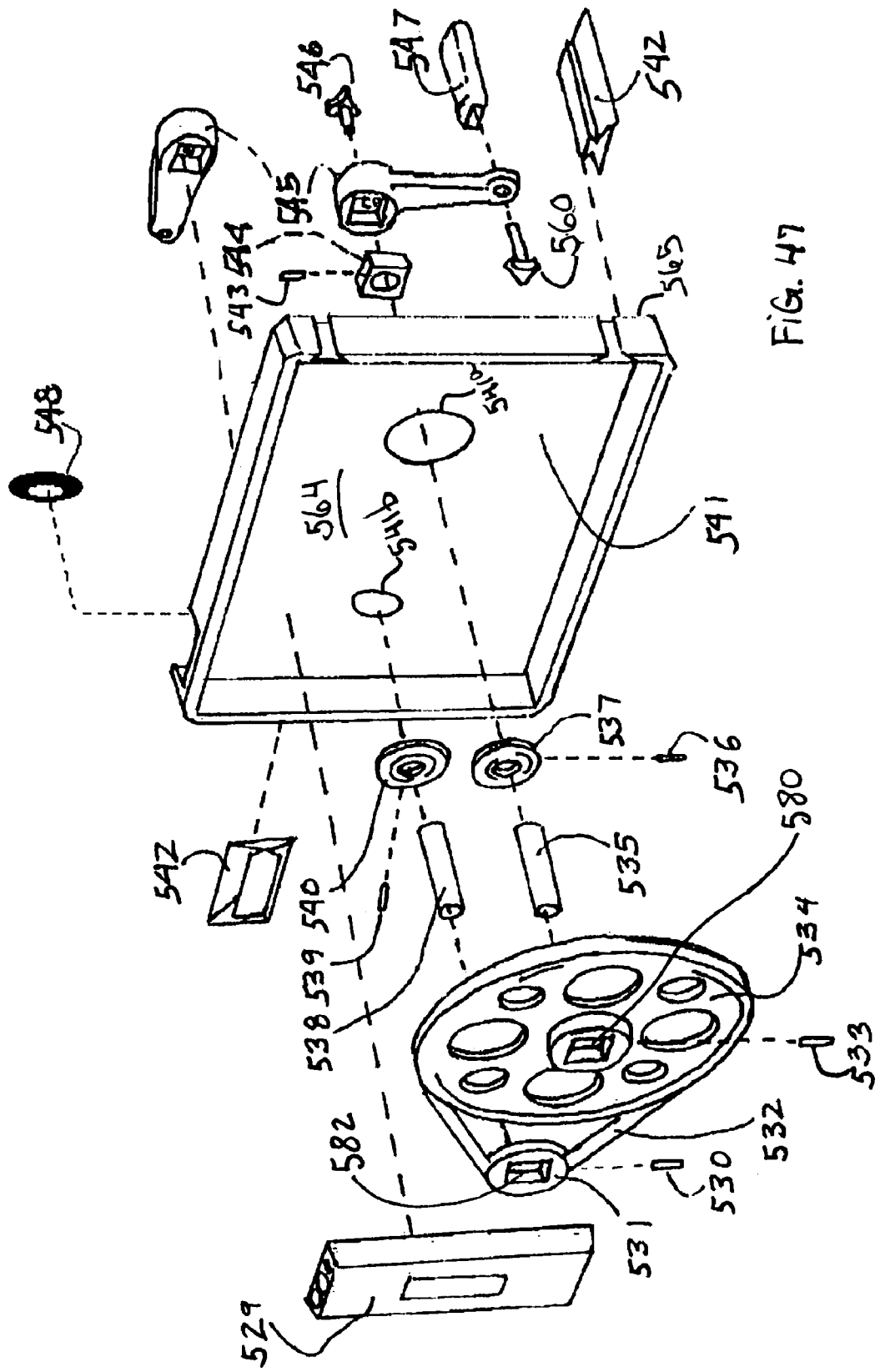
FIG. 47 is an exploded perspective view of an exemplary lid-half, or hinged top half, of the exemplary briefcase embodiment of the present invention.

As depicted in FIG. 46, the exemplary PMG-half of the exemplary briefcase embodiment would further comprise main base casing 507 that would comprise internally encased magnetic shielding (not visible in FIG. 46) in the sides and bottom of main base casing 507. As depicted in FIG. 46, the exemplary PMG-half of the exemplary briefcase embodiment would further comprise a carrying handle 508 that would be fastened to carrying handle hinges 509 that would in turn be attached to the base casing 507. An extendable, collapsible handle would be provided to pull the case on its roller wheels 548 (FIGS. 46 and 47).

As depicted in FIG. 46, the exemplary PMG-half of the exemplary briefcase embodiment would further comprise internal side magnetic shielding 510 to shield the two batteries 525 and 526 from the magnetic field of the exemplary twelve-coil PMG 300'. As depicted in FIG. 46, the exemplary PMG-half of the exemplary briefcase embodiment would further comprise a main drive shaft bearing 513 and a generator drive main shaft bearing set screw.

As depicted in FIG. 46, the exemplary PMG-half of the exemplary briefcase embodiment would further comprise an exemplary twelve-coil PMG assembly 300' comprising internal rotor 217a and external rotor 217b on the interior and exterior sides respectively of exemplary stator 231'. In the exemplary PMG-half of the exemplary briefcase embodiment depicted in FIG. 46, exemplary rotors 217a and 217b would each comprise eight (8) exemplary neodymium magnets (e.g., 210-1 through 210-8 and 210-10 through 210-17, not all of which are visible in FIG. 46). In the exemplary PMG-half of the exemplary briefcase embodiment depicted in FIG. 46, the exemplary stator 231' would comprise twelve exemplary coils 232' (e.g., 232'-1 through 232'-12 (not separately labeled in FIG. 46)). "A" and "B" stator wires from the respective twelve exemplary coils 232' would pass through magnetically shielded conduit 517 to four (4) bridge rectifiers 524a. Bridge rectifiers 524a would be connected to block connector 524. Battery wires 527 would connect block connector 524 to batteries 525 and 526. Primary output cables 528 would connect batteries 525 and 526 to an 800-Watt analog inverter 529 (shown, e.g., in FIGS. 47 and 48). Primary output cables 528 would also connect batteries 525 and 526 to an exemplary in-line twelve-volt (12V) LED battery and charge tester 591.

FIG. 46 depicts an exemplary open-face magnetic shielding panel 511. In the exemplary briefcase embodiment, open-face magnetic shielding panel 511 would be placed on top of exemplary rotor 217b of the exemplary briefcase embodiment for additional magnetic shielding of the batteries 525 and 526.

FIG. 46 depicts exemplary frontal generator support mast 518. Frontal generator support mast 518 would be fastened over open-face magnetic shielding panel 511. Generator mast bearing 520 would be fastened over frontal generator support mast 518.

In the exemplary PMG-half of the exemplary briefcase embodiment depicted in FIG. 46, exemplary generator drive shaft key set screw 522 would fasten generator main shaft key 523 to primary generator central drive shaft 521. Primary generator central drive shaft 521 would be inserted through generator mast bearing 520, through opening 518a of frontal generator support mast 518, through opening 511a in open-face magnetic shielding panel 511, through opening 217b-1 in rotor 217b, through opening 306' in stator 231', through opening 217a-1 in rotor 217a, through main drive shaft bearing 513, and through opening 507b in main base casing 507. Internal gear registration key 506 would be fastened over the end of primary generator central drive shaft 521 with set screw 505. Set screw 512 would be used to fasten the main drive shaft bearing 513 and rotor 217a to the primary generator central drive shaft 521 so that rotor 217a would rotate when the primary generator central drive shaft 521 rotates.

Set screw 562 would be used to fasten opening sleeve 563 of rotor 217b to the primary generator central drive shaft 521 so that rotor 217b would rotate when the primary generator central drive shaft 521 rotates.

When assembled, the alternative exemplary stator 231' of the exemplary briefcase embodiment would be cradled in registration cradles 701 depicted inside around the sides of main base casing 507. Cradling the alternative exemplary stator 231' of the exemplary briefcase embodiment in registration cradles 701 would facilitate keeping the alternative exemplary stator 231' of the exemplary briefcase embodiment substantially stationary relative to exemplary rotors 217a and 217b, while rotors 217a and 217b are rotated, such as by the turning of the primary generator central drive shaft 521.

In the exemplary briefcase embodiment depicted in, e.g., FIG. 48, the exemplary batteries 525 and 526 would be contained in very close proximity to the exemplary twelve-coil PMG assembly 300', separated from the exemplary twelve-coil PMG assembly 300' by magnetic shielding, including internal side magnetic shielding 510; exemplary batteries 525 and 526 would be further shielded from the magnetic flux of the exemplary twelve-coil PMG assembly 300' by, for example, open-face magnetic shielding panel 511, magnetic shielding internally encased in the sides and bottom of main base casing 507 (not visible in FIG. 48), and by magnetically shielded conduit 517.

As depicted in FIG. 48, in the exemplary briefcase embodiment, the exemplary batteries 525 and 526 would abut, that is, would be adjacent, or closely adjacent, to one face of internal side magnetic shielding 510; portions of the exemplary twelve-coil PMG assembly 300' would abut, that is, would be adjacent, or closely adjacent, to the opposite face of internal side magnetic shielding 510.

Returning with reference to FIG. 46, exemplary wires 594 and 595 would connect exemplary batteries 525 and 526 respectively to an exemplary direct current (DC) outlet 590. Exemplary direct current (DC) outlet 590 would be adapted for receiving a plug of a direct current (DC)-enabled device, such as, for example, a DC adapter of a cell phone, a computer, or the like.

Figure 52:
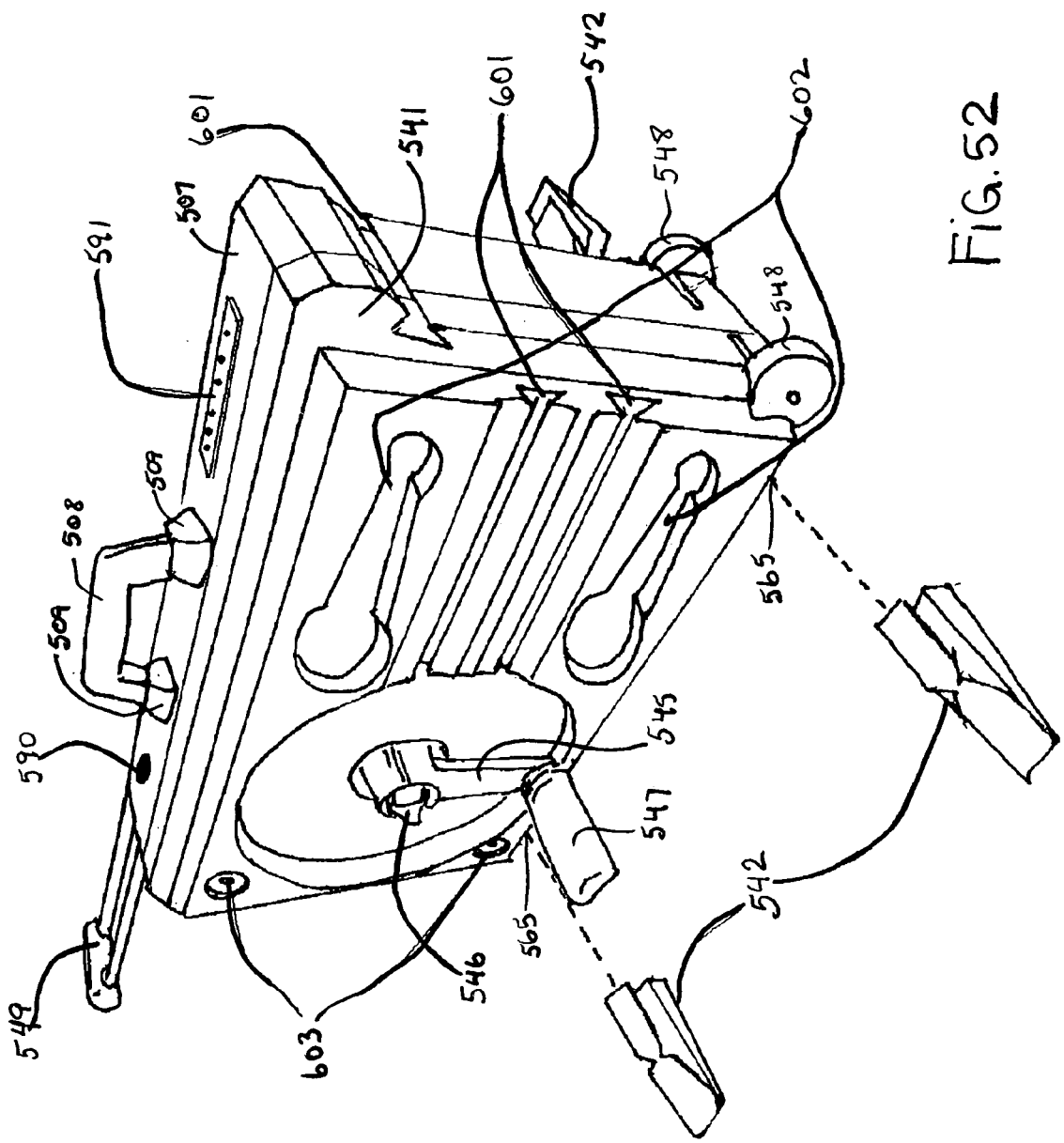
FIG. 52 is a perspective view of an exemplary briefcase embodiment of the present invention showing the exterior of the exemplary briefcase embodiment in a closed position.

The exemplary bottom PMG-half main base casing 507 of the exemplary briefcase embodiment depicted in FIG. 46 would comprise a hole 592 in which exemplary DC outlet 590 depicted in FIG. 46 would be seated for availability for connection to a DC outlet plug of a DC-enabled device. The exemplary bottom PMG-half main base casing 507 of the exemplary briefcase embodiment depicted in FIG. 46 would further comprise a hole 597 in which exemplary in-line twelve-volt (12V) LED battery and charge tester 591 depicted in FIG. 46 would be seated for view. FIGS. 48 and 52 depict exemplary DC outlet 590 and exemplary in-line twelve-volt (12V) LED battery and charge tester 591 in exemplary bottom PMG-half main base casing 507.

FIG. 47 is an exploded perspective view of an exemplary lid-half, or hinged top half, of the exemplary briefcase embodiment of the present invention. The exemplary lid-half, or hinged top half, of the exemplary briefcase embodiment of the present invention comprises a lid, or hinged top of unit housing, 541.

As depicted in FIG. 47, in the exemplary briefcase embodiment, removable, stowable legs 542 would be provided. The exemplary removable, stowable legs 542 could be stowed in exemplary indentations (e.g., stabilizer feet stowing slots) 601 depicted in FIG. 52 in the exterior of the exemplary main base casing 507 and the exemplary lid 541. For stabilizing the unit for operation, the removable, stowable legs 542 could be inserted into receptacles, e.g., 565 in the lid 541 (and in similar receptacles (not shown) in the main base casing 507).

As depicted in FIG. 47, in the exemplary briefcase embodiment, an 800-Watt analog inverter 529 is fastened to the interior 564 of the lid 541. As was mentioned previously above with reference to FIG. 46, the 800-Watt analog inverter 529 is connected by cables 528 to batteries 525 and 526 contained in the main base casing 507.

As previously mentioned above, it will be understood by someone with ordinary skill in the art that description herein of a particular Wattage of any inverter described herein is not a limitation of the invention. Rather, inverters for other Watt levels could be used without departing from the spirit of the invention.

The exemplary lid half of the exemplary briefcase embodiment depicted in FIG. 47 would further comprise a first removable, stowable hand crank/foot pedal 547, a first keyed removable, stowable hand crank/foot pedal armature 545, a first armature tightening nut 546 for fastening the first keyed removable, stowable hand crank/foot pedal armature 545 over main pulley wheel shaft external key 544 to engage a main drive pulley wheel shaft 535, and a first foot pedal tightening nut 560 for fastening the first removable, stowable hand crank/foot pedal 547 to the first keyed removable, stowable hand crank/foot pedal armature 545.

In the exemplary briefcase embodiment, when the unit is not in operation, a user would be able to disengage the armature 545 and hand crank/foot pedal 547 from the main drive pulley wheel shaft 535, and stow them in indentations in the exterior of the lid 541 (and main base casing 507), (the exterior stowing indentations not being shown in FIG. 47; but see FIG. 52).

FIG. 52 is a perspective view of an exemplary briefcase embodiment of the present invention showing the exterior of the exemplary briefcase embodiment in a closed position. FIG. 52 depicts exemplary crank and foot pedal stowing indentations 602 in the exterior or lid 541 for stowing hand crank/foot pedal armature 545 and hand crank/foot pedal 547 assemblies. FIG. 52 further depicts exemplary armature tightening nut stow holes 603 for stowing armature tightening nuts 546.

The exemplary lid half of the exemplary briefcase embodiment depicted in FIG. 47 would further comprise a main drive pulley wheel shaft bearing through which the main drive pulley wheel shaft 535 would be inserted. One end of the main drive pulley wheel shaft 535 would engage the large pulley wheel 534 using set screw 533; the other end would be inserted through main drive pulley wheel shaft bearing 537 and through opening 541a of the lid 541 and would be engaged by the main pulley shaft external key 544; the main drive pulley wheel shaft bearing would be fastened to the main drive pulley wheel shaft 535 using set screw 536.

The exemplary lid half of the exemplary briefcase embodiment depicted in FIG. 47 would further comprise an internal generator keyed drive shaft 538. One end of the internal generator keyed drive shaft 538 would engage the smaller pulley wheel 531 using set screw 530; the other end would be inserted through main keyed internal generator shaft bearing 540 and through opening 541b of the lid 541, and would be capped on the exterior side of the lid 541 with an exterior generator shaft key (not visible in FIG. 47). Set screw 539 would be used to connect the main keyed internal generator shaft bearing 540 to the internal generator keyed drive shaft 538.

Returning with reference to FIG. 46, the exemplary PMG-half of the exemplary briefcase embodiment depicted in FIG. 46 would further comprise for optional use by a user, a second removable, stowable hand crank/foot pedal 547 (not visible in FIG. 46, but see opposing lid side depicted in FIGS. 47 and 52), a second keyed removable, stowable hand crank/foot pedal armature 545 (also not visible in FIG. 46, but see opposing lid side depicted in FIGS. 47 and 52), a second armature tightening nut 546 (also not visible in FIG. 46, but see opposing lid side depicted in FIGS. 47 and 52) for fastening the second keyed removable, stowable hand crank/foot pedal armature 545 over crank key 502 to engage large drive wheel pulley shaft 503, and a second foot pedal tightening nut 560 (also not visible in FIG. 46, but see opposing side depicted in FIG. 47) for fastening the second removable, stowable hand crank/foot pedal 547 to the second keyed removable, stowable hand crank/foot pedal armature 545.

As depicted in FIG. 52, two exemplary crank and foot pedal stowing indentations 602 are provided in the exterior or lid 541 for both lid (541) and main case (507) stowing hand crank/foot pedal armature 545 and hand crank/foot pedal 547 assemblies; two exemplary armature tightening nut stow holes 603 are depicted for stowing both lid (541) and main case (507) armature tightening nuts 546.

With reference to FIGS. 46 and 47, it will be understood by someone with ordinary skill in the art that when the lid, or hinged top of unit housing, 541 of the exemplary briefcase embodiment is closed onto the main base casing 507, the large drive pulley wheel shaft key 570 will key into the key opening 580 of the large drive pulley wheel 534; the rotation of drive wheel shaft 503 by pedaling/cranking the assembly of the first removable, stowable hand crank/foot pedal 547 and the first keyed removable, stowable hand crank/foot pedal armature 545 would rotate main drive pulley wheel shaft 535, causing rotation of the large drive pulley wheel 534. Rotation of the large drive pulley wheel 534 would in turn engage V-belt 532 to cause rotation of smaller pulley wheel 531.

Further, with reference to FIGS. 46 and 47, it will be understood by someone with ordinary skill in the art that when the lid, or hinged top of unit housing, 541 of the exemplary briefcase embodiment is closed onto the main base casing 507, the large drive pulley wheel shaft key 570 will key into the key opening 580 of the large drive pulley wheel 534; the optional rotation of drive wheel shaft 503 by pedaling/cranking the assembly of the second removable, stowable hand crank/foot pedal 547 and the second keyed removable, stowable hand crank/foot pedal armature 545 would engage the large drive pulley wheel shaft key 570 with the key opening 580 of the large drive pulley wheel 534, causing rotation of the large drive pulley wheel 534. Rotation of the large drive pulley wheel 534 would in turn engage V-belt 532 to cause rotation of smaller pulley wheel 531.

With reference to FIGS. 46 and 47, It will be understood by someone with ordinary skill in the art that when the lid, or hinged top of unit housing, 541 of the exemplary briefcase embodiment is closed onto the main base casing 507, generator main shaft key 523 would key into the key opening 582 of the smaller pulley wheel 531. It will be understood by someone with ordinary skill in the art that when the lid, or hinged top of unit housing, 541 of the exemplary briefcase embodiment is closed onto the main base casing 507, rotation of smaller pulley wheel 531 would cause the key opening 582 of the smaller pulley wheel 531 to engage the generator main shaft key 523, causing rotation of the exemplary rotors 217a and 217b, and thereby causing magnetic flux to pass through the exemplary coils 232' of the exemplary twelve-coil stator 231'.

Figure 49:
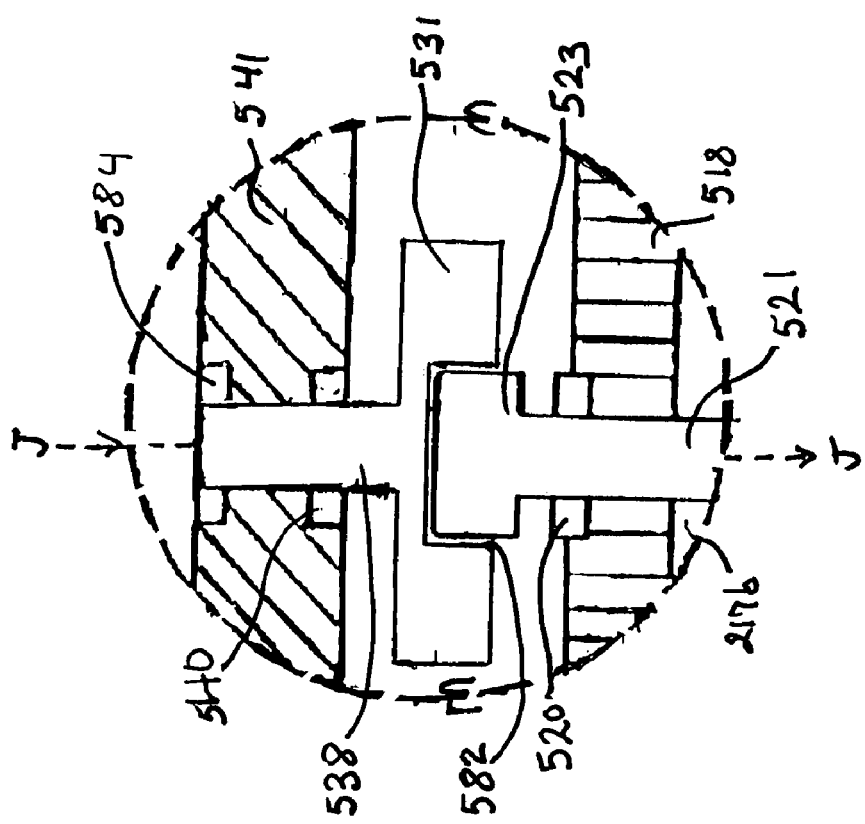
FIG. 49 is an enlarged cross-sectional view taken along line M-M, showing directional reference line J-J, depicting the interface between the generator main shaft key and the key opening of the smaller pulley wheel of an exemplary briefcase embodiment when the lid, or hinged top of unit housing, of the exemplary briefcase embodiment is closed onto the main base casing of the exemplary briefcase embodiment.

FIG. 49 is an enlarged cross-sectional view taken along line M-M, showing directional reference line J-J, depicting the interface between the generator main shaft key 523 and the key opening 582 of the smaller pulley wheel 531 when the lid, or hinged top of unit housing, 541 of the exemplary briefcase embodiment is closed onto the main base casing 507 (not shown in FIG. 49, but see, e.g., FIG. 45).

Figure 50:
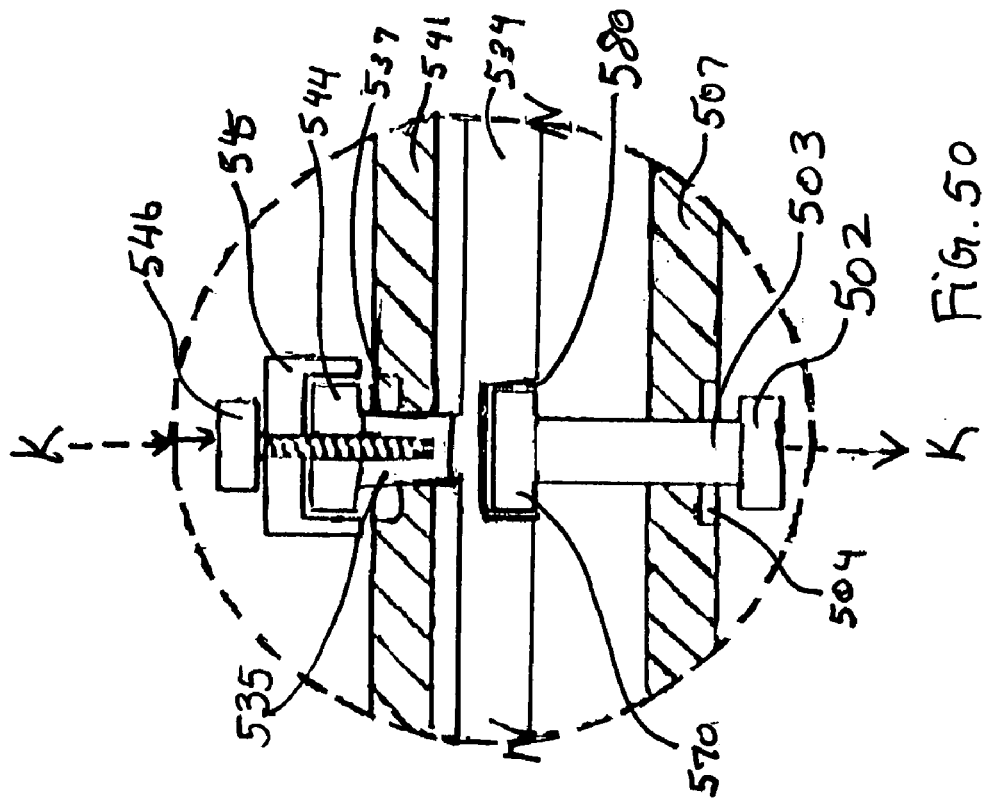
FIG. 50 is an enlarged cross-sectional view taken along line N-N, showing directional reference line K-K, depicting the interface between large drive pulley wheel shaft key with the key opening of the large drive pulley wheel of an exemplary briefcase embodiment when the lid, or hinged top of unit housing of the exemplary briefcase embodiment is closed onto the main base casing of an exemplary briefcase embodiment.

FIG. 50 is an enlarged cross-sectional view taken along line N-N, showing directional reference line K-K, depicting the interface between large drive pulley wheel shaft key 570 with the key opening 580 of the large drive pulley wheel 534 when the lid, or hinged top of unit housing, 541 of the exemplary briefcase embodiment is closed onto the main base casing 507.

Although not depicted in the drawings of the exemplary briefcase embodiment, in some briefcase embodiments, "kill" switches are used similar to the "kill" switches described above for the exemplary twelve-coil PMG embodiment, to prevent charge drain from the batteries 525 and 526 when the device is not being operated to store charge.

FIG. 48 is a perspective view depicting an opened exemplary briefcase embodiment of the present invention. Line D-D depicts the exemplary open and close direction of the exemplary lid 541 from the exemplary main base casing 507. Line F-F depicts the exemplary line of engagement/disengagement of the exemplary generator main shaft key 523 with the exemplary key opening 582 of the exemplary smaller pulley wheel 531. Line E-E depicts the exemplary line of engagement/disengagement of the exemplary large drive pulley wheel shaft key 570 with the key opening 580 of the large drive pulley wheel 534.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Linda A. Vasilovich, her successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A device for generating and storing electrical power, said device comprising:
   an at least a first battery for storing electrical power;
   an at least a first bridge rectifier connected to the at least the first battery;
   a permanent magnet generator alternator adapted for generating three-phase alternating electrical current, wherein the permanent magnet generator alternator is located in close proximity to the at least the first battery, the permanent magnet generator alternator comprising:
   a first structure comprising a plurality of electricity-conducting structures mounted in a substantially circular pattern equidistant from a first point in the first structure, each of the electricity-conducting structures of the plurality of electricity-conducting structures comprising a material adapted for conducting electricity, each of the electricity-conducting structures comprising a portion through which a magnetic flux can pass, wherein each of the electricity-conducting structures of the plurality of electricity-conducting structures is connected to the at least the first bridge rectifier, and wherein the plurality of electricity-conducting structures comprises a number of electricity-conducting structures that is divisible by the number three and is also divisible by the number two;
   two rotatable structures, coaxial to the first point of the first structure, mounted on each side of the first structure, wherein the first structure is stationary in relation to a rotation of the two rotatable structure, each rotatable structure comprising a respective plurality of permanent magnets mounted in a substantially circular pattern substantially equidistant from a respective center point in the respective rotatable structure such that the mounted permanent magnets expose alternating exposed magnetic poles, wherein the plurality of permanent magnets comprises a number of permanent magnets that is divisible by the number two;
   an aligning structure for aligning in counterposed magnet pairs, the alternating exposed magnetic poles of the respective permanent magnets mounted on one of the respective rotatable structures in counterposed magnetic polarity to the alternating exposed magnetic poles of the respective permanent magnets mounted on the respective opposing rotatable structure;
   a rotating structure for rotating the counterposed magnet pairs of the two rotatable structures relative to the electricity-conducting structures of the first structure;
   a manually operable crank connected to the rotating structure; and
   a first portion of magnetic shielding located between the permanent magnet generator alternator and the at least the first battery, wherein at least a portion of the permanent magnet generator alternator abuts the first portion of magnetic shielding, and wherein at least a portion of the first battery abuts the first portion of magnetic shielding.

2. The device of claim 1, wherein the number of electricity-conducting structures is greater than the number of permanent magnets.

3. The device of claim 1, wherein the rotating structure comprises:
   a first pulley wheel comprising a first pulley wheel center;
   a second pulley wheel comprising a second pulley wheel center;
   a first pulley wheel belt;
   a first shaft connected through the first pulley wheel center;
   wherein the manually operable crank is connected to the first shaft for rotating the first shaft; and
   a second shaft connected through the second pulley wheel center and extending through the respective center point in each of the respective rotatable structures and through the first point in the first structure.

4. The device of claim 1, wherein a star wiring connects the electricity-conducting structures of the plurality of electricity-conducting structures to the at least the first bridge rectifier.

5. The device of claim 1, said device further comprising:
a first cutoff switch connected between the at least the first bridge rectifier and the at least the first battery, the first cutoff switch operable in an off position to stop a flow of electrical current charge from the first bridge rectifier to the at least the first battery, and to stop a drain of a charge from the at least the first battery to the first bridge rectifier.

6. The device of claim 1, said device further comprising:
a docking station for connecting separate batteries for charging.

7. A device for generating and storing electrical power, said device comprising:
an at least a first battery for storing electrical power;
an at least a first bridge rectifier connected to the at least the first battery;
a permanent magnet generator alternator adapted for generating alternating electrical current, wherein the at least the first battery is located within close proximity to the permanent magnet generator alternator, the permanent magnet generator alternator comprising:
a first rotatable structure mounted on an axis, the first rotatable structure comprising a first plurality of permanent magnets mounted in the first rotatable structure,
a second rotatable structure, the second rotatable structure comprising a second plurality of permanent magnets mounted in the second rotatable structure, the second rotatable structure mounted on the axis so that the first plurality of permanent magnets mounted in the first rotatable structure and the second plurality of permanent magnets mounted in the second rotatable structure, comprise counterposed pairs,
a stationary structure mounted on the axis between the first rotatable structure and the second rotatable structure, the stationary structure comprising a plurality of electricity-conducting structures mounted in the stationary structure, wherein each electricity-conducting structure of the plurality of electricity-conducting structures is connected to the at least the first bridge rectifier, and wherein the at least the first bridge rectifier is connected to the at least the first battery, and
a rotating structure for rotating the counterposed magnet pairs of the two rotatable structures relative to the electricity-conducting structures of the first structure;
a manually operable crank connected to the rotating structure; and
a first portion of magnetic shielding located between the permanent magnet generator alternator and the at least the first battery, wherein at least a portion of the permanent magnet generator alternator abuts the first portion of magnetic shielding, and wherein at least a portion of the first battery abuts the first portion of magnetic shielding.

8. The device of claim 7, wherein the number of electricity-conducting structures is greater than the first plurality of permanent magnets.

9. The device of claim 7, wherein a star wiring connects the electricity-conducting structures of the plurality of electricity-conducting structures to the at least the first bridge rectifier.

10. The device of claim 7, said device further comprising:
a first cutoff switch connected between the at least the first bridge rectifier and the at least the first battery, the first cutoff switch operable in an off position to stop a flow of electrical current charge from the first bridge rectifier to the at least the first battery, and to stop a drain of a charge from the at least the first battery to the first bridge rectifier.

11. The device of claim 7, said device further comprising:
a docking station for connecting separate batteries for charging.

* * * * *